(12) United States Patent
Jeong et al.

(10) Patent No.: US 9,300,996 B2
(45) Date of Patent: Mar. 29, 2016

(54) DIGITAL RECEIVER AND METHOD OF PROVIDING REAL-TIME RATING THEREOF

(75) Inventors: Woojin Jeong, Pyeongtaek-si (KR);
Seokjin Shim, Pyeongtaek-si (KR);
Taejin Park, Pyeongtaek-si (KR);
Chuhyun Seo, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 893 days.

(21) Appl. No.: 13/341,535

(22) Filed: Dec. 30, 2011

(65) Prior Publication Data
US 2012/0192217 A1   Jul. 26, 2012

(30) Foreign Application Priority Data

Jan. 20, 2011 (KR) .................. 10-2011-0005827
May 9, 2011 (KR) .................. 10-2011-0043399

(51) Int. Cl.
| | | |
|---|---|---|
| H04H 60/32 | (2008.01) | |
| H04N 21/6547 | (2011.01) | |
| H04N 21/658 | (2011.01) | |
| H04N 21/84 | (2011.01) | |
| H04N 21/434 | (2011.01) | |
| H04N 21/25 | (2011.01) | |
| H04N 21/4722 | (2011.01) | |
| H04N 21/475 | (2011.01) | |
| H04N 21/488 | (2011.01) | |
| H04N 21/643 | (2011.01) | |

(52) U.S. Cl.
CPC ......... *H04N 21/252* (2013.01); *H04N 21/4345* (2013.01); *H04N 21/4722* (2013.01); *H04N 21/4755* (2013.01); *H04N 21/4882* (2013.01); *H04N 21/64322* (2013.01); *H04N 21/6547* (2013.01); *H04N 21/6582* (2013.01); *H04N 21/84* (2013.01)

(58) Field of Classification Search
USPC ........................................... 725/14
See application file for complete search history.

(56) References Cited

U.S. PATENT DOCUMENTS

| | | | |
|---|---|---|---|
| 2003/0023967 A1 | 1/2003 | Kim | |
| 2005/0251825 A1 | 11/2005 | Fukuda et al. | |
| 2007/0011040 A1* | 1/2007 | Wright et al. | 705/10 |
| 2007/0157221 A1* | 7/2007 | Ou et al. | 725/10 |
| 2007/0294740 A1* | 12/2007 | Drake et al. | 725/131 |

(Continued)

FOREIGN PATENT DOCUMENTS

| | | |
|---|---|---|
| CN | 101707689 A | 5/2010 |
| CN | 101938672 A | 1/2011 |

(Continued)

*Primary Examiner* — Omar S Parra
(74) *Attorney, Agent, or Firm* — Birch, Stewart, Kolasch & Birch, LLP

(57) ABSTRACT

A digital receiver and a method of providing rating information in the digital receiver are disclosed, in which rating information on channels available in the digital receiver is provided to a user to provide the user convenience in selecting a channel. The method of providing rating information in a digital receiver comprises the steps of transmitting a first signal to a server in a rating notification mode, the first signal including setting information; receiving a second signal from the server, the second signal including setting details on rating information collection; transmitting a third signal to the server if the digital receiver is set as a rating information collecting target based on the second signal, the third signal including channel watching information of the digital receiver; and receiving a fourth signal from the server, the fourth signal including rating information.

13 Claims, 45 Drawing Sheets

(56) References Cited

U.S. PATENT DOCUMENTS

| | | |
|---|---|---|
| 2008/0082999 A1 | 4/2008 | Hamada et al. |
| 2010/0131969 A1* | 5/2010 | Tidwell et al. ................ 725/14 |
| 2010/0333142 A1 | 12/2010 | Busse et al. |

FOREIGN PATENT DOCUMENTS

| | | |
|---|---|---|
| EP | 1 538 838 A1 | 6/2005 |
| JP | 2006-41587 A | 2/2006 |
| JP | 2006-180125 A | 7/2006 |
| WO | WO 01/15449 A1 | 3/2001 |
| WO | WO 2007/117984 A2 | 10/2007 |
| WO | WO 2008/038941 A1 | 4/2008 |

\* cited by examiner

FIG. 17
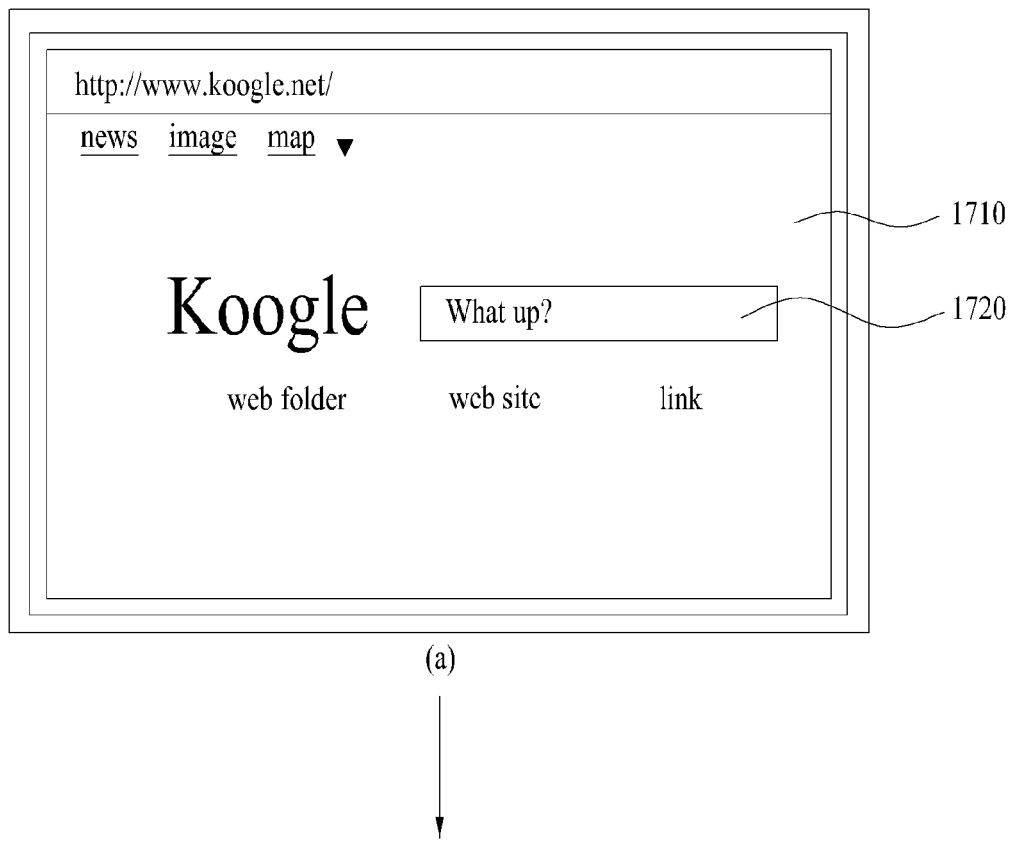
(a)
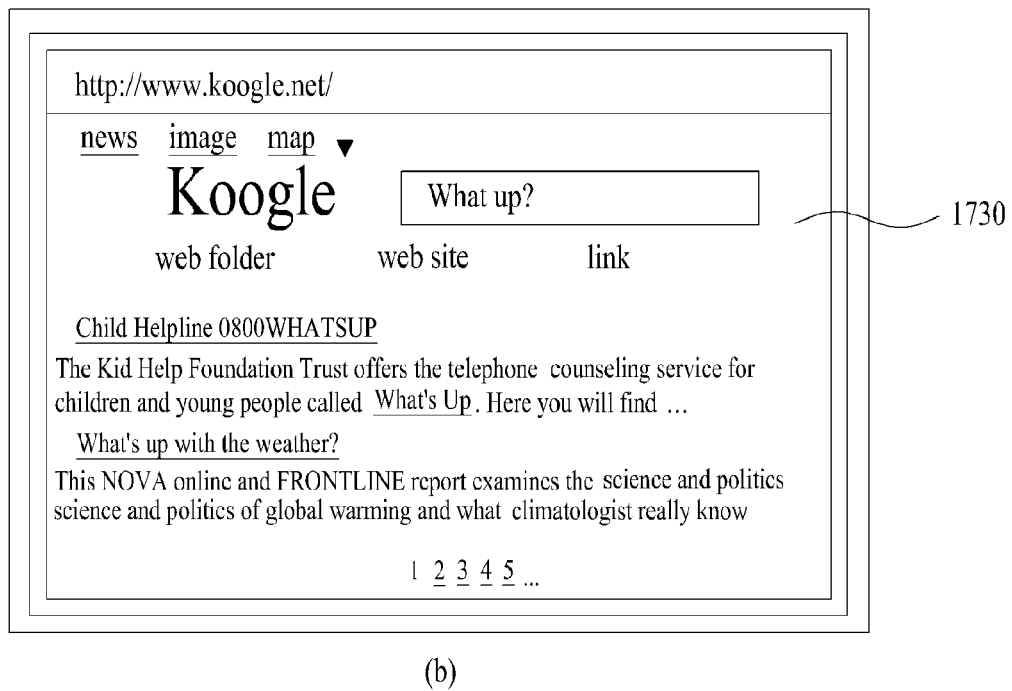
(b)

```
http://www.yhoo.net/
```

1810 — Sign-in to yhoo!

ID

1820 — ******

PASSWORD

1825 — ******

☐ AUTO SIGN-IN (a)

↓

```
http://www.yhoo.net/mail/tttt
```

| tttt@yhoo.net | received box | |
|---|---|---|
| ✉ read mail | sender | title |
| ✉ write mail | KK | aaa |
| ✉ check mail | LL | bbb1111111111111111111111111 |
| | MM | CCCCCCCCCCCCCCCCC |
| • received box | NN | dddddddddddddddddd |
| • sent box | OO | eeeeeeeeeeeeeeeeeeee |
| • spam box | PP | No title |
| • recycle bin | | 1 2 3 4 5 ··· |

(b)

DIGITAL RECEIVER AND METHOD OF PROVIDING REAL-TIME RATING THEREOF

This application claims the benefit of the Korean Patent Application No. 10-2011-0005827, filed on Jan. 20, 2011 and the Korean Patent Application No. 10-2011-0043399, filed on May 9, 2011 which are hereby incorporated by reference as if fully set forth herein.

BACKGROUND OF THE INVENTION

1. Field of the Invention

The present invention relates to a digital receiver and an operation of the digital receiver, and more particularly, to a digital receiver and a method of providing a real-time rating in the digital receiver that collects, generates and provides rating information on available channels.

2. Discussion of the Related Art

The current worldwide tendency is rapidly towards digital broadcasting from analog broadcasting. Since digital broadcasting is robuster to external noise than analog broadcasting, it little causes data loss, is more favorable for error correction, has high resolution, and provides definite picture image. Also, digital broadcasting enables bidirectional services unlike analog broadcasting.

Also, IPTV broadcasting service has been recently provided, which provides services such as real time broadcasting and contents on demand (CoD) by using an Internet protocol (IP) network connected with each home, in addition to media such as conventional terrestrial, satellite and cable.

SUMMARY OF THE INVENTION

Accordingly, the present invention is directed to a digital receiver and a method of providing a real-time rating in the digital receiver which substantially obviate ones or more problems due to limitations and disadvantages of the related art.

An object of the present invention is to provide a digital receiver and a method of providing a real-time rating in the digital receiver, in which information on channels currently viewed by the digital receiver is acquired to provide a user with convenience in selecting a channel.

Another object of the present invention is to provide various user interfaces for convenience of a user in channel selection.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of providing rating information in a digital receiver comprises the steps of transmitting a first signal to a server in a rating notification mode, the first signal including setting information; receiving a second signal from the server, the second signal including setting details on rating information collection; transmitting a third signal to the server if the digital receiver is set as a rating information collecting target based on the second signal, the third signal including channel watching information of the digital receiver; and receiving a fourth signal from the server, the fourth signal including rating information.

In another aspect of the present invention, a method of collecting rating information in a broadcasting system comprises the steps of transmitting a first signal from a digital receiver to a server, the first signal including information on rating notification mode setting; determining in the server whether to include the digital receiver as a channel watching information collecting target, and transmitting a second signal to the digital receiver, the second signal including the determined result; transmitting a third signal to the server if the digital receiver is set as the rating information collecting target based on the second signal, the third signal including channel watching information; storing the third signal in the server and generating rating information based on the stored information; and transmitting a fourth signal from the server to the digital receiver, the fourth signal including the generated rating information.

In other aspect of the present invention, a digital receiver that provides rating information comprises a network interface module transmitting and receiving data to and from a server through a network; a channel history module generating channel watching information; a display module displaying the rating information; and a control module transmitting a first signal, which includes rating notification mode setting information, to the server, receiving a second signal, which includes setting details on rating information collection, from the server, transmitting a third signal, which includes channel watching information, to the server if the digital receiver is set as a rating information collecting target based on the second signal, and receiving a fourth signal, which includes the rating information, from the server.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 17 is a diagram illustrating a third example of a user interface provided by any one of display devices according to the embodiments of the present invention;

FIG. 18 is a diagram illustrating a fourth example of a user interface provided by any one of display devices according to the embodiments of the present invention;

in FIG. 36;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The suffixes "module" and "unit" for the elements used in the following description are given or used in common by considering facilitation in writing this disclosure only but fail to have meanings or roles discriminated from each other. The suffixes "module" and "unit" may be used together.

In the mean time, an image display device or a digital receiver described in this specification corresponds to an intelligent device that additionally provides a computer support function in addition to a broadcasting receiving function. Accordingly, the image display device or the digital receiver may be provided with a more convenient interface such as a manual input unit, a touch screen or a spatial remote controller. Also, the image display device or the digital receiver enables e-mailing, web browsing, banking or games by accessing Internet or computer in accordance with the support of wire or wireless Internet function. For these various functions, a standardized general-purpose operating system (OS) may be used. Also, in this specification, the scope of the present invention may be applied to the image display device or the digital receiver.

Accordingly, since the display device disclosed herein can freely be provided with or delete various applications on a general-purpose OS kernel, it may perform user-friendly various functions. More detailed examples of the display device include network TV, HBBTV, smart TV. The display device may be applied to a smart phone as the case may be.

Also, the term, "contents" disclosed herein is the general term for digital information, which is provided through various wire and wireless communication networks and can be used through a display device, and its contents.

Moreover, the embodiments of the present invention will now be described in detail with reference to the accompanying drawings and the disclosure illustrated in the accompanying drawings. However, it is to be understood that the present invention is not limited to or restricted by the following embodiments.

Although the terms used in the present invention are selected from generally known and used terms considering their functions in the present invention, the terms can be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Figure 1:
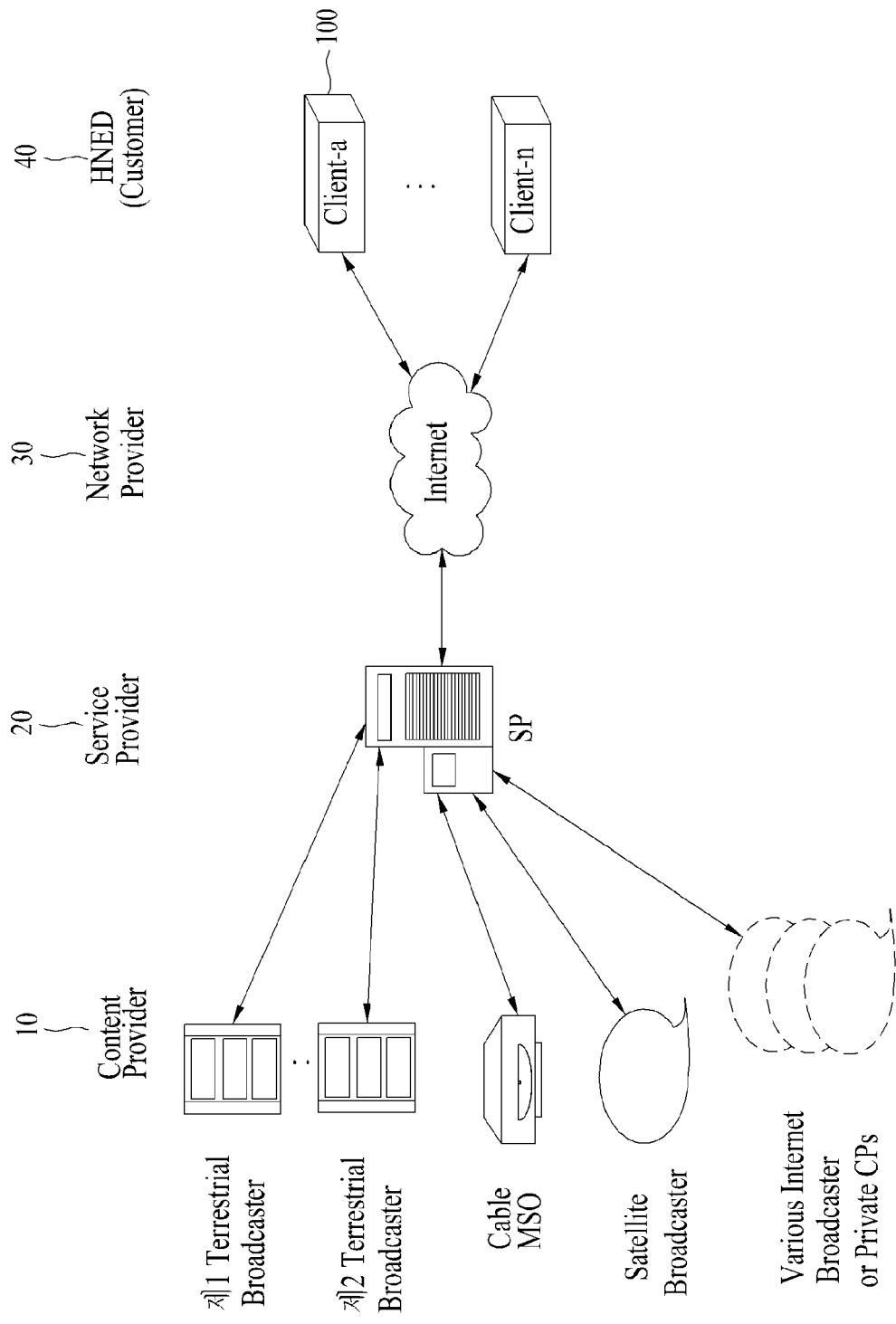
FIG. 1 is a brief diagram illustrating an example of a broadcasting system including a display device according to one embodiment of the present invention.

FIG. 1 is a brief diagram illustrating an example of a broadcasting system including a display device according to one embodiment of the present invention.

As illustrated in FIG. 1, the broadcasting system including a display device according to one embodiment of the present invention includes a content provider (CP) 10, a service provider (SP) 20, a network provider (NP) 30, and a home network end user (HNED) 40. The HNED 40 corresponds to, for example, a client 100 which is a display device according to the embodiment of the present invention. The client 100 corresponds to the display device according to one embodiment of the present invention, wherein examples of the display device include network TV, smart TV, and IPTV.

The content provider 10 manufactures various contents and provides them. Examples of the content provider 10 include a terrestrial broadcaster, a cable system operator (SO), a multiple system operator (MSO), a satellite broadcaster, and an Internet broadcaster, as illustrated in FIG. 1.

Also, the content provider 10 may provide various applications in addition to broadcast contents, which will be described in more detail later.

The service provider 20 can provide contents provided by the content provider 10 by service packaging them. For example, the service provider 20 of FIG. 1 can package first terrestrial broadcasting, second terrestrial broadcasting, cable MSO, satellite broadcasting, various kinds of Internet broadcasting, application, etc. and provide the packaged one to a user.

In the mean time, the service provider 20 may provide a service to the client 100 by using a unicast or multicast mode. The unicast mode is to transmit data between a single transmitter and a single receiver 1:1. In case of the unicast mode, for example, if the receiver requests a server to transmit data, the server can transmit data to the receiver in accordance with the request. The multicast mode is to transmit data to a plurality of receivers of a specific group. For example, the server can transmit data to a plurality of receivers, which are previously registered therewith, at one time. For this multicast registration, IGMP (Internet Group Management Protocol) can be used.

The network provider 30 may provide a network for providing a service to the client 100. The client 100 may construct a home network end user (HNED) to receive a service.

In the system of the aforementioned display device, conditional access or content protection can be used to protect contents which are transmitted. For conditional access or content protection, a cable card or downloadable conditional access system (DCAS) can be used.

In the mean time, the client 100 may provide contents through the network. In this case, the client 100 may be a content provider contrary to the above. The content provider 10 may receive contents from the client 100. In this case, it is advantageous in that bidirectional content service or data service is available.

Figure 2:
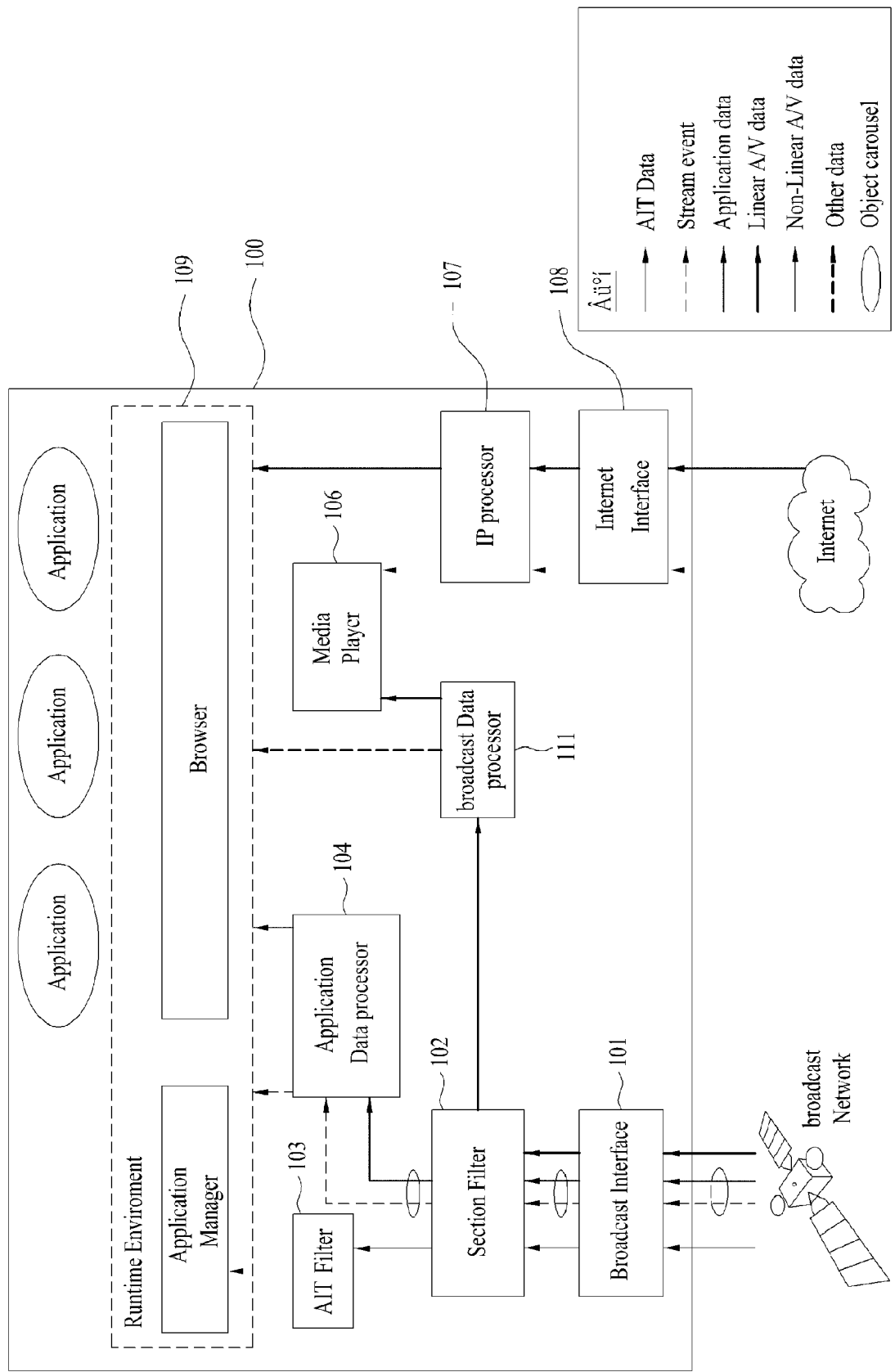
FIG. 2 is a brief diagram illustrating an example of a broadcasting system including a display device according to another embodiment of the present invention.

FIG. 2 is a brief diagram illustrating an example of a broadcasting system including a display device according to another embodiment of the present invention.

As illustrated in FIG. 2, a display device 100 according to another embodiment of the present invention is connected with a broadcast network or Internet network. Examples of the display device 100 include network TV, smart TV, and HBBTV.

Also, the display device 100 includes a broadcast interface 101, a section filter 102, an AIT filter 103, an application data processor 104, a broadcast data processor 111, a media player 106, an Internet protocol processor 107, an Internet interface 108, and a runtime module 109, for example.

Application information table (AIT) data, a real-time broadcast content, application data, and stream event are received through the broadcast interface 101. In the mean time, the real-time broadcast content may be designated as a linear A/V content.

The section filter 102 performs section filtering for four kinds of data received through the broadcast interface 101. Then, the section filter 102 transmits AIT data to the AIT filter 103, the linear A/V content to the broadcast data processor 111, and stream event and application data to the application data processor 104.

In the mean time, a non-linear A/V content and application data are received through the Internet interface 108. The non-linear A/V content may be content on demand (COD) application, for example.

The non-linear A/V content is transmitted to the media player 106, and the application data is transmitted to the runtime module 109.

Moreover, the runtime module 109, as illustrated in FIG. 2, includes an application manager and a browser, for example. The application manager controls a lifecycle for an interactive application by using the AIT data. The browser serves to display and process the interactive application.

Figure 3:
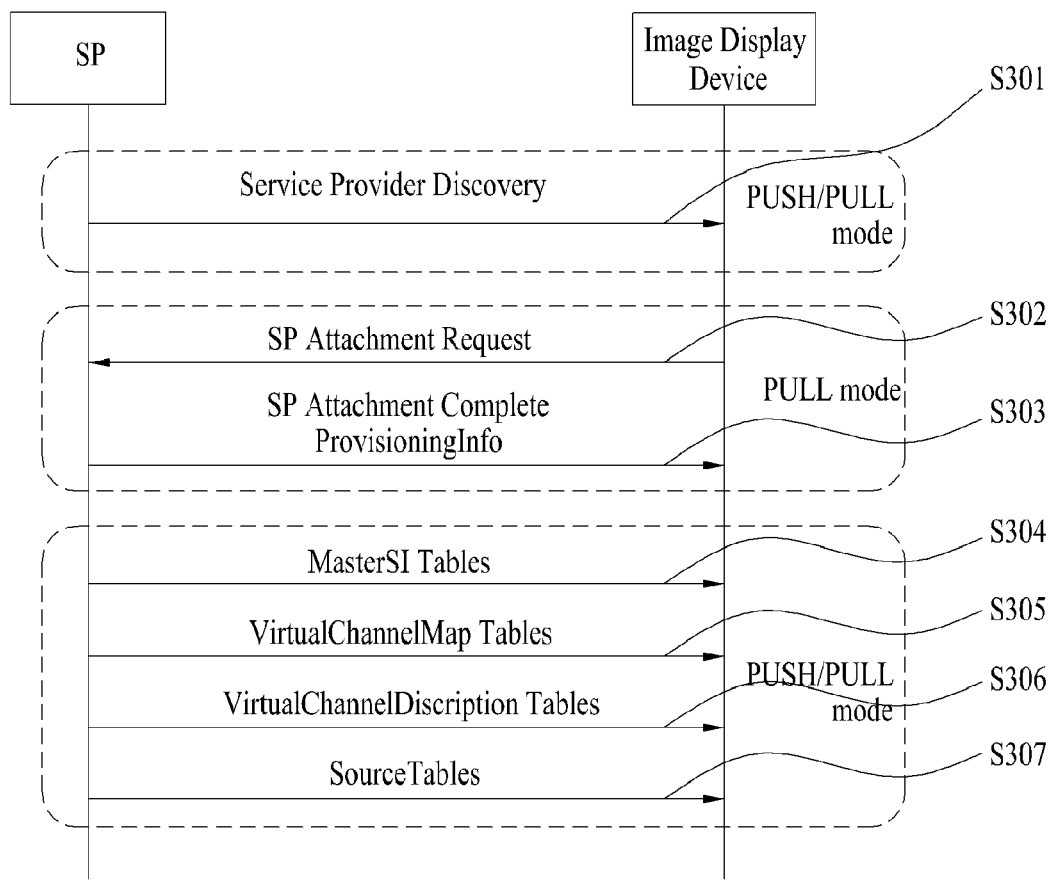
FIG. 3 is a diagram illustrating process steps for receiving channel information in a display device illustrated in FIG. 1 or FIG. 2 by accessing a service provider.

FIG. 3 is a diagram illustrating process steps for receiving channel information in a display device illustrated in FIG. 1 or FIG. 2 by accessing a service provider. It is to be understood that the method of FIG. 3 is only exemplary and the scope of the present invention is not limited by only the method of FIG. 3.

The service provider performs service provider discovery (S301). The display device transmits a service provider (SP) attachment request signal (S302). If SP attachment is finished, the display device receives provisioning information (S303). Moreover, the display device receives a master SI table from the service provider (S304), receives a virtual channel map table (S305), receives a virtual channel description table (S306), and receives a source table (S307).

Hereinafter, the process steps for receiving channel information will be described in more detail.

The service provider discovery may mean that service providers, which provide IPTV related services, discover a service discovery (SD) server that provides information on the service providers.

For example, three methods for discovering an address list that can receive information (for example, SP discovery information) on the SD server will be provided as follows. First of all, an address previously set by the display device or an address set by a manual operation of the user can be used. Second, a DHCP based SP discovery method can be used. Third, a DNS SRV-based SP discovery method can be used. Also, the display device accesses a server of an address acquired by any one of the above three methods and receives a service provider discovery record that includes information required for service discovery per SP. Then, the display device performs a service search step by using the received service provider discovery record. The above steps can be performed in a push mode or pull mode.

The display device performs a registration procedure (or service attachment procedure) by accessing the SP attachment server designated by an SP attachment locator of the SP discovery record.

Moreover, after performing a separate authentication procedure by accessing an SP authentication service server designated by an SP authentication locator, the display device may perform a service authentication procedure.

In the mean time, after the service attachment procedure is successfully performed, data transmitted from the server to the display device may be a form of a provisioning information table.

The display device transmits the data to the service attachment server during the service attachment procedure, wherein the data includes ID and location information of the display device. The service attachment server can define a service subscribed by the display device, based on the received data. Moreover, address information that can acquire service information desired to be received by the display device is provided in the form of the provisioning information table. The address information corresponds to access information of the master SI table. In this case, it is easy to provide a customized service per subscriber.

The service information includes a master SI table record that manages access information and version on the virtual channel map, a virtual channel map table that provides a package type service list, a virtual channel description table that includes detailed information of each channel, and a source table that includes access information that enables actual access to services.

Figure 4:
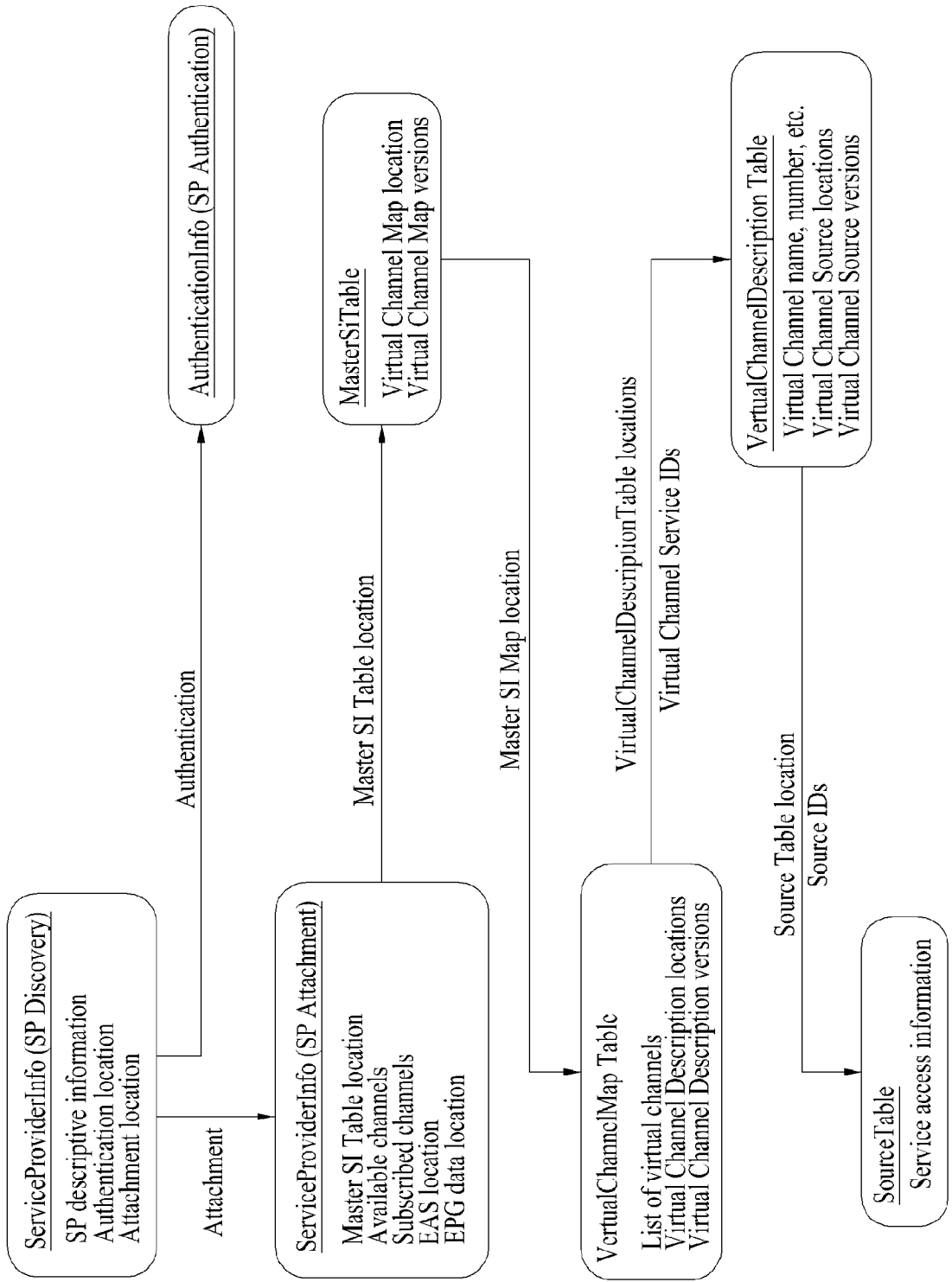
FIG. 4 is a diagram illustrating an example of data used in the steps shown in FIG. 3.

FIG. 4 is a diagram illustrating an example of data used in the steps shown in FIG. 3.

FIG. 4 illustrates the steps of FIG. 3 in more detail. Hereinafter, the relation between data within SI will be described with reference to FIG. 4.

The mater SI table includes location information that can receive each virtual channel map and version information of each virtual channel map.

Each virtual channel map is uniquely identified by a virtual channel map identifier, and virtual channel map version represents version information of the virtual channel map. If any one of all tables connected to one another along an arrow starting from the master SI table illustrated in FIG. 4 is changed, version of all upper tables (to reach master SI table) is increased together with increase of the corresponding table. Accordingly, it is advantageous in that the display device can identify change on all SI tables directly by monitoring the master SI table.

For example, if there is any change of the source table, version of the source table is increased, and version of the virtual channel description table for reference of the source table is also changed. Accordingly, change of a lower table causes change of an upper table, whereby version of the master SI table is finally changed.

The master SI table may exist per service provider. However, if configuration of the service is varied per location or subscriber (or subscriber group), the service provider is designed to have a plurality of master SI tables, thereby providing a customized service per each unit. In this way, if the service provider is designed, it is possible to efficiently provide a customized service for location of a subscriber and subscription information through the master SI table.

The virtual channel map table may have one or more virtual channels, and includes location information that can acquire detailed information of the channel without including the detailed information in the virtual channel map. Virtual channel description location of the virtual channel map table indicates location of the virtual channel description table that includes detailed information of the channel.

The virtual channel description table includes detailed information of the virtual channel, and can access the virtual channel description table by using the virtual channel description location of the virtual channel map table.

The source table provides access information (for example, IP address, port, AV codec, transport protocol, etc.) per service, wherein the access information is required for actual access to the service.

The aforementioned master SI table, the virtual channel map table, the virtual channel description table, and the source table are transferred through four flows, which are logically divided from one another, in a push mode or pull mode. In the mean time, the master SI table can be transmitted in a multicast mode for version management, and monitors version change by receiving multicast streaming.

Figure 5:
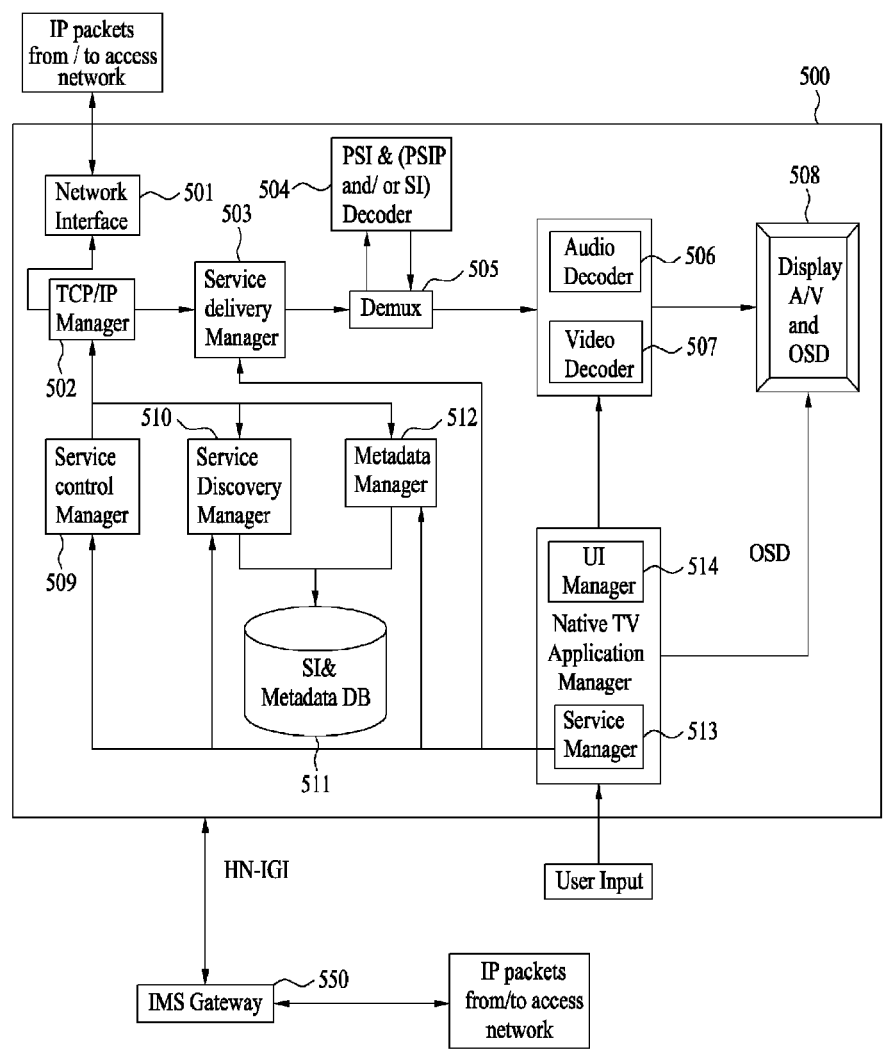
FIG. 5 is a diagram illustrating a detailed example of a display device illustrated in FIG. 1 to FIG. 2.

FIG. 5 is a diagram illustrating a detailed example of a display device illustrated in FIG. 1 to FIG. 2. It is to be understood that the example illustrated in FIG. 5 is only exemplary and the scope of the present invention should basically be determined by claims not the example of FIG. 5.

The display device 700 includes a network interface 701, a TCP/IP manager 702, a service delivery manager 703, a demultiplexer (Demux) 705, a PSI& (PSIP and/or SI) decoder 704, an audio decoder 706, a video decoder 707, a display A/V and OSD module 708, a service control manager 709, a service discovery manager 710, a metadata manager 712, an SI&Metadata DB 711, a UI manager 714, and a service manager 713.

The network interface 701 receives packets from a network, and transmits the packets to the network. In other words, the network interface 701 receives services, contents, etc. from the service provider through the network.

The TCP/IP manager 702 is involved in packets received in the display device 700 and packets transmitted from the display device 700, i.e., packet transfer from the source to the destination. The TCP/IP manager 702 sorts the received packets to correspond to a proper protocol, and outputs the sorted packets to the service delivery manager 705, the service discovery manager 710, the service control manager 709, and the metadata manager 712.

The service delivery manager 703 takes the role of control of received service data. For example, if the service delivery manager 703 controls real-time streaming data, it can use RTP/RTCP. If the service delivery manager 703 transmits the real-time streaming data by using RTP, it parses the received packets in accordance with RTP and transmits the parsed packets to the demultiplexer 705 or stores the parsed packets in the SI&Metadata DB 711 under the control of the service manager 713. The service delivery manager 703 feeds the received information back to a server, which provides a service, by using RTCP.

The demultiplexer 705 demultiplexes the received packets to audio, video and PSI (Program Specific Information) data and then transmits the demultiplexed data to the audio decoder 706, the video decoder 707, and the PSI& (PSIP and/or SI) decoder 704, respectively.

The PSI& (PSIP and/or SI) decoder 704 decodes service information such as PSI, for example. Namely, the PSI& (PSIP and/or SI) decoder 704 receives and decodes PSI section, PSIP (Program and Service Information Protocol) section or SI (Service Information) section, which is demultiplexed by the demultiplexer 705.

Also, the PSI& (PSIP and/or SI) decoder 704 decodes the received sections to make a database for service information, and stores the database for service information in the SI&Metadata DB 711.

The audio/video decoders 706/707 decode the video data and the audio data, which are received from the demultiplexer 705. The audio data decoded by the audio decoder 706 and the video data decoded by the video decoder 707 are provided to the user through the display 708.

The UI manager 714 and the service manager 713 manage the whole state of the display device 700, provide a user interface, and manage other managers.

The UI manager 714 provides a graphic user interface for the user by using an on screen display (OSD), and performs a receiving operation based on a key input from the user. For example, if a key input signal for channel selection is input from the user, the UI manager 714 transmits the key input signal to the service manager 713.

The service manager 713 controls managers related to the service, such as the service delivery manager 703, the service discovery manager 710, the service control manager 709, and the metadata manager 712.

Also, the service manager 713 makes a channel map and selects a channel by using the channel map in accordance with the key input signal received from the UI manager 714. The service manager 713 receives service information of the channel from the PSI& (PSIP and/or SI) decoder 704 and sets audio/video PID (Packet Identifier) of the selected channel in the demultiplexer 705.

The service discovery manager 710 provides information required to select the service provider that provides services. If a signal related to channel selection is received from the service manager 713, the service discovery manager 710 discovers a corresponding service by using the received information.

The service control manager 709 takes the role of selection and control of the service. For example, if the user selects a live broadcasting service like the existing broadcasting mode, the service control manager 709 uses IGMP or RTSP. If the user selects a video on demand (VOD) service, the service control manager 709 selects and controls the service by using RTSP. The RTSP protocol can provide a trick mode for real-time streaming. Also, the service control manager 709 can initiate and manage a session through IMC gate by using IMS (IP Multimedia Subsystem) and Session Initiation Protocol (SIP). The above protocols are only exemplary, and other protocols may be used depending on embodiments.

The metadata manager 712 manages metadata related to the service and stores the metadata in the SI&Metadata DB 711.

The SI&Metadata DB 711 stores the service information decoded by the PSI& (PSIP and/or SI) decoder 704, the metadata managed by the metadata manager 712, and the information required to select the service provider provided by the service discovery manager 710. Also, the SI&Metadata DB 711 may store setup data for the system.

The SI&Metadata DB 711 may be implemented by using a NonVolatile RAM (NVRAM) or a flash memory.

In the mean time, the IG 750 is a gateway where functions required for access to IMS based IPTV services are gathered.

Figure 6:
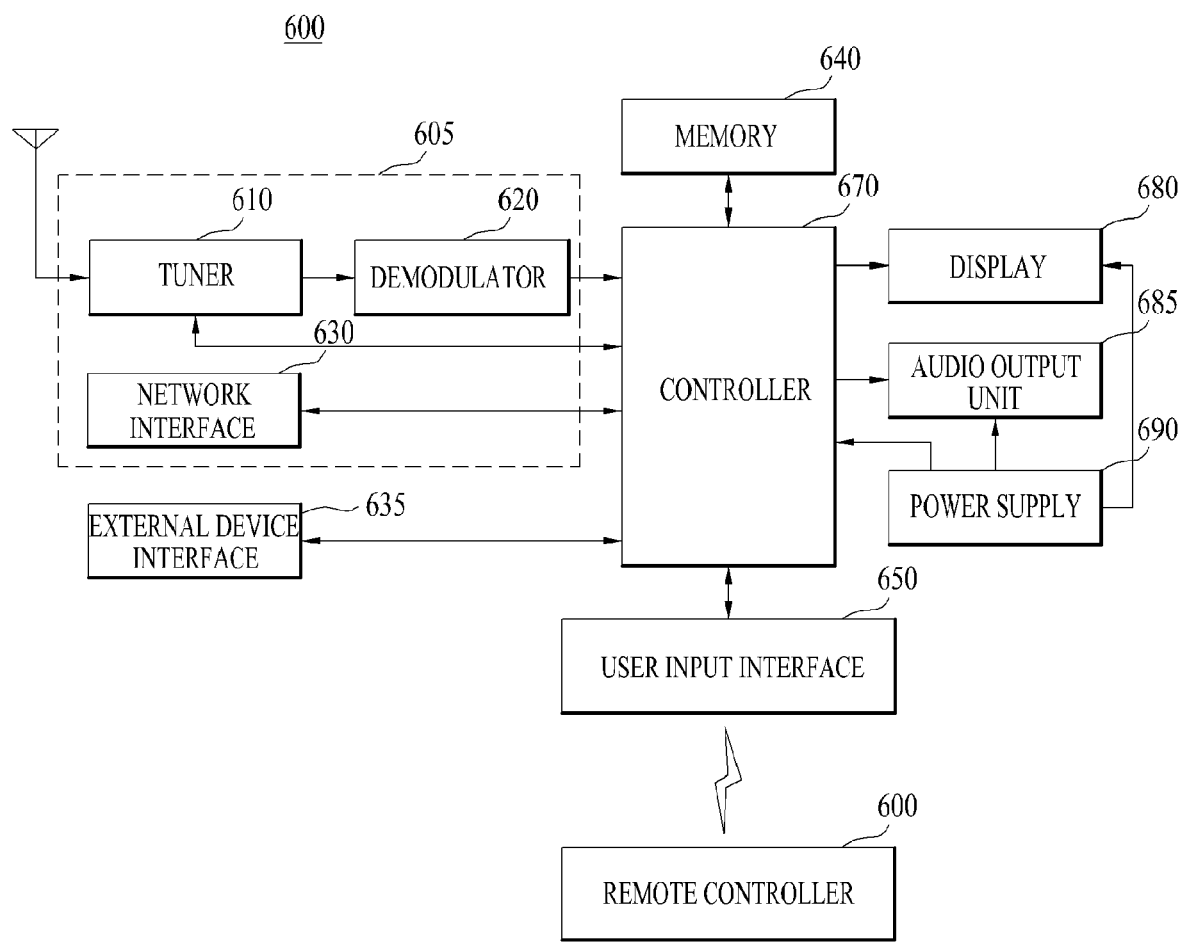
FIG. 6 is a diagram illustrating another detailed example of a display device illustrated in FIG. 1 to FIG. 2.

FIG. 6 is a diagram illustrating another detailed example of a display device illustrated in FIG. 1 to FIG. 2.

Referring to FIG. 6, a display device 100 according to one embodiment of the present invention includes a broadcast receiver 105, an external device interface module 135, a memory module 140, a user input interface module 150, a control module 170, a display module 180, an audio output module 185, a power supply module 190, and a camera module (not shown). The broadcast receiver 105 includes a tuner 110, a demodulation module 120, and a network interface module 130. As occasion demands, the broadcast receiver 105 may be designed in such a manner that it includes a tuner 110 and a demodulation module 120 but does not include a network interface module 130. On the contrary, the broadcast receiver 105 may be designed in such a manner that it includes a network interface module 130 but does not include a tuner 110 and a demodulation module 120.

The tuner 110 selects one of RF (radio frequency) broadcast signals received through an antenna, which corresponds to a channel selected by the user or all previously stored channels. Also, the tuner 110 converts the selected RF broadcast signal to an intermediate frequency signal or a baseband video or audio signal.

For example, if the selected RF broadcast signal is a digital broadcast signal, the tuner 110 coverts the selected RF broadcast signal to a digital IF (DIF) signal. If the selected RF broadcast signal is an analog broadcast signal, the tuner 110 coverts the selected RF broadcast signal to an analog baseband video or audio signal (CVBS/SIF). In other words, the tuner 110 can process both the digital broadcast signal and the analog broadcast signal. The analog baseband video or audio signal (CVBS/SIF) output from the tuner 110 may directly be input to the control module 170.

Also, the tuner 110 can receive RF broadcast signal of a single carrier based on an advanced television system committee (ATSC) mode and RF broadcast signal of multiple carriers based on a digital video broadcasting mode (DVB).

In the mean time, the tuner 110 sequentially selects RF broadcast signals of all broadcast channels stored through a channel memory function from RF broadcast signals received through the antenna, and converts the selected RF broadcast signals to intermediate frequency signals or baseband video or audio signals.

The demodulation module 120 receives the digital IF (DIF) signal converted by the tuner 110 and demodulates the received digital IF signal.

For example, if the digital IF signal output from the tuner 110 is based on the ATSC mode, the demodulation module 120 performs 8-vestigal side band (8-VSB) demodulation, for example. Also, the demodulation module 120 may perform channel decoding. To this end, the demodulation module 120 may include a trellis decoder, a de-interleaver, and a Reed-Solomon decoder to perform trellis decoding, de-interleaving, and Reed-Solomon decoding.

For example, if the digital IF signal output from the tuner 110 is based on the DVB mode, the demodulation module 120 performs coded orthogonal frequency division modulation (COFDMA) demodulation, for example. Also, the demodulation module 120 may perform channel decoding. To this end, the demodulation module 120 may include a convolution decoder, a de-interleaver, and a Reed-Solomon decoder to perform convolution decoding, de-interleaving, and Reed-Solomon decoding.

The demodulation module 120 can output a stream signal (TS) after performing demodulation and channel decoding. At this time, the stream signal may be a signal where a video signal, an audio signal and a data signal are multiplexed. For example, the stream signal may be MPEG-2 Transport Stream (TS) where a video signal of an MPEG-2 specification and an audio signal of Dolby AC-3 specification are multiplexed. Specifically, the MPEG-2 TS may include a 4 byte header and 184 byte payload.

In the mean time, the aforementioned demodulation module 120 may be provided separately depending on the ATSC mode and the DVB mode. Namely, an ATSC demodulation module and a DVB demodulation module may be provided separately.

The stream signal output from the demodulation module 120 may be input to the control module 170. The control module 170 performs demultiplexing, video/audio signal processing, etc. and then outputs video to the display module 180 and audio to the audio output module 185.

The external device interface module 135 may connect an external device to the display device 100. To this end, the external device interface module 135 may include an A/V input/output unit (not shown) or a wireless communication unit (not shown).

The external device interface module 135 is connected to external devices such as Digital Versatile Disks (DVD), Blu-rays, game devices, cameras, camcorders, computers (e.g., notebook computers), etc. through wire/wireless cables. The external device interface module 135 transmits a video, audio, or data signal externally input through an external device connected thereto, to the control module 170 of the display device 100. Also, the external device interface module 135 outputs the video, audio or data signal processed by the control module 170 to the external device. To this end, the external device interface module 135 may include an A/V input/output unit (not shown) or a wireless communication unit (not shown).

The A/V input/output unit of the external input circuit may include a USB terminal, a composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, etc., to input video and audio signals of the external device to the display device 100.

The wireless communication unit may perform a short-distance wireless communication with other electronic devices. For example, communication standards such as Bluetooth, Radio Frequency Identification (RFID), infrared Data Association (IrDA), Ultra Wideband (UWB), ZigBee, Digital Living Network Alliance (DLNA), etc. can be used for the short-distance wireless communication, whereby network connection between the display device 100 and other electronic devices can be performed.

In addition, the external device interface module 135 may be connected to various set-top boxes through at least one of the above-mentioned various terminals to perform input/output operation with the set-top boxes.

In the mean time, the external device interface module 135 receives an application of a neighboring external device or list of applications and transmits the received application or the list of applications to the control module 170 or the memory module 140.

The network interface module 130 provides interface for connecting the display device 100 with wire/wireless networks including Internet network. The network interface module 130 may include an Ethernet terminal, for example, for wire network connection. Also, for example, Wireless LAN (WLAN) (Wi-Fi), Wireless broadband (Wibro), World Interoperability for Microwave Access (Wimax), High Speed Downlink Packet Access (HSDPA) can be used for the wireless network connection.

The network interface module 130 transmits or receives data to and from other users or other electronic devices through a network connected thereto or another network linked on the connected network. In particular, the network interface module 130 can transmit some contents data stored in the display device 100 to a user or electronic device selected from other users or electronic devices previously registered with the display device 100.

In the mean time, the network interface module 130 can access a predetermined web page through a network connected thereto or another network linked on the connected network. In other words, the network interface module 130 can transmit or receive data to and from a corresponding server by accessing the predetermined web page through the corresponding network. In addition, the network interface module 130 can receive contents or data provided by the content provider or the network operator. In other words, the network interface module 130 can receive contents such as movies, advertisements, games, VOD, broadcast signals, etc. and related information, which are provided from the content provider or the network provider through the network. Also, the network interface module 130 can receive update information and update files of firmware provided by the network operator. Moreover, the network interface module 130 can transmit data to the Internet or content provider or the network operator.

Furthermore, the network interface module 130 can selectively receive a desired one of contents open to the public, through the network.

Also, the network interface module 130 can transmit or receive contents or data of a list of contents to and from a predetermined server through the network.

The memory module 140 may store a program for processing and controlling each signal of the control module 170, or may store the processed video, audio or data signal.

Also, the memory module 140 may temporarily store the video, audio or data signal input from the external device interface module 135 or the network interface module 130.

The memory module 140 may store information on a predetermined broadcast channel through a channel memory function.

Also, the memory module 140 may store the application or the list of applications input from the external device interface module 135 or the network interface module 130.

Also, the memory module 140 may store the contents or the list of contents input from the external device interface module 135 or the network interface module 130.

For example, the memory module 140 may include a storage medium of at least one type of a flash memory type, a hard disk type, a multimedia card micro type, a card type memory (for example, SD or XD memory), RAM and ROM (EEPROM, etc.) The display device 100 can play contents files (moving picture files, still image files, music files, application files, etc.) stored in the memory module 140 to provide the played contents files to the user.

Although FIG. 6 illustrates that the memory module 140 and the control module 170 are provided separately, the scope of the present invention is not limited by the embodiment of FIG. 6. The memory module 140 may be included in the control module 170.

The user input interface module 150 transmits the signal input by the user to the control module 170 or transmits the signal from the control module 170 to the user.

For example, the user input interface module 150 may receive a control signal such as power on/off, channel selection and screen setup from the remote controller 200 or transmit the control signal from the control module 170 to the remote controller 200 in accordance with various communication modes such as RF communication mode and IR communication mode.

Also, for example, the user input interface module 150 may transmit a control signal input by a local key (not shown) such as a power key, a channel key, a volume key, and a setup key to the control module 170.

Also, for example, the user input interface module 150 may transmit a control signal input by a sensing unit (not shown), which senses gesture of the user, to the control module 170, or may transmit the signal from the control module 170 to the sensing unit. In this case, the sensing unit may include a touch sensor, an audio sensor, a position sensor, an action sensor, etc.

Also, for synchronization and search of the contents stored in the display device, the user input interface module 150 may receive predetermined synchronization target content, a selection signal of the display device for synchronization, a content keyword, and a synchronization command from the user.

The control module 170 demultiplexes an input stream and processes the demultiplexed stream through the tuner 110, the demodulation module 120 or the external device interface module 130 to generate and output a signal for a video and audio output.

The video signal processed by the control module 170 may be input to the display module 180, so that the video signal may be displayed as image corresponding to the video signal. Also, the video signal processed by the control module 170 may be input to the external output device through the external device interface module 135.

The video signal processed by the control module 170 may be output to the audio output module 185. Also, the video signal processed by the control module 170 may be input to the external output device through the external device interface module 135.

Although not shown in FIG. 6, the control module 170 may include a demultiplexer and a video processor, which will be described later with reference to FIG. 10.

In addition, the control module 170 controls overall operations of the display device 100. For example, the control module 170 may control the tuner 110 to tune RF broadcasting corresponding to the channel selected by the user or the previously stored channel.

Also, the control module 170 may control the display device 100 through a user command input through the user input interface module 150 or its internal program. In particular, the control module 170 may allow the user to access the network and download a desired application or a list of desired applications into the display device 100.

For example, the control module 170 controls the tuner 110 to input a signal of a channel selected in accordance with a predetermined channel selection command received through the user input interface module 150, and processes a video, audio or data signal of the selected channel. The control module 170 may allow the channel information selected by the user to be output through the display module 180 or the audio output module 185 together with the processed video or audio signal.

For another example, the control module 170 may allow a video signal or an audio signal from an external device, for example, camera or camcorder, which is input through the external device interface module 135, to be output through the display module 180 or the audio output module 185 in accordance with an external device video play command received through the user input interface module 150.

Also, the control module 170 may control the display device 100 through a user command input through the user input interface module 150 or its internal program. In particular, the control module 170 may allow the user to access the network and download a desired content or a list of contents into the display device 100.

In the mean time, the control module 170 may control the display module 180 to display video. For example, the control module 170 may control the display module 180 to display broadcasting image input through the tuner 110, external input image input through the external device interface module 135, image input through the network interface module, or image stored in the memory module 140. At this time, the image displayed in the display module 180 may be still image or moving image, and may be 2D image or 3D image.

In the mean time, if the control module 170 enters a contents viewing list, it may control the display module to display contents or a list of contents that can be downloaded in the display device 100 or from the external network.

Also, the control module 170 may play contents. At this time, the contents may be contents stored in the display device 100, received broadcasting contents, or externally input contents. The contents may be at least one of broadcasting image, external input image, audio files, still image, accessed web screen, and document files.

In the mean time, according to the embodiment of the present invention, the control module 170 may control the display module 180 to display a home screen in accordance with an input of movement to home screen.

The home screen may include a plurality of card objects sorted per content source. The card object may include at least one of a card object representing a thumbnail list of a broadcast channel, a card object representing a broadcast guide list, a card object representing a broadcasting reservation list or a broadcasting recording list, and a card object representing a media list within the display device or another device connected with the display device. Also, the card object may further include at least one of a card object representing a list of accessed external devices and a card object representing a list related with calls.

Also, the home screen may further include an application menu provided with at least one executable application list.

In the mean time, if there is an input of card object movement, the control module 170 may control the display module 180 to display the corresponding card object through movement or move a card object not displayed in the display module 180 to the display module 180.

If a predetermined one of a plurality of card objects in the home screen is selected, the control module 170 may control the display module 180 to display image corresponding to the corresponding card object.

In the mean time, the control module 170 may control the display module 180 to display received broadcasting image and an object representing corresponding broadcasting image information in the card object displaying broadcasting image. The control module 170 may control the broadcasting image such that the size of the broadcasting image may be fixed by lock.

The control module 170 may control the display module 180 to display a setup object for at least one of video setup, audio setup, reservation setup, pointer setup of the remote controller, and network setup in the home screen.

The control module 170 may control the display module 180 to display an object of login, help message, or exit in a part of the home screen.

The control module 170 may control the display module 180 to display an object representing the number of all card objects or representing the number of card objects displayed in the display module 180 in a part of the home screen.

In the mean time, if a card object name of a predetermined one of card objects displayed in the display module 180 is selected, the control module 170 may control the display module 180 to display the corresponding card object as the whole screen.

Also, if an incoming call signal is received in the accessed external device or the display device, the control module 170 may control the display module 180 to focus and display a call related card object of a plurality of card objects or move the call related card object into the display module 180.

In the mean time, if the control module 170 enters an application viewing list, it may display an application or a list of applications that can be downloaded in the display device 100 or from the external network.

The control module 170 may control installation or driving of the application downloaded from the external network together with various user interfaces. Also, the control module 170 may control the display module 180 to display image related to the application implemented by selection of the user.

In the mean time, according to the embodiment of the present invention, the control module 170 may include additional information manager 171.

The additional information manager 171 may generate content information of a content displayed in the image display device. In other words, the additional information manager 171 may extract a content name, broadcasting station information, time information and cast member information of a content currently in service in the image display device, from the EPG information included in the broadcast signal.

Also, the additional information manager 171 may generate location information of the image display device. In other words, the additional information manager 171 may recognize the current location of the image display device through a global positioning system (GPS) module or a location information module provided in the image display device, and may generate location information based on the recognized location.

Also, the control module 170 may transmit the content information generated by the additional information manager 171 to the server connected to the network through the network interface module 130, receive real time channel search list data from the server and display a real time channel search list based on the received data in the display module 180.

Also, the control module 170 may transmit the location information generated by the additional information manager 171 to the server through the network interface module 130 together with the content information and display the real time channel search list corresponding to the location information in the display module 180.

Also, the control module 170 may include advertisement data transmitted from the server through the network interface module 130 in the real time channel search list displayed in the display module 180.

Also, if a content is displayed in the image display device, the control module 170 may receive a channel search signal, which includes a channel search condition, through the user interface module 150, search for a channel corresponding to the search condition on the network through the network interface module 130, display a channel list based on the searched result in the display module 180, receive any one or more channel selection signals included in the searched channel list through the user interface module 150, and display a content of a channel corresponding to the selection signal in the display module 180. Accordingly, the data collected in the image display device during the above search procedure may be transmitted to the server connected to the network, whereby the data may be a base for generating the real time channel search list.

Also, the control module 170 may display EPG information, which is transmitted by being included in the broadcast signal, in the display module 180, and may further display priority information based on the transmitted data together with the displayed EPG information.

Also, the control module 170 may search whether each contents list included in the real time channel search list is currently available in the image display device, through the network interface module 130, and may display an unavailable contents list differently from the available contents list based on the searched result. An example of displaying the unavailable contents list differently from the available contents list will be described later with reference to FIG. 26.

Also, the control module 170 may receive any one or more selection signals from the contents list included in the real time channel search list, through the user interface module 150, and may display detailed information corresponding to the selected contents list. The display screen will be described later with reference to FIG. 27.

Also, the control module 170 may search for watching level control information previously set in the image display device, determine whether each contents list included in the real time channel search list is matched with the watching level control information, delete the contents list, which is not matched with the watching level control information, based on the determined result, and display the real time channel search list.

Also, the control module 170 may search for update cycle information which is previously set in the image display device, and may again receive the real time channel search list data from the server based on the searched update cycle information to update the real time channel search list.

In the mean time, although not shown, a channel browsing processor that generates thumbnail image corresponding to a channel signal or external input signal may further be provided.

The channel browsing processor extracts image from the stream signal (TS) output from the demodulation module 120 or the stream signal output from the external device interface module 135 to generate thumbnail image. The thumbnail image may be input to the control module 170 as it is or encoded. Also, the generated thumbnail image may be encoded in a stream format and then input to the control module 170. Therefore, the control module 170 may display a thumbnail list that includes a plurality of thumbnail images, by using the input thumbnail image. The thumbnail images of the thumbnail list may be updated in due order or at the same time. Then, the user can simply recognize contents of a plurality of broadcast channels.

According to the embodiment of the present invention, for synchronization of contents of the display device, if contents for synchronization and a selection signal of the display device for synchronization are received from the user through the user input interface module 150, the control module 170 transmits the selection signal to a predetermined server through the network interface module 130. If a comparison result of the list of contents is received from the server, the control module 170 transmits the contents corresponding to the comparison result to the server.

According to another embodiment of the present invention, if contents for synchronization are received from the predetermined server through the network interface module 130, the control module 170 outputs a list of the received contents through the display module 180. If a synchronization confirmation command for the received contents is input from the user through the user input interface module 150, the control module 170 controls the memory module 140 to update the list of contents of the memory module 140.

Also, if contents for synchronization are received from the predetermined server through the network interface module 130, the control module 170 outputs a notification message to a predetermined zone of the display module 180. If a confirmation command for the received contents is input from the user through the user input interface module 150, the control module 170 controls the display module 180 to output a list of the received contents.

Also, the control module 170 may control the display module 180 to output the notification message together with image data corresponding to the received contents or information on the number of the received contents.

The control module 170 may control the memory module 140 such that the list of the received contents may additionally include contents previously stored in the memory module 140. Also, the control module 170 may control the display module to respectively display the received contents and the contents previously stored in the memory module.

According to another embodiment of the present invention, if a content search keyword and a selection signal of the display device for search are received from the user through the user input interface module 150, the control module 170 transmits the received search information to a predetermined server through the network interface module 130 and receives the search result from the server through the network interface module 130.

The display module 180 converts the video, data and OSD signals processed by the control module 170 or the video and data signals received from the external device interface module 135 to R, G, B signals, respectively, to generate driving signals.

Examples of the display module 180 may include PDP, LCD, OLED, flexible display, and 3D display.

In the mean time, a touch screen may be used as the display module 180, whereby the display module may be used as an input module as well as an output module.

According to the embodiment of the present invention, the display module 180 may output a user interface that includes contents or a list of contents for synchronization, which are stored in the memory module 140 for synchronization and search of contents, a contents synchronization menu, a synchronization notification message, and a contents search menu.

The audio output module 185 receives the signal audio-processed by the control module 170, for example, stereo signal, 3.1 channel signal or 5.1 channel signal, and outputs the received signal as sound. Various types of speakers may be used as the audio output module 185.

In the mean time, to sense gesture of the user, the display device 100 may further include a sensing unit (not shown) that includes at least one of a touch sensor, an audio sensor, a position sensor, and an action sensor, as described above. The signal sensed by the sensing unit may be transmitted to the control module 170 through the user input interface module 150.

The display device 100 may further include a camera module (not shown) that takes a user. Image information taken by the camera module may be input to the control module 170.

The control module 170 may sense gesture of the user by using the image taken from the camera module (not shown) and the signal sensed from the sensing unit, respectively or in combination.

The power supply module 190 supplies the corresponding power to the whole portion of the display device 100.

In particular, the power supply module 190 can supply the power to the control module 170 that can be implemented in the form of a system on chip (SOC), the display module 180 for image display, and the audio output module 185 for audio output.

To this end, the power supply module 190 may further include a converter (not shown) that converts alternating current to direct current. In the mean time, if the display module 180 is implemented as a liquid crystal panel that includes a plurality of back light lamps, for example, for luminance variable or dimming driving, the power supply module 190 may further include an inverter (not shown) that enables PWN operation.

The remote controller 200 transmits a user input to the user input interface module 150. To this end, the remote controller 200 can use Bluetooth, Radio Frequency (RF) communication, infrared (IR) communication, Ultra Wideband (UWB), ZigBee, etc.

Also, the remote controller 200 can receive the video, audio or data signal output from the user input interface module 150 to display the received signal or output audio or vibration.

The aforementioned display device 100 may be a fixed type digital broadcast receiver that can receive at least one of digital broadcasting of ATSC mode (8-VSB mode), digital broadcasting of DVB-T mode (COFDM mode), and digital broadcasting of ISDB-T mode (BST-OFDM mode).

In the mean time, the block diagram illustrated in FIG. 2 is for one embodiment of the present invention. The respective elements of the block diagram may be incorporated, added or omitted depending on options of the display device 100 which is actually implemented. In other words, two or more elements may be incorporated into one element, or one element may be divided into two or more elements, as occasion demands. Also, the function performed by each block is intended for description of the embodiment of the present invention, and its detailed action or device does not limit claims of the present invention.

In the mean time, unlike the embodiment illustrated in FIG. 6, the display device 100 may receive and play video contents through the network interface module 130 or the external device interface module 135 without the tuner 110 and the demodulation module 120 illustrated in FIG. 6.

The display device 100 is an example of a video processor that performs signal processing of video stored therein or input video. Another examples of the video signal processor include a set-top box that excludes the display module 180 and the audio output module 185 illustrated in FIG. 6, the aforementioned DVD player, a blu-ray player, a game device, and a computer. Hereinafter, the set-top box will be described with reference to FIG. 7 and FIG. 8.

Figure 7:
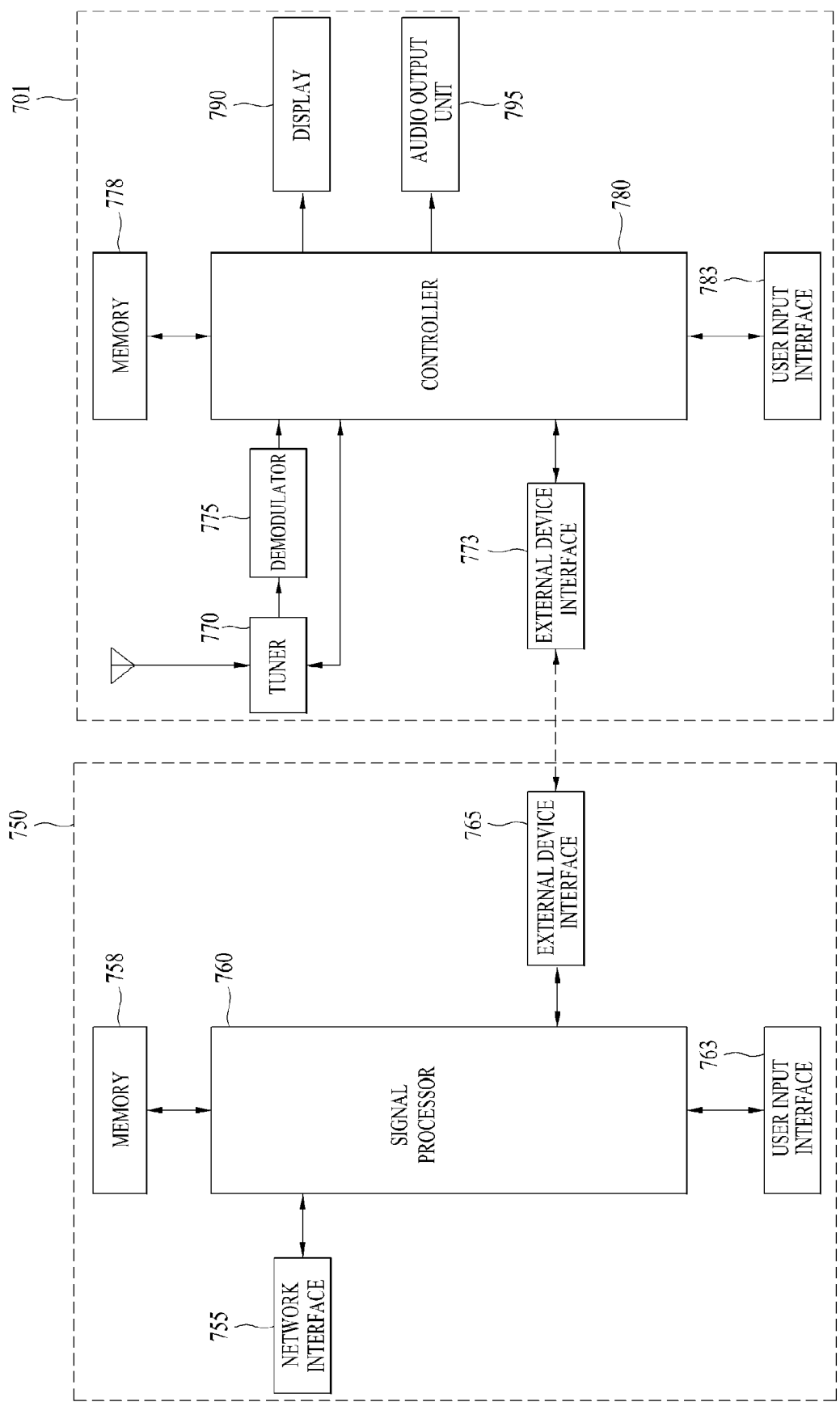
FIG. 7 and FIG. 8 are diagrams illustrating that any one of display devices according to the embodiments of the present invention is divided into a set-top box and a displayer.
Figure 8:
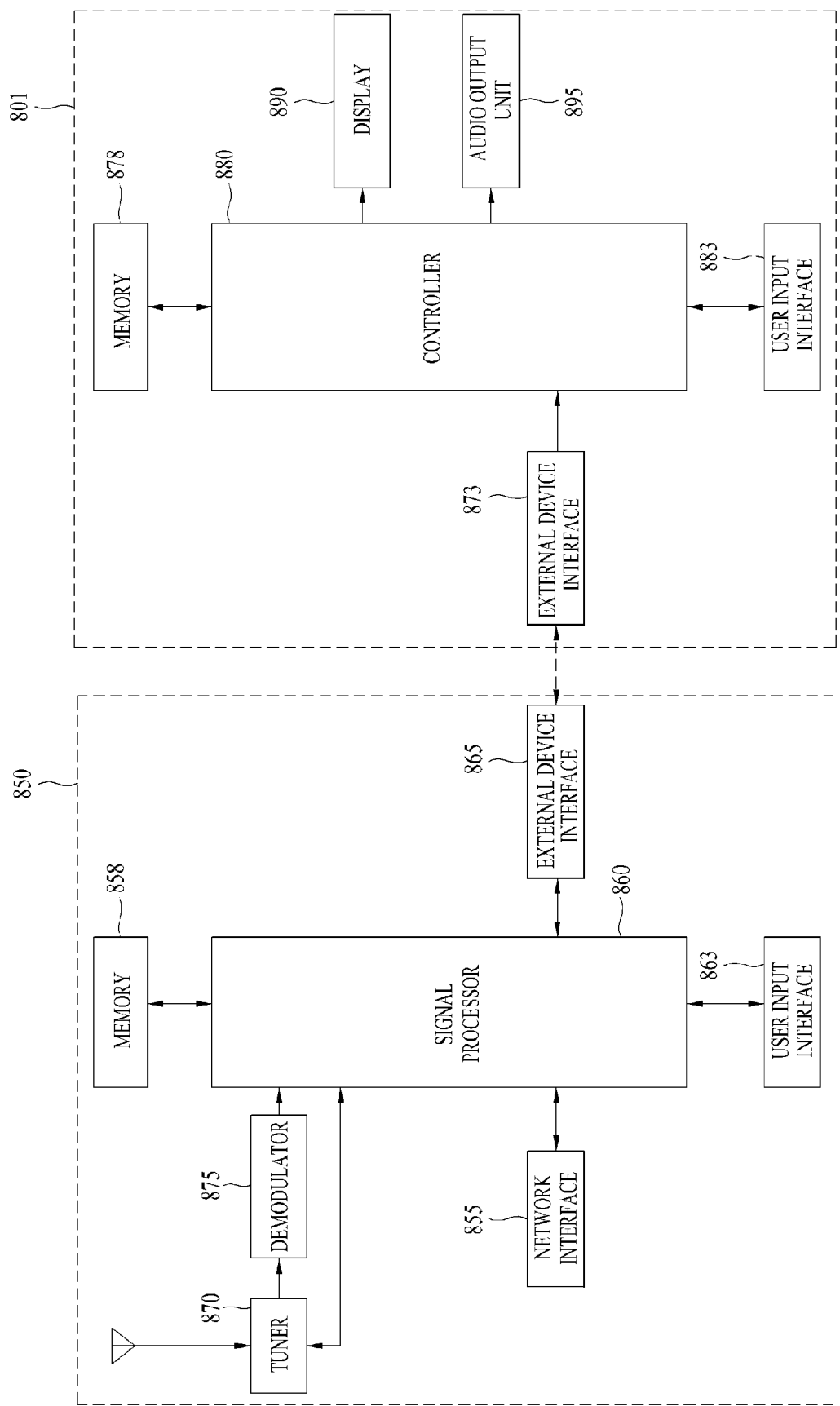

FIG. 7 and FIG. 8 are diagrams illustrating that any one of display devices according to the embodiments of the present invention is divided into a set-top box and a displayer.

First of all, referring to FIG. 7, a set-top box 250 and a displayer 300 can transmit or receive data through a wire or wireless cable.

The set-top box 250 includes a network interface module 255, a memory module 258, a signal processor 260, a user input interface module 263, and an external device interface module 265.

The network interface module 255 provides an interface for connection with wire/wireless network including Internet network. Also, the network interface module 255 transmits or receives data to and from other users or other electronic devices through a network connected thereto or another network linked on the connected network.

The memory module 258 may store a program for processing and controlling each signal of the signal processor 260, or may temporarily store the video, audio or data signal input from the external device interface module 265 or the network interface module 255. Also, the memory module 258 may store a platform illustrated in FIG. 11 and FIG. 12 which will be described later.

The signal processor 260 performs signal processing of an input signal. For example, the signal processor 260 may demultiplex or decode the input video signal, or may demultiplex or decode the input audio signal. To this end, the signal processor 260 may further include a video decoder or an audio decoder. The video signal or audio signal subjected to signal processing can be transmitted to the displayer 300 through the external device interface module 265.

The user input interface module 263 transmits the signal input by the user to the signal processor 260 or transmits the signal from the signal processor 260 to the user. For example, the user input interface module 263 may receive various control signals such as power on/off, action input and setup input, which are input by a local key (not shown) or a remote controller 200, to transmit the control signals to the signal processor 260.

The external device interface module 265 provides an interface for transmitting or receiving data to and from an external device connected thereto through a wire or wireless cable. In particular, the external device interface module 265 provides an interface for transmitting or receiving data to and from the displayer 300. In addition, the external device interface module 265 may provide an interface for transmitting or receiving data to and from external devices such as game devices, cameras, camcorders, computers (e.g., notebook computers), etc.

In the mean time, the set-top box 250 may further include a media input module (not shown) for playing separate media. An example of the media input module includes a blu-ray input module (not shown). In other words, the set-top box 250 may include a blu-ray player. Media of the input blu-ray disk are subjected to signal processing such as demultiplexing or decoding by the signal processor 260 and then transmitted to the displayer 300 through the external device interface module 265, whereby the media are displayed in the displayer 300.

The displayer 300 includes a tuner 270, an external device interface module 273, a demodulation module 275, a memory module 278, a control module 280, a user input interface module 283, a display module 290, and an audio output module 295.

Since the tuner 270, the demodulation module 275, the memory module 278, the user input interface module 283, the display module 290, and the audio output module 295 correspond to the tuner 110, the demodulation module 120, the memory module 140, the user input interface module 150, the display module 180, and the audio output module 185, which are illustrated in FIG. 6, their description will be omitted.

In the mean time, the external device interface module 273 provides an interface for transmitting or receiving data to and from an external device connected thereto through a wire or wireless cable. In particular, the external device interface module 273 provides an interface for transmitting or receiving data to and from the set-top box 250.

Accordingly, the video signal or audio signal input through the set-top box 250 is output to the display module 180 or the audio output module 185 through the control module 170.

In the mean time, referring to FIG. 8, the set-top box 250 and the displayer 300 are similar to those illustrated in FIG. 7 but are different from those illustrated in FIG. 7 in that the tuner 270 and the demodulation module 275 are located in the set-top box 250 not the displayer 300. Hereinafter, the set-top box 250 and the displayer 300 of FIG. 8 will be described based on the difference from FIG. 7.

The signal processor 260 performs signal processing of a broadcast signal received through the tuner 270 and the demodulation module 275. Also, the user input interface module 263 receives an input signal of channel selection, channel storage, etc.

Figure 9:
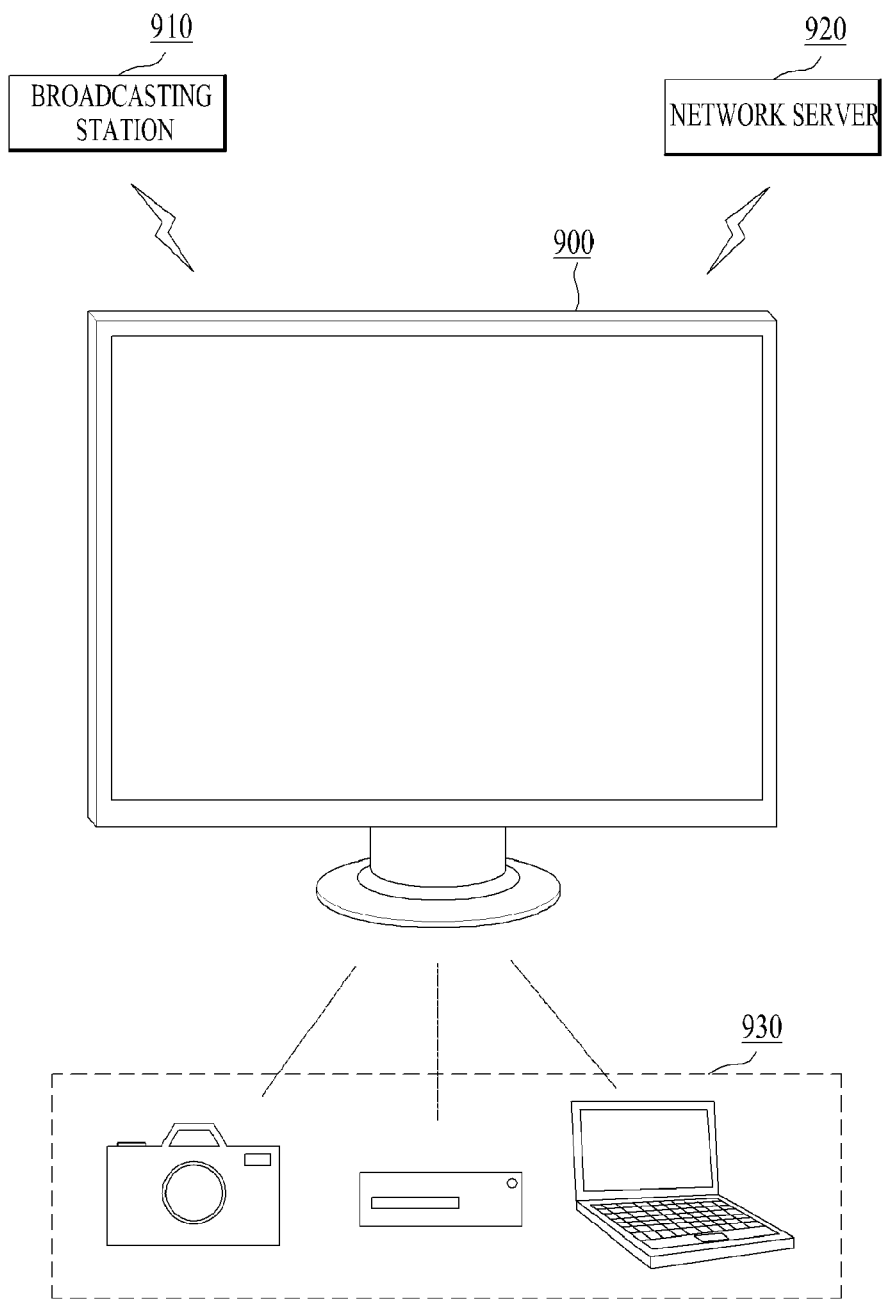
FIG. 9 is a diagram illustrating a communication procedure between any one of display devices according to the embodiments of the present invention and third devices.

FIG. 9 is a diagram illustrating a communication procedure between any one of display devices according to the embodiments of the present invention and third devices. The display device illustrated in FIG. 9 may correspond to any one of the display devices according to the aforementioned embodiments of the present invention.

As illustrated in FIG. 9, the display device 100 according to one embodiment of the present invention can perform communication with a broadcasting station 210, a network server 220, or an external device 230.

The display device 100 receives a broadcast signal that includes a video signal transmitted from the broadcasting station 210. The display device 100 processes the video signal included in the broadcast signal and audio or data signal to be appropriately output from the display device 100. The display device 100 outputs video or audio based on the processed signal.

In the mean time, the display device 100 can perform communication with the network server. The network server 220 can transmit and receive a signal to and from the display device 100 through a random network. For example, the network server 220 may be a portable terminal that can be connected with the display device 100 through a wire or wireless base station. Also, the network server 220 may be a device that can provide contents to the display device 200 through Internet network. The content provider can provide contents to the display device by using the network server.

The display device 100 can perform communication with the external device 230. The external device 230 can directly transmit and receive a signal to and from the display device 100 through a wire or wireless cable. For example, the external device 230 may be a media memory device or a media player, which is used by the user. In other words, the external device 230 corresponds to a camera, a DVD player, a blu-ray player, or a personal computer.

The broadcasting station 210, the network server 220 or the external device 230 can transmit a signal, which includes a video signal, to the display device 100. The display device 100 can display video based on the video signal included in the input signal. Also, the display device 100 can transmit the signal, which is transmitted from the broadcasting station 210 or the network server 220 to the display device 100, to the external device 230. Also, the display device 100 can transmit the signal, which is transmitted from the external device 230 to the display device 100, to the broadcasting station 210 or the network server 220. In other words, the display device 100 serves to directly play and transmit the contents included in the signal transmitted form the broadcasting station 210, the network server 220 and the external device 230.

Figure 10:
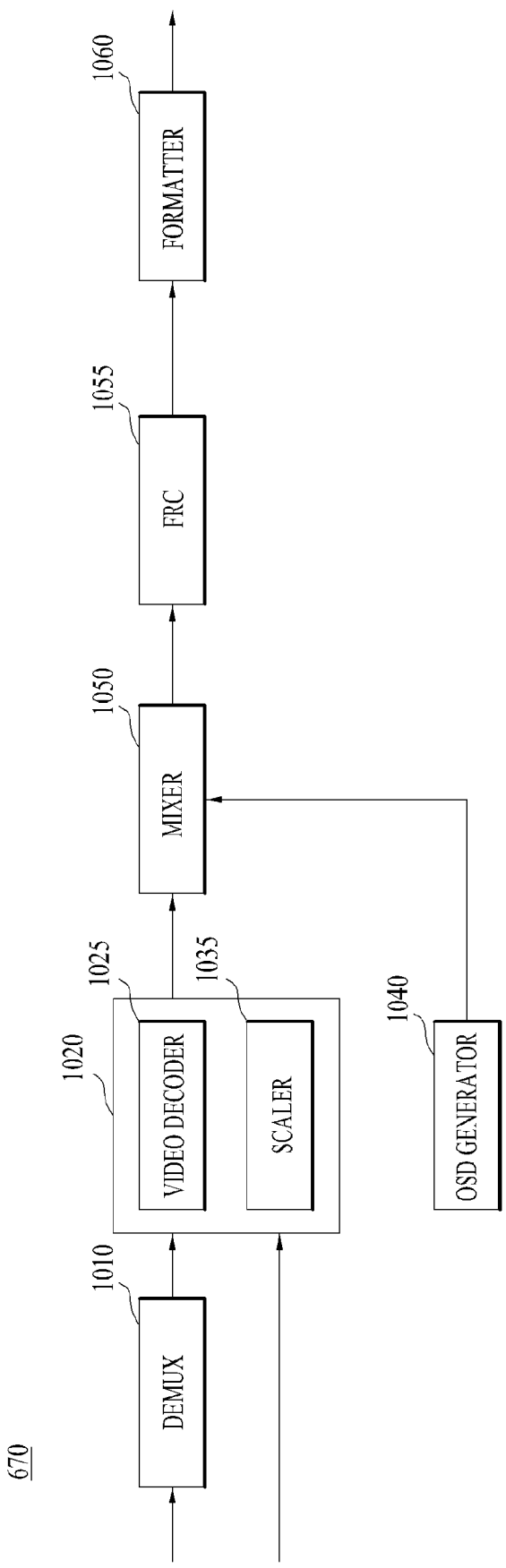
FIG. 10 is a block diagram illustrating the inside of a control module illustrated in FIG. 6.

FIG. 10 is a block diagram illustrating the inside of a control module illustrated in FIG. 6. Hereinafter, the control module will be described with reference to FIG. 10 and FIG. 6.

The control module 170 includes a demultiplexer 310, a video processor 320, an OSD generator 340, a mixer 350, a frame rate converter 355, and a formatter 360. The control module 170 may further include an audio processor (not shown) and a data processor (not shown).

The demultiplexer 310 demultiplexes input streams. For example, if MPEG-2 TS is input, the demultiplexer 310 demultiplexes the MPEG-2 TS and splits the demultiplexed MPEG-2 TS into a video signal, an audio signal and a data signal. In this case, the stream signal input to the demultiplexer 310 may be the stream signal output from the tuner 110, the demodulation module 120, or the external device interface module 135.

The video processor 320 can process the demultiplexed video signal. To this end, the video processor 320 includes a video decoder 325 and a scaler 335.

The video decoder 325 decodes the demultiplexed video signal, the scaler 335 performs scaling to output resolution of the decoded video signal through the display module 180.

The video decoder 325 may include decoders having various specifications.

For example, if the demultiplexed video signal is an encoded video signal of the MPEG-2 specification, it may be decoded by an MPEG-2 decoder.

Also, for example, if the demultiplexed video signal is an encoded video signal of the H.264 specification based on a Digital Multimedia Broadcasting (DMB) mode or DVB-H mode, it may be decoded by an H.264 decoder.

In the mean time, the video signal decoded by the video processor 320 is input to the mixer 350.

The OSD generator 340 generates an OSD signal in accordance with input of the user or by itself. For example, the OSD generator 340 may generate a signal for displaying various kinds of information on the screen of the display module 180 in the form of graphic or text based on the control signal from the user input interface module 150. The generated OSD signal may include various data such as a user interface screen of the display device 100, a screen of various menus, widget, and icon.

For example, the OSD generator 340 may generate a signal for displaying broadcast information based on EPG or caption of broadcast video.

The mixer 350 mixes the OSD signal generated by the OSD generator 340 with the decoded video signal processed by the video processor 220. The mixed signal is provided to the formatter 360. As the decoded broadcast video signal or the external input signal is mixed with the OSD signal, the OSD may be overlaid on the broadcast video or the external input video.

The frame rate converter (FRC) 355 converts a frame rate of the input video. For example, the frame rate converter 355 converts a frame rate of 60 Hz to a frame rate of 120 Hz or 240 Hz. If the frame rate converter 355 converts the frame rate of 60 Hz to the frame rate of 120 Hz, a first frame may be inserted between another first frame and the second frame, or a third frame predicted from the first frame and the second frame may be inserted between the first frame and the second frame. If the frame rate converter 355 converts the frame rate of 60 Hz to the frame rate of 240 Hz, three same frames may be inserted between another first frame and the second frame, or the third frame predicted from the first frame and the second frame may be inserted between the first frame and the second frame. In the mean time, the input frame rate may be maintained without separate conversion.

The formatter 360 receives an output signal of the frame rate converter 355, changes a format of the signal to conform to the display module 180, and then outputs the changed format. For example, the formatter 360 may output R, G, B data signals. The R, C, B data signals may be output by low voltage differential signaling (LVDS) or mini-LVDS.

In the mean time, the audio processor (not shown) in the control module 170 may perform audio processing of the demultiplexed audio signal. To this end, the audio processor may include various decoders.

If the demultiplexed audio signal is an encoded audio signal, the audio processor in the control module 170 may decode the encoded audio signal. For example, the demultiplexed audio signal may be decoded by an MPEG-2 decoder, MPEG-4 decoder, AAC decoder, or AC-3 decoder.

Also, the audio processor in the control module 170 can process base, treble and sound volume control.

The data processor (not shown) in the control module 170 can perform data processing of the demultiplexed data signal. If the demultiplexed data signal is an encoded data signal, the data processor in the control module 170 may decode the encoded data signal. The encoded data signal may be electronic program guide (EPG) information that includes broadcast information such as start time and end time of a broadcast program broadcasted from each channel. For example, the EPG information may be ATSC-Program and System information protocol (ATSC-PSIP) information in case of the ATSC mode, and may include DVB-Service Information (DVB-SI) in case of the DVB mode.

The ATSC-PSIP information or the DVB-SI information may be information included in the aforementioned stream, i.e., a header (4 byte) of the MPEG-2 TS.

In the mean time, since the block diagram of the control module 170 illustrated in FIG. 10 is for one embodiment of the present invention, other modules may be added to the respective elements of the block diagram in accordance with the needs of those skilled in the art, or some of the modules or elements illustrated in FIG. 10 may be omitted.

Figure 11:
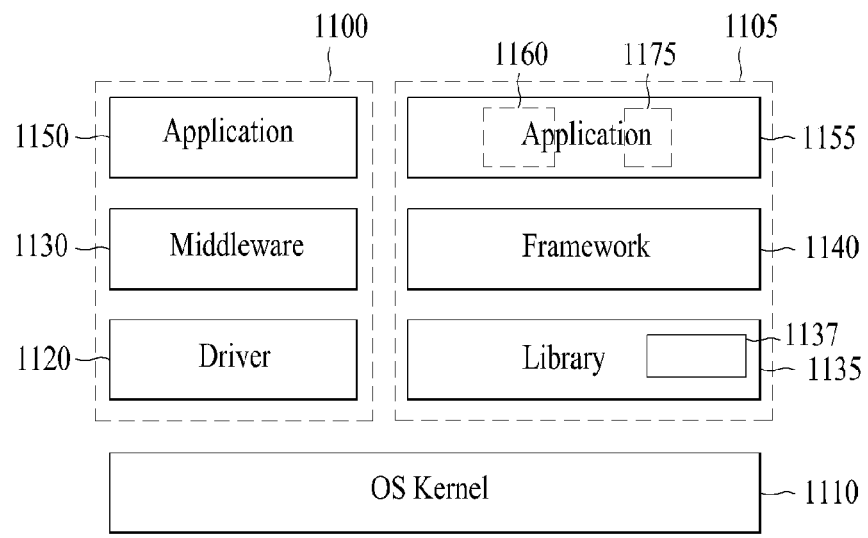
FIG. 11 is a diagram illustrating an example of a platform structure of any one of display devices according to the embodiments of the present invention.

FIG. 11 is a diagram illustrating an example of a platform structure of any one of display devices according to the embodiments of the present invention.

Figure 12:
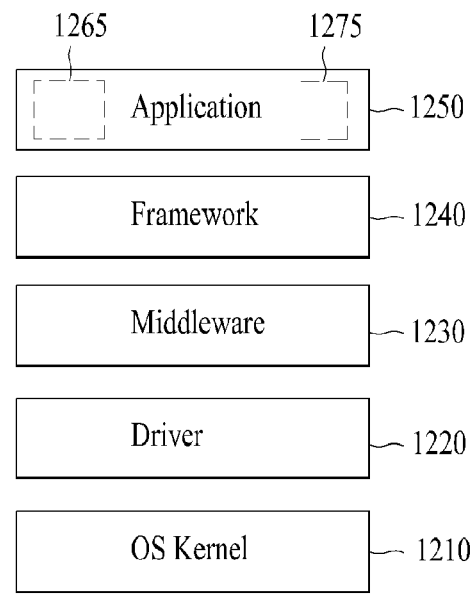
FIG. 12 is a diagram illustrating another example of a platform structure of any one of display devices according to the embodiments of the present invention.

FIG. 12 is a diagram illustrating another example of a platform structure of any one of display devices according to the embodiments of the present invention.

A platform of any one of the display devices according to the embodiments of the present invention may include OS based software to perform the aforementioned various operations.

First of all, referring to FIG. 11, a platform of any one of the display devices according to the embodiments of the present invention is a split type platform and can be designed in such a manner that it is split into a legacy system platform 400 and a smart system platform 405. An OS kernel 410 may be used in common for the legacy system platform 400 and the smart system platform 405.

The legacy system platform 400 includes a driver 420 on the OS kernel 410, a middleware 430, and an application layer 450.

The smart system platform 405 includes a library 435 on the OS kernel 410, a framework 440, and an application layer 455.

The OS kernel 410 is a core of the operating system, and can perform at least one of driving of a hardware driver, security of hardware and processor in the display device, efficient management of system resources, memory management, interface for hardware based on hardware abstraction, multi-process, and schedule management based on multi-process when the display device is driven. In the mean time, the OS kernel 410 may further perform power management.

The hardware driver in the OS kernel 410, for example, may include a display driver, a Wi-Fi driver, a Bluetooth driver, a USE driver, an audio driver, a power manager, a binder driver, and a memory driver.

Also, the hardware driver in the OS kernel 410 may further include a character device driver, a block device driver, and a network device driver as drivers for hardware devices therein. The block device driver may need a buffer equivalent to unit size in accordance with data transmission of a specific block unit. The character device driver may not need a buffer due to data transmission in a basic data unit, i.e., character unit.

As described above, the OS kernel 410 can be implemented as the kernel based on various operating systems such as unix (linux) based operating system and window based operating system. Also, the OS kernel 410 is an opened OS kernel, and can be used generally by other electronic devices.

The driver 420 is located between the OS kernel 410 and the middleware 430, and drives the device for operation of the application layer 450 together with the middleware 430. For example, the driver 420 may include drivers such as a micom in the display device, a display module, a graphic processing unit (GPU), a frame rate converter (FRC), a general purpose input/output pin (GPIO), HDMI, system decoder or demultiplexer (SDEC), video decoder (VDEC), audio decoder (ADEC), a personal video recorder (PVR), and an inter-integrated circuit (I2C). These drivers interact with the hardware driver in the OS kernel 410.

Also, the driver 420 may further include a driver of a remote controller 200, especially a spatial remote controller which will be described later. The driver of the spatial remote controller may be provided in the OS kernel 410 or the middleware 430 in addition to the driver 420.

The middleware 430 is located between the OS kernel 410 and the application layer 450, and serves as a medium that allows data to be exchanged between hardware and software. In this case, a standardized interface can be provided, various environments can be supported, and mutual interaction between tasks of different systems can be performed.

Examples of the middleware 430 in the legacy system platform 400 include data broadcasting related middleware, i.e., multimedia and hypermedia information coding experts group (MHEG) middleware and advanced common application platform (ACAP) middleware, broadcast information related middleware, i.e., PSIP middleware and SI middleware, and peripherals communication related middleware, i.e., DLNA middleware.

The application layer 450 on the middleware 430, namely the application layer 450 in the legacy system platform 400 may include a user interface application on various menus in the display device. The application layer 450 on the middleware 430 can be edited by selection of the user, and can be updated through the network. This application layer 450 enables the user to input a desired menu of various user interfaces in accordance with input of the remote controller during viewing broadcasting image.

Also, the application layer 450 in the legacy system platform 400 may further include at least one of TV guide application, Bluetooth application, reservation application, digital video recorder (DVR) application, hot key application.

In the mean time, the library 435 in the smart system platform 405 is located between the OS kernel 410 and the framework 440, and can form the base of the framework 440. For example, the library 435 includes security library, web engine library and media library, wherein the security library includes secure socket layer (SSL), the web engine library includes WebKit, libc (c library), and video and audio formats, and the media library includes media framework. The library 435 can be made based on C or C++, and can be exposed to a developer through the framework 440.

The library 435 may include a runtime 437 that includes a core Java library and a virtual machine (VM). The runtime 437 forms the base of the framework 440 together with the library 435.

The virtual machine (VM) may be a virtual machine that enables a plurality of instances, i.e., multi-tasking. The virtual machine (VM) may be allocated in accordance with each application in the application layer 455. At this time, for schedule adjustment and interconnection between the plurality of instances, the binder driver (not shown) in the OS kernel 410 may be driven.

In the mean time, the binder driver and the runtime 437 can connect java based application with C based library.

The binder driver and the runtime 437 can correspond to middleware of the legacy system.

The framework 440 in the smart system platform 405 includes a program based on the application in the application layer 455. The framework 440 is compatible with any one of the applications and enables reuse, movement or exchanges of components. The framework 440 may include a support program, and a program that compiles other software elements. For example, the framework 440 may include a resource manager, an activity manager related to activities of the application, a notification manager, and a content provider for briefing of information shared between the applications. The framework 440 can be made based on JAVA.

The application layer 455 on the framework 440 includes various programs that can be driven and displayed in the display device 100. For example, the application layer 455 may include core application that includes at least one of email, short message service (SMS), calendar, map, and browser. This application layer 455 can be made based on JAVA.

Also, the application layer 455 can be divided into application 465 that can be stored in the display device 100 and cannot be deleted by the user and application 475 that can be downloaded through the external device or network and can freely be installed or deleted by the user.

Internet phone service, video on demand (VOD) service, web album service, social networking service (SNS), location based service (LBS), map service, web search service and application search service may be performed by network access through the application in the application layer 455. Also, various functions such as games and schedule management may be performed through the application in the application layer 455.

In the mean time, referring to FIG. 12, a platform of any one of the display devices according to the embodiments of the present invention is an integrated type platform and includes an OS kernel 510, a driver 520, a middleware 530, a framework 540, and an application layer 550.

The platform of FIG. 12 is different from that of FIG. 11 in that the library 435 illustrated in FIG. 11 is omitted and the application layer 550 is an integrated layer. The driver 520 and the framework 540 correspond to those of FIG. 11.

In the mean time, the platform of FIG. 12 can be designed such that the library 435 illustrated in FIG. 11 is incorporated into the middleware 530 illustrated in FIG. 12. In other words, the middleware 530 includes legacy system middleware and display system middleware. The legacy system middleware may include data broadcasting related middleware, i.e., multimedia and hypermedia information coding experts group (MHEG) middleware and advanced common application platform (ACAP) middleware, broadcast information related middleware, i.e., PSIP middleware and SI middleware, and peripherals communication related middleware, i.e., DLNA middleware. The display system middleware may include security library, web engine library and media library, wherein the security library includes secure socket layer (SSL), the web engine library includes WebKit, libc, and the media library includes media framework. The display system middleware may further include runtime described above.

The application layer 550 in the legacy system may include menu application, TV guide application, and reservation application while the application layer 55 in the display system may include email, short message service (SMS), calendar, map, and browser.

In the mean time, the application layer 550 may be divided into application 565 that can be stored in the display device 100 and cannot be deleted by the user and application 575 that can be downloaded through the external device or network and can freely be installed or deleted by the user.

In the mean time, based on the aforementioned platforms of FIG. 11 and FIG. 12, various API (Application Programming Interface) and SDK (Software Development Kit) can be opened for an application development. In the future or present time. Moreover, API can be implemented by calling the function that provides a connection to specific subroutine for implementation in a program.

For example, Those API and SDK can be opened by a source involved with hardware driver in OS kernel 410 such as display driver, Wi-fi driver, Bluetooth driver, USB driver, Audio driver, and so on. According to other embodiment of the present invention, those API and SDK can be opened by a related source in a driver 420 such as a micom in the display device, a display module, a graphic processing unit (GPU), a frame rate converter (FRC), system decoder or demultiplexer (SDEC), video decoder (VDEC), audio decoder (ADEC), a spatial remote controller and so on. According to another embodiment of the present invention, those API and SDK can be opened by a related source such as PSIP involved with broadcasting information, SI middleware or DLNA middleware.

Any developers can develop at least one of application that is used for display device 100 control or ran in display device 100 based on the aforementioned platforms of FIG. 11 and FIG. 12 by using those various open API.

The aforementioned platforms of FIG. 11 and FIG. 12 can be used generally for various electronic devices as well as the display device. In the mean time, the platforms of FIG. 11 and FIG. 12 may be stored or loaded in the memory module 140 or the control module 170 illustrated in FIG. 6 or a separate processor (not shown). Also, the platforms of FIG. 11 and FIG. 12 may be stored or loaded in the SI&Metadata DB 711, the UI manager 714 or the service manager 713 illustrated in FIG. 7. Also, a separate application processor (not shown) for implementing application may further be provided.

Figure 13:
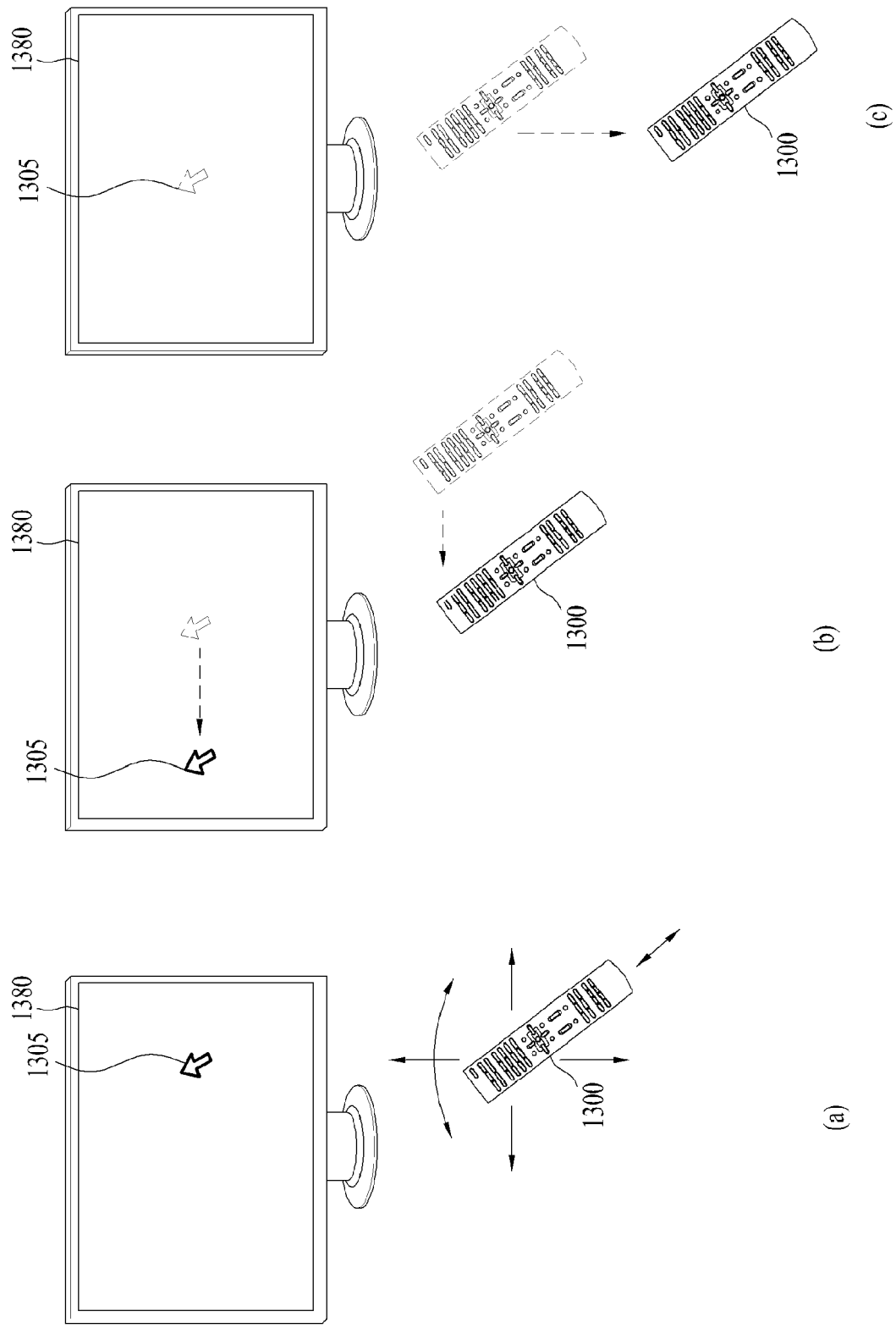
FIG. 13 is a diagram illustrating a method for controlling a remote controller that controls any one of display devices according to the embodiments of the present invention.

FIG. 13 is a diagram illustrating a method for controlling a remote controller that controls any one of display devices according to the embodiments of the present invention.

As illustrated in (a) of FIG. 13, a pointer 205 corresponding to the remote controller 200 is displayed in the display module 180.

The user can move or rotate the remote controller 200 in up and down direction and left and right direction (b of FIG. 13) and in front and rear direction (c of FIG. 13). The pointer 205 displayed in the display module 180 of the display device corresponds to movement of the remote controller 200. Since the remote controller 200 moves to the corresponding pointer 205 in accordance with movement on 3D space as shown, it may be referred to as a spatial remote controller.

(b) of FIG. 13 illustrates that, if the user moves the remote controller 200 to the left, the pointer 205 displayed in the display module 180 of the display device moves to the left correspondingly.

Information on movement of the remote controller 200, which is sensed by a sensor of the remote controller 200, is transmitted to the display device. The display device can obtain a coordinate of the pointer 205 from the information on movement of the remote controller 200. The display device can display the pointer 205 to correspond to the above coordinate.

(c) of FIG. 13 illustrates that the user moves the remote controller 200 to be far away from the display module 180 in a state that the user pushes a specific button of the remote controller 200. In this case, a zone selected in the display module 180 corresponding to the pointer 205 is displayed through zoom-in. On the contrary, if the user moves the remote controller 200 to be close to the display module 180, the zone selected in the display module 180 corresponding to the pointer 205 is displayed through zoom-out. In the mean time, if the remote controller 200 becomes far away from the display module 180, the selected zone may be subjected to zoom-out. If the remote controller 200 becomes close to the display module 180, the selected zone may be subjected to zoom-in.

In the mean time, in a state that the specific button of the remote controller 200 is pushed, up and down movement and left and right movement may not be recognized. In other words, if the remote controller 200 moves to be far away from or close to the display module 180, front and rear movement may be recognized only without recognition of up and down movement and left and right movement. In a state that the specific button of the remote controller 200 is not pushed, the pointer 205 is only moved in accordance with up and down movement and left and right movement of the remote controller 200.

Movement speed or movement direction of the pointer 205 may correspond to that of the remote controller 200.

In this specification, the pointer means an object displayed in the display module 180 to correspond to action of the remote controller 200. Accordingly, in addition to an arrow shape illustrated by the pointer 205, various shaped objects may be provided. For example, examples of the pointer may include dot, cursor, prompt, and thick outline. The pointer may be displayed to correspond to any one point of a horizontal axis and a vertical axis on the display module 180, or may be displayed to correspond to a plurality of points such as line and surface.

Figure 14:
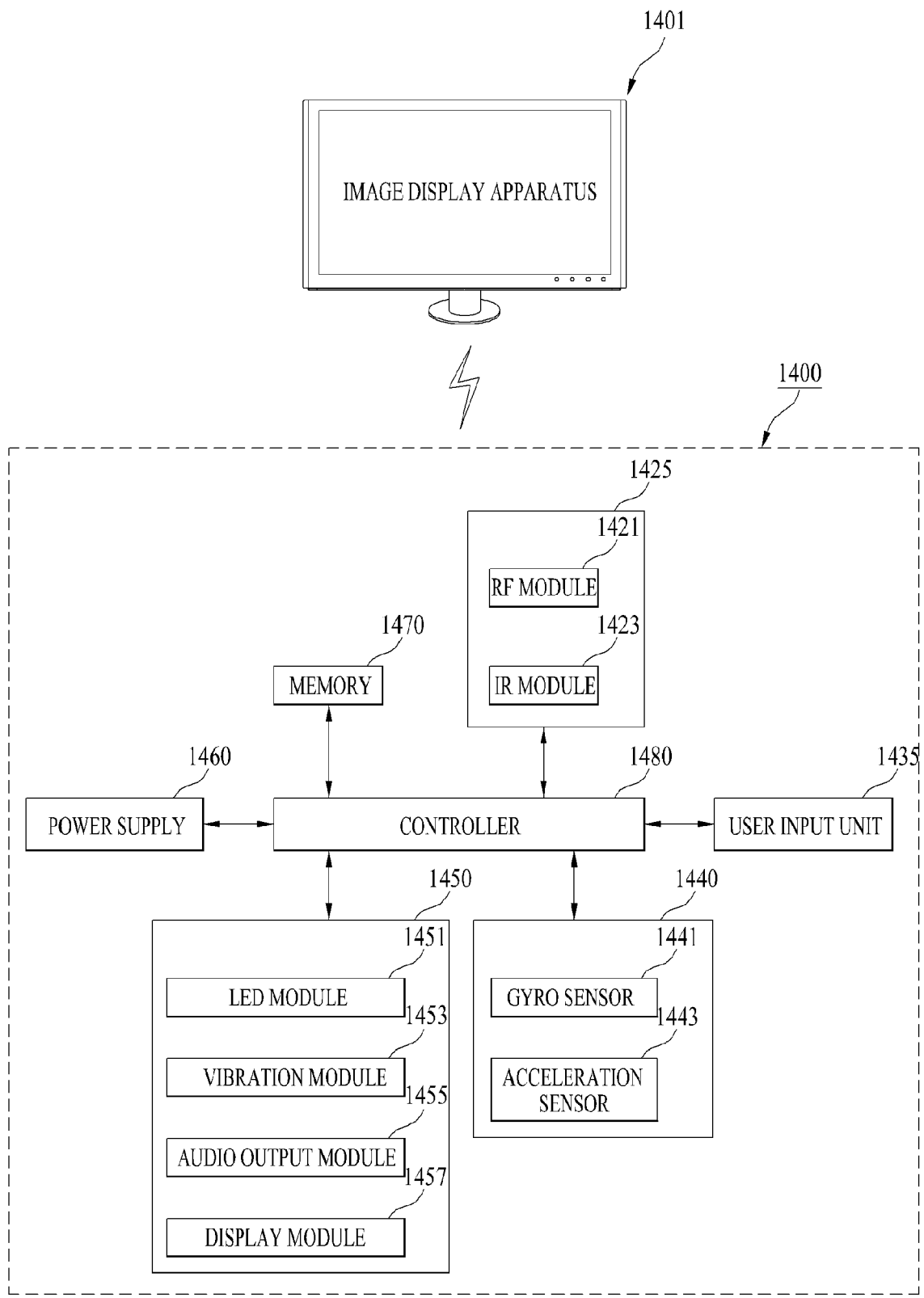
FIG. 14 is a block diagram illustrating the inside of a remote controller that controls any one of display devices according to the embodiments of the present invention.

FIG. 14 is a block diagram illustrating the inside of a remote controller that controls any one of display devices according to the embodiments of the present invention.

Referring to FIG. 14, the remote controller 200 includes a wireless communication module 225, a use input module 235, a sensor module 240, an output module 250, a power supply module 260, a memory module 270, and a control module 280.

The wireless communication module 225 transmits and receives a signal to and from any one of the aforementioned display devices according to the embodiments of the present invention. One 100 of the display devices according to the embodiments of the present invention will be described exemplarily.

In this embodiment, the remote controller 200 may include RF module 221 that can transmit and receive a signal to and from the display device 100 in accordance with the RF communication standard. The remote controller 200 may further include IR module 223 that can transmit and receive a signal to and from the display device 100 in accordance with the IR communication standard.

In this embodiment, the remote controller 200 transmits a signal, which includes information on its movement, to the display device 100 through the RF module 221.

Also, the remote controller 200 can receive the signal transmitted from the display device 100 through the RF module 221. Also, the remote controller 200 can transmit a command on power on/off, channel change and volume change to the display device 100 through the IR module 223.

The user input module 235 can include a key pad, a button, a touch pad, or a touch screen. The user can input the command related to the display device 100 to the remote controller 200 by manipulating the user input module 235. If the user input module 235 includes a hard key button, the user can input the command related to the display device 100 to the remote controller 200 through a push action of the hard key button. If the user input module 235 includes a touch screen, the user can input the command related to the display device 100 to the remote controller 200 by touching a soft key of the touch screen. Also, the user input module 235 may include various kinds of input means, which can be manipulated by the user, such as scroll key and jog key, within the range that does not limit the scope of the present invention.

The sensor module 240 may include a gyro sensor 241 or an acceleration sensor 243.

The gyro sensor 241 can sense the information on movement of the remote controller 200.

For example, the gyro sensor 241 can sense the information on movement of the remote controller 200 based on x, y and z axes. The acceleration sensor 243 can sense information on movement speed of the remote controller 200. In the mean time, the sensor module 240 may further include a distance sensor that senses the distance between the display module 180 and the remote controller 200.

The output module 250 can output the video or audio signal corresponding to the manipulation of the user input module 235 or the signal transmitted from the display device 100. The user can recognize whether the user input module 235 has been manipulated or whether the display device 100 has been controlled, through the output module 250.

For example, if the user input module 235 is manipulated or if the output module 250 transmits and receives a signal to and from the display device 100 through the wireless communication module 225, the output module 250 may include an LED module 251 for lighting, a vibration module 253 that generates vibration, a sound output module 255 that outputs sound, or a display module 257 that outputs image.

The power supply module 260 supplies the power to the remote controller 200. If the remote controller 200 does not move for a predetermined time, the power supply module 260 can save the power by stopping power supply. The power supply module 260 can resume power supply if a predetermined key provided in the remote controller 200 is manipulated.

The memory module 270 may store various kinds of programs and application data required for control or operation of the remote controller 200. If the remote controller 200 transmits and receives a signal to and from the display device 100 through the RF module 221, the remote controller 200 and the display device 100 transmit and receive the signal to and from each other through a predetermined frequency band. The control module 280 of the remote control module 200 can store information on the frequency band, which can be transmitted and received to and from the display device 100 paired with the remote controller 200, and can refer to the stored information.

The control module 280 controls all matters related to control of the remote controller 200. The control module 280 can transmit the signal corresponding to predetermined key manipulation of the user input module 235 or the signal corresponding to movement of the remote controller 200, which is sensed by the sensor module 240, to the display device through the wireless communication module 225.

Figure 15:
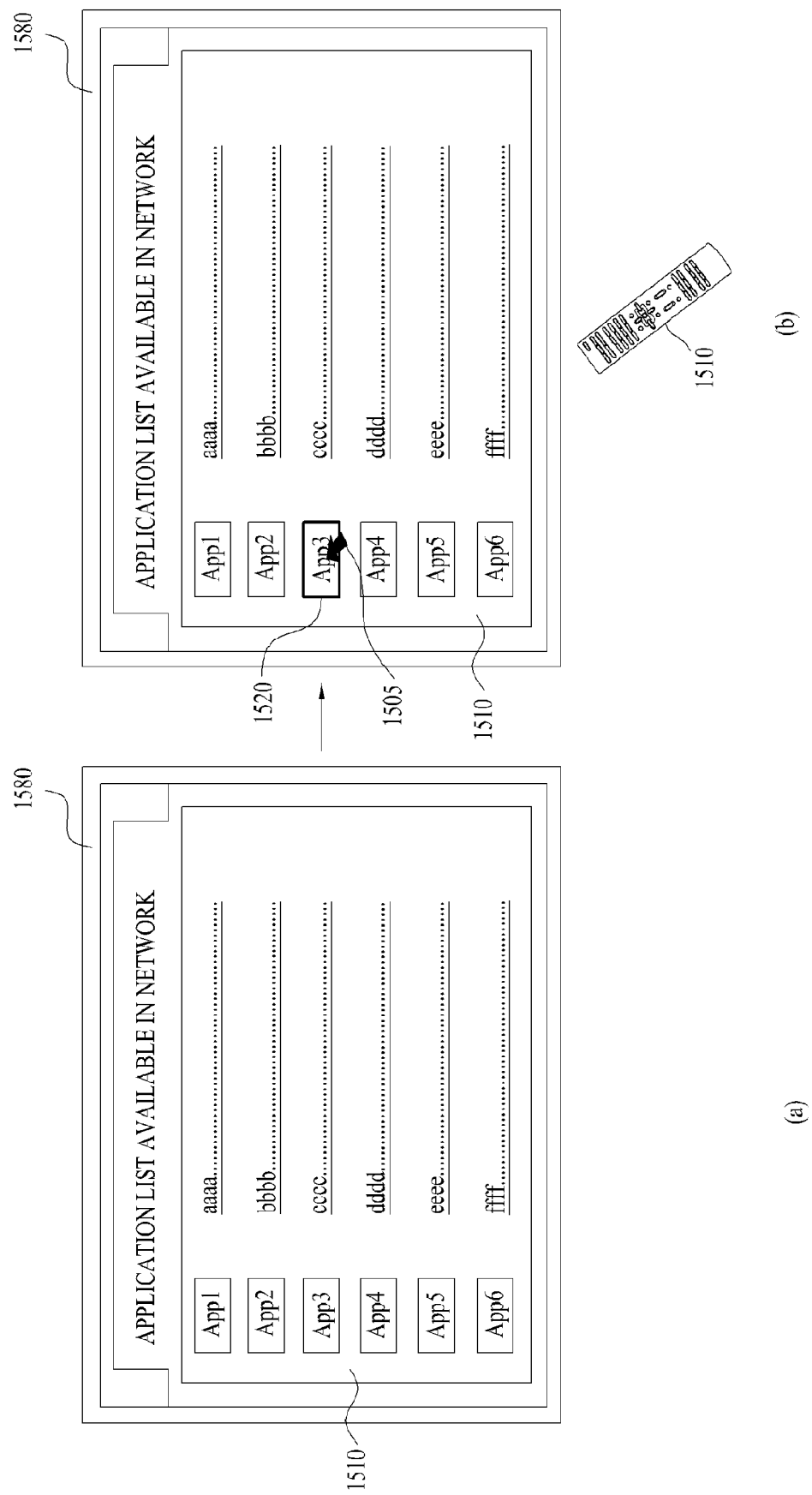
FIG. 15 is a diagram illustrating a first example of a user interface provided by any one of display devices according to the embodiments of the present invention.

FIG. 15 is a diagram illustrating a first example of a user interface provided by any one of display devices according to the embodiments of the present invention.

Figure 16:
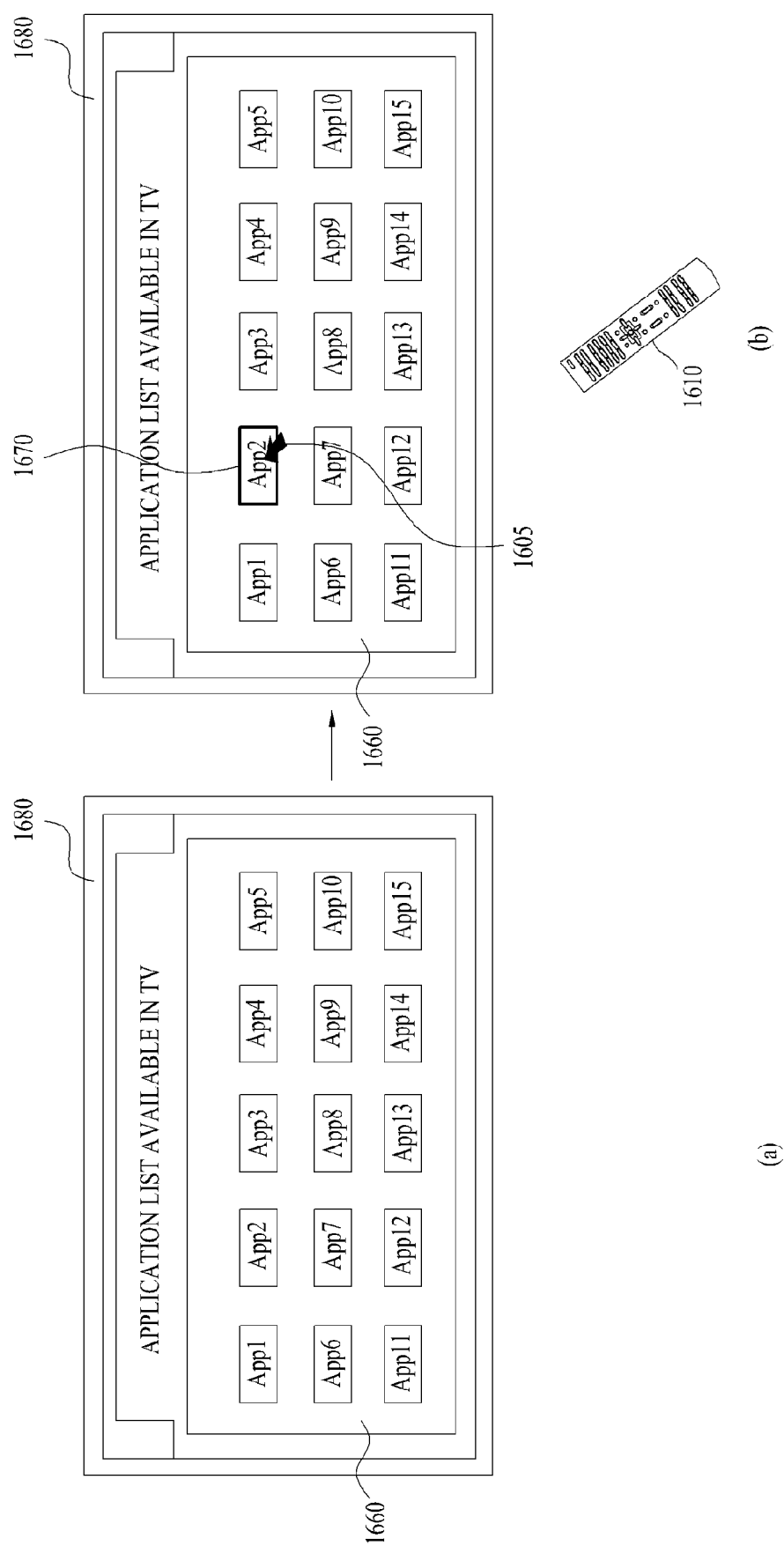
FIG. 16 is a diagram illustrating a second example of a user interface provided by any one of display devices according to the embodiments of the present invention.

FIG. 16 is a diagram illustrating a second example of a user interface provided by any one of display devices according to the embodiments of the present invention.

FIG. 17 is a diagram illustrating a third example of a user interface provided by any one of display devices according to the embodiments of the present invention.

FIG. 18 is a diagram illustrating a fourth example of a user interface provided by any one of display devices according to the embodiments of the present invention.

In FIG. 15, the list of applications on the network is displayed in the display module 180. In other words, the user can search and download various applications by directly accessing the corresponding content server or network server.

In (a) of FIG. 15, a list 610 of various applications in the accessed server is displayed in the display module 180. The list 610 of applications may include icon representing each application and brief information on each application. In the mean time, since the display device according to the embodiments of the present invention enables full browsing, it can display the icon or brief information received from the server through zoom-in. In this case, the user can easily identify the list of applications. This will be described later.

In (b) of FIG. 15, any one 620 of the list 610 of applications is selected using the pointer 205 of the remote controller 200. In this case, the corresponding application can be downloaded conveniently.

In the mean time, FIG. 16 illustrates that the list of applications in the display device is displayed in the display module 180. First of all, in (a) of FIG. 16, if the user views the list of applications by manipulating the remote controller 200, the list 660 of applications stored in the display device according to the embodiments of the present invention is displayed in the display module 180. Although the icons representing each application are only shown in the drawing, the present invention is not limited to the icons. The list of applications may include the brief information on each application as illustrated in FIG. 15, whereby the user can easily identify the list of applications.

Next, in (b) of FIG. 16, any one 670 of the corresponding list 660 of applications is selected using the pointer 205 of the remote controller 200. In this case, the corresponding application can be implemented conveniently.

In the mean time, in order to select a predetermined item, the pointer 205 moves in accordance with movement of the user by using the remote controller 200 illustrated in FIG. 15 and FIG. 16. Also, in the embodiment of the present invention, various examples for selecting a predetermined item may be provided. For example, a cursor displayed on the screen by combination of a directional key and a confirmation key, which are arranged in a local key (not shown) or the remote controller 200, may be used to select a predetermined item.

For another example, if the remote controller 200 includes a touch pad, the pointer 205 is moved on the display module 180 by touch action of the touch pad. In this way, a predetermined item may be selected.

In the mean time, FIG. 17 illustrates that a web screen is displayed in the display module of the display device.

First of all, in (a) of FIG. 17, a predetermined web screen 710 that includes a search window 720 is displayed in the display module 180. The user can input a predetermined text in the search window 720 by using a key pad (not shown) displayed on the screen, a text key (not shown) provided in a local key (not shown), or a text key (not shown) provided in the remote controller.

Next, (b) of FIG. 17 illustrates that a search result screen 730 according to a search keyword input to the search window is displayed in the display screen 180. Since the display device according to the embodiment of the present invention enables full browsing, the user can easily identify the web screen.

In the mean time, FIG. 18 illustrates that a web screen is displayed in the display portion of the display device.

First of all, in (a) of FIG. 18, a mail service screen 810 having an ID input window 820 and a password input window 825 is displayed in the display module 180. The user can input a predetermined text in the ID input window 820 and the password input window 825 by using a key pad (not shown) displayed on the screen, a text key (not shown) provided in a local key (not shown), or a text key (not shown) provided in the remote controller. Accordingly, the user can log in the corresponding mail service.

Next, in (b) of FIG. 18, a screen 830 after log in mail service is displayed in the display module 180. For example, 'read mail' item, 'write mail' item, 'sent box' item, 'received box' item, and 'recycle bin' item may be displayed in the display module. Also, the 'received box' item may be divided into 'sender' item and 'title' item. In this way, the received mails may be arranged and displayed in the display module 180.

Since the display device according to the embodiment of the present invention enables full browsing when the screen for mail service is displayed, the user can use the mail service conveniently.

Figure 19:
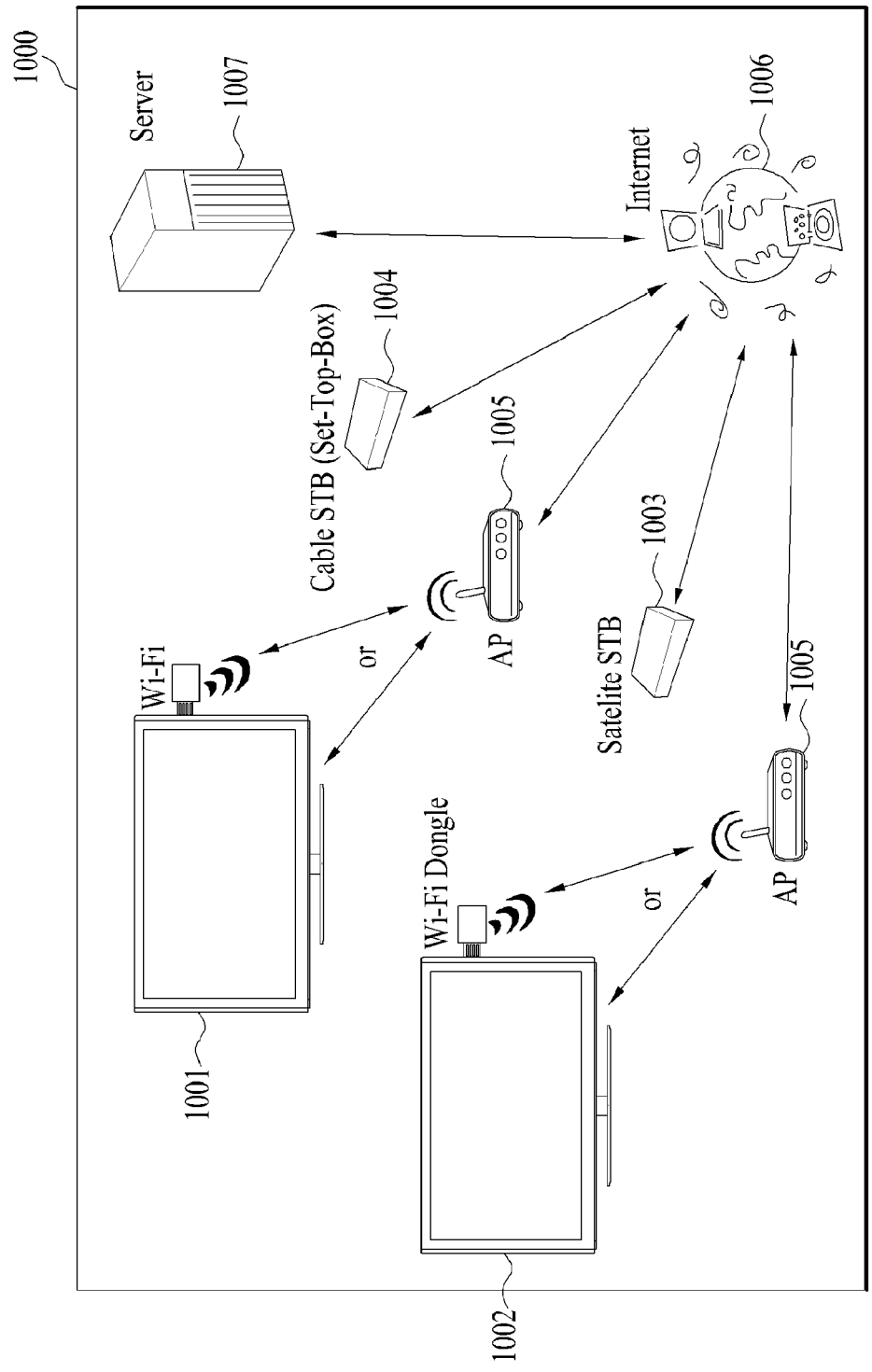
FIG. 19 is a diagram illustrating a broadcasting system that includes an image display device and a server according to the embodiment of the present invention.

FIG. 19 is a diagram illustrating a broadcasting system 1000 that includes an image display device and a server according to the embodiment of the present invention.

In accordance with the embodiment of the present invention, a plurality of image display devices 1001 and 1002 may be connected to an Internet network 1006 through an access point (AP) 1005. Also, a cable set-top box 1004 connected with the image display device and a satellite broadcasting set-top box 1003 may be connected to the Internet network 1006. Moreover, the image display devices and the set-top boxes connected to the Internet network 1006 may receive predetermined data from a server 1007 through the Internet network.

The image display device 1001 having a radio Internet (Wi-Fi) module may transmit and receive data to and from the AP 1005 through wireless communication based on the radio Internet module, or may transmit and receive data to and from the AP 1005 by being connected with the AP 1005 through wire communication based on a wire Internet module.

Also, the image display device 1002 having no radio Internet (Wi-Fi) module may transmit and receive data to and from the AP 1005 through wireless communication by being connected with a radio Internet dongle (Wi-Fi dongle) through an external device interface of the image display device, or may transmit and receive data to and from the AP 1005 by being connected with the AP 1005 through wire communication based on a wire Internet module.

The AP 1005 is an Internet sharer, and may connect the image display device to the Internet network through a wire and wireless communication means. The AP 1005 is a functional entity that provides access to the Internet network 1006 through a wireless medium for the image display devices 1001 and 1002 associated with the AP 1005. The AP 1005 may be referred to as a concentrated controller, a base station (BS), a node-B, a base transceiver system (BTS), or a site controller.

The satellite broadcasting set-top box 1003 is a device that is configured separately from the terrestrial broadcasting receiver of the image display device to receive various image data of various channels transmitted through the network or satellite. The satellite broadcasting set-top box 1003 may extend compressed data by receiving MPEG (moving picture experts group) compressed digital broadcast data transmitted through the network or satellite, decode encoded data, and convert the decoded data into a standard ATSC (advanced television system committee) signal, whereby the converted data may be displayed in the image display device. Also, the satellite broadcasting set-top box 1003 may be connected to the Internet network 1006 through the network or satellite, and may transmit and receive data to and from the server 1007.

The cable set-top box 1004 is a device that receives various image data of various channels transmitted through a cable network, and may receive broadcast data through the cable network and connect the image display device to the Internet network 1006. In other words, the image display device may transmit and receive data to and from the server 1007 through the cable network connected to the cable set-top box 1004.

The server 1007 may include a server managed by a service provider (SP) or a contents provider (CP).

Also, the server 1007, as shown in FIG. 1, may provide various contents data and various applications, and may provide contents provided by the content provider (CP) by packaging them.

Also, in accordance with the embodiment of the present invention, the server 1007 may collect information on a channel currently viewed by the user through the image display devices 1001 and 1002 and the set-top boxes 1003 and 1004, a specific channel or a channel to which a search word related to a content is input, through the Internet network 1006, generate a real time channel search list based on the collected data and transmit the generated real time channel search list to the image display devices and the set-top boxes.

In other words, the user may check the real time channel search list through the operation of the server 1007 and easily select the channel or content.

The operation for providing the real time channel search list will be described in more detail with reference to FIG. 20.

Although the radio Internet module (Wi-Fi) module is provided in the image display devices 1001 and 1002 or is provided through a dongle to transmit and receive data to and from the AP 1005 in FIG. 19, the image display devices 1001 and 1002 may be divided into a set-top box and a display module.

In other words, the set-top box may transmit and receive data related to the real time channel search list to and from the Internet through the wire and wireless network, generate and process the real time channel search list, and transmit a predetermined control signal to the display module to display the real time channel search list.

Accordingly, even though the user uses the image display device having no network communication function through Internet, a display screen for the real time channel search list may be provided to the user through the set-top box that enables the operation according to the embodiments of the present invention.

Figure 20:
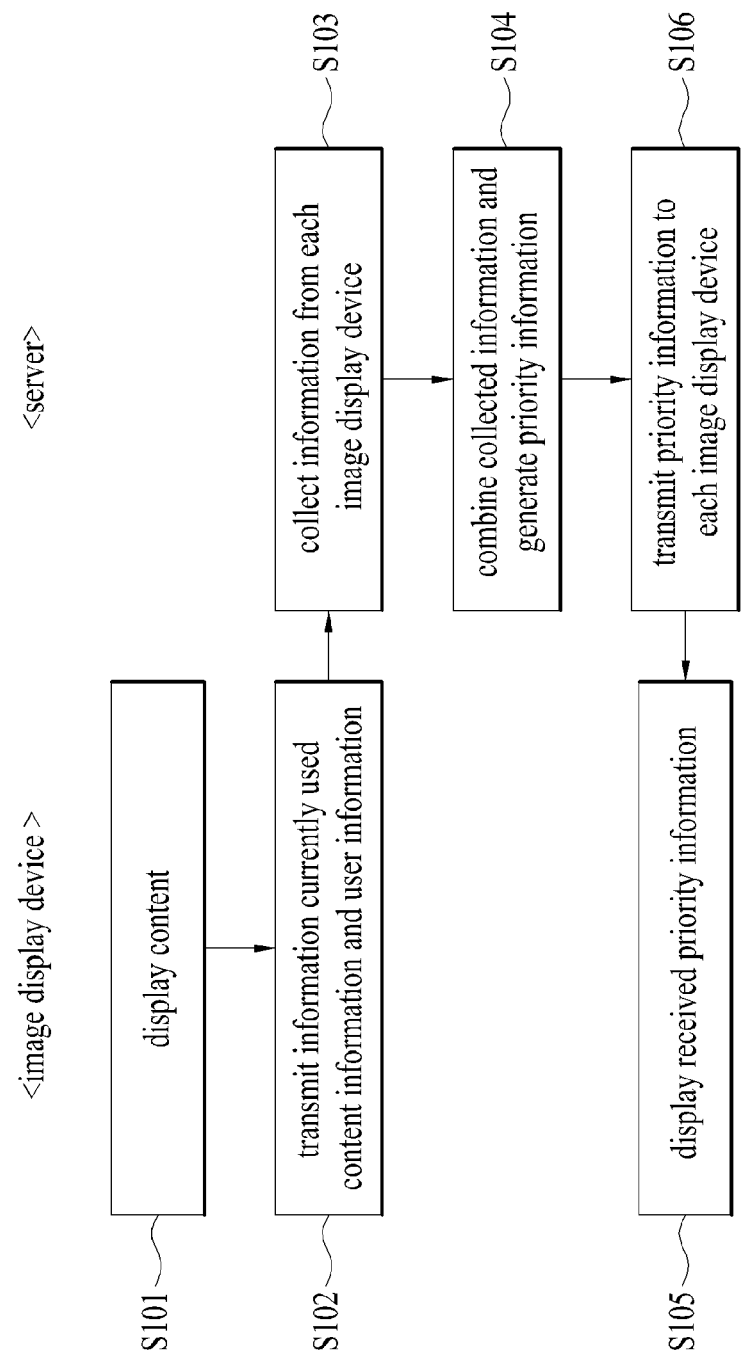
FIG. 20 is a diagram illustrating a procedure of displaying a real time channel search list according to the embodiment of the present invention.

FIG. 20 is a diagram illustrating a procedure of displaying a real time channel search list according to the embodiment of the present invention.

According to the embodiment of the present invention, the image display device may provide various real time channel search lists to allow the user to easily select a channel.

The real time channel search list is a window that can check information on channels or contents for which various users currently connected with the Internet network have searched through the Internet network. A display format of the real time channel search list will be described in more detail with reference to FIG. 21.

In other words, in order to provide the aforementioned real time channel search list to the user, first of all, the image display device displays predetermined contents or receives a channel search command (S101).

The contents may include various contents available in the image display device, such as broadcast contents, game contents, and music contents.

The image display device may directly receive a contents selection signal from the user and display the contents.

Also, according to another embodiment of the present invention, the image display device may receive a channel search signal, which includes a channel search condition, from the user, search for a channel corresponding to the search condition through the network, display a channel list based on the searched result, receive any one or more channel selection signals included in the searched channel list, and display a content of the channel corresponding to the selection signal.

Next, the image display device transmits information on a content currently in service and user information to the server through the network (S102).

The server may include a server managed by the content provider (CP) or the service provider (SP), and the image display device may perform the transmitting step in accordance with the embodiment only if previously stored contents information and transmission consent information of the user information exist in the image display device.

Also, the contents information may include broadcast time of the content, broadcasting station information, and cast member information, and if the content is selected through the search step, the image display device may display the content together with information on a search word included in the channel search condition input by the user.

Also, the user information may include user ID, serial number of the image display device and location information of the image display device. In particular, the image display device may search for GPS data through the location recognition module provided therein to acquire location information, and may include the searched GPS data in the location information.

Next, the server collects information of a content currently used in the image display device and user information from the image display devices connected with the server through the Internet network (S103).

According to the embodiment of the present invention, the server may be connected with a plurality of image display devices. Accordingly, the server may receive information on a plurality of contents and user information and store the received information.

Also, the server may collect the contents information or user information transmitted from the image display device, which is included in previously stored subscriber information, on the basis of the subscriber information.

Next, the server combines the collected information and generates priority information (S104).

The server may search for contents used or searched most frequently by the image display devices currently connected with the server through the network, and determine a search priority of the contents in accordance with the searched result.

Also, according to the embodiment of the present invention, the server may collect the data based on various references of collection period such as one day, one week, and one month, and generate priority information segmented into a search priority of drama contents, a search priority of movie contents, and a search priority of music contents in accordance with genre of the contents.

Also, according to the embodiment of the present invention, the server may generate priority information segmented per viewing level. In other words, the server may generate priority information in which viewing level contents available over 15 years of age are deleted and priority information in which viewing level contents available over 18 years of age are deleted.

Next, the server transmits the generated priority information to each of the image display devices (S105).

The server may transmit the generated priority information to each of the image display devices, which are connected with the server through the network, through the Internet network.

In this case, according to the embodiment of the present invention, the server may search for subscriber information and transmit the priority information to the image display device only matched with the subscriber information.

Also, according to the embodiment of the present invention, if the image display device requests specific priority information only, the server may transmit only the specific priority information based on the request signal. In other words, for example, the server may transmit only the priority information in which viewing level contents available over 15 years of age are deleted, to the image display device.

Next, the image display device displays the priority information received from the server (S106).

The priority information may be channel search information of each of the image display devices connected with the server through the network.

If the priority information is received from the server through the Internet network, the image display device may display the real time channel search list, which includes the received priority information, in a given zone of the display module to provide the priority information to the user.

According to the embodiment of the present invention, the image display device may display the real time channel search list corresponding to the location information based on its location information. In other words, if the location of the image display device is searched as Kangnam, Seoul, the image display device may display the real time channel search list, which includes only priority information of Kangnam area.

Also, according to another embodiment of the present invention, the image display device may display the priority information together with the EPG information window. Also, the image display device may search whether the contents list included in the priority information is currently available, and may display the unavailable contents list differently from the available contents list based on the searched result.

Also, if a certain time passes after the priority information is received from the server, the image display device may again receive the priority information from the server to update the real time channel search list. The certain time may be changed to 30 minutes or one hour depending on setting of the user.

Accordingly, since the user may easily acquire information for selecting the channel from the image display device through the above steps, it is advantageous in that convenience of the user in using the image display device may be improved.

Also, although the step of displaying the real time channel search list through data communication between the image display device and the server is only shown in FIG. 20, the image display device may be divided into the display module and the set-top box in accordance with the embodiment of the present invention.

Accordingly, the step (S101) of displaying the contents and receiving the channel search command may be divided into the step of displaying the contents in the display module and the step of receiving the channel search command through the set-top box. The step (S105) of displaying the priority information may be divided into the step of receiving the priority information in the set-top box and transmitting a control signal for displaying the received priority information to the display module and the step of displaying the priority information in the display module.

In other words, the user may receive the real time channel search list through various image display devices by purchasing the set-top box only that enables the operation according to the present invention.

Figure 21:
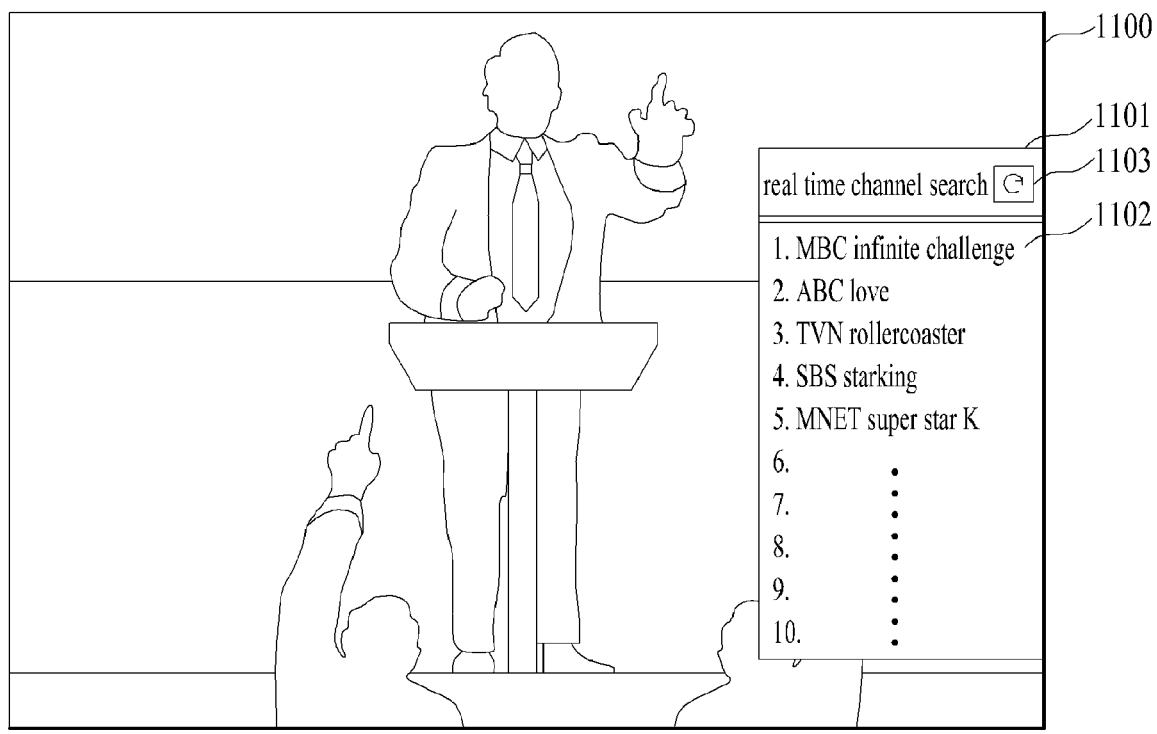
FIG. 21 is a diagram illustrating a display screen that includes a real time channel search list according to the embodiment of the present invention.

FIG. 21 is a diagram illustrating a display screen 1100 that includes a real time channel search list according to the embodiment of the present invention.

According to the embodiment of the present invention, the image display device may provide a real time channel search list 1101 to the user.

The real time channel search list 1101 may include information as to a channel viewed or searched by the image display devices connected to the network.

In other words, referring to FIG. 21, if a predetermined content is displayed in the display module and a paging signal of the real time channel search list or a selection signal of a predetermined menu for displaying the real time search list is input from the user, the image display device may display the real time channel search list 1101 in a predetermined zone of the display screen.

The real time channel search list 1101 may be displayed in a minimum size or opaque color so as not to disturb the display screen of the content currently displayed in the image display device.

Also, the real time channel search list 1101 may include a refresh button 1103. Accordingly, if a selection signal of the refresh button 1103 is input from the user, the image display device may request the server of new real time channel search information through the network, receive the new real time channel search information, and update the displayed real time channel search list 1101. In addition, the update of the real time channel search list 1101 may be performed by the image display device in accordance with a certain period. Setting of the update cycle will be described later with reference to FIG. 29.

Also, the real time channel search list 1101 may include priority information 1102 on a channel received or searched by another image display device connected to the network.

In other words, referring to FIG. 21, it is noted that the content viewed or searched most frequently by the image display device connected to the network is 'MBC infinite challenge' and the second priority content is 'ABC love'.

Although the real time channel search list shown in FIG. 21 includes only information on a broadcasting station and a content name, it may further include various kinds of information such as a broadcasting station logo and a content image in accordance with another embodiment of the present invention.

Figure 22:
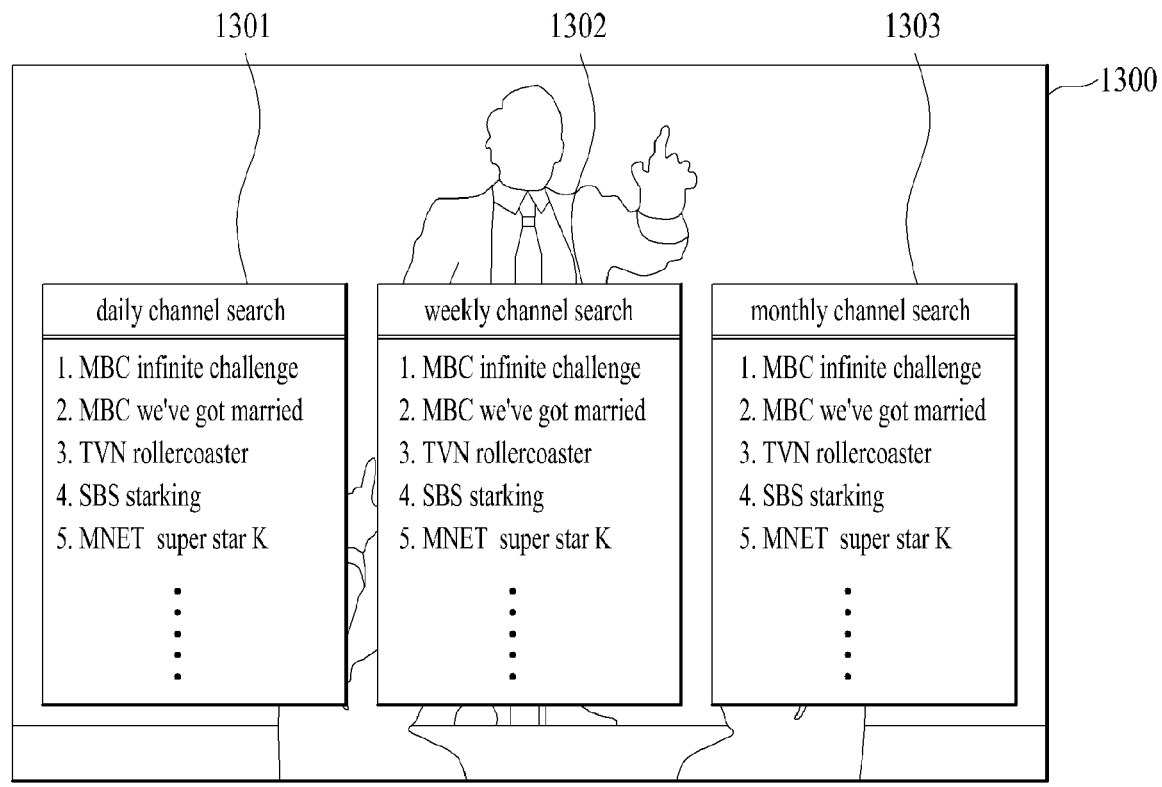
FIG. 22 is a diagram illustrating a display screen that includes a real time channel search list per time period according to the embodiment of the present invention.

FIG. 22 is a diagram illustrating a display screen 1200 that includes a real time channel search list per time period according to the embodiment of the present invention.

According to the embodiment of the present invention, the real time channel search list may include different kinds of priority information in accordance with various time intervals.

In other words, for example, referring to FIG. 22, the image display device may display a daily channel search list 1201, a weekly channel search list 1202 and a monthly channel search list 1203, respectively.

The daily channel search list 1201 may include daily channel search priority information generated in accordance with the order of channels viewed or searched most frequently for a day by allowing the server to collect channel watching information or channel search information of the image display devices connected to the network for a day.

Also, the weekly channel search list 1202 may include weekly channel search priority information generated in accordance with the order of channels viewed or searched most frequently for a week by allowing the server to collect channel watching information or channel search information of the image display devices connected to the network for a week.

The monthly channel search list 1203 may include daily channel search priority information generated in accordance with the order of channels viewed or searched most frequently for a month by allowing the server to collect channel watching information or channel search information of the image display devices connected to the network for a month.

Accordingly, the image display device may display the daily channel search list 1201, the weekly channel search list 1202, and the monthly channel search list 1203 at the same time as shown in FIG. 22 to provide them to the user, or may display any one of the daily channel search list 1201, the weekly channel search list 1202, and the monthly channel search list 1203 in accordance with selection of the user.

Figure 23:
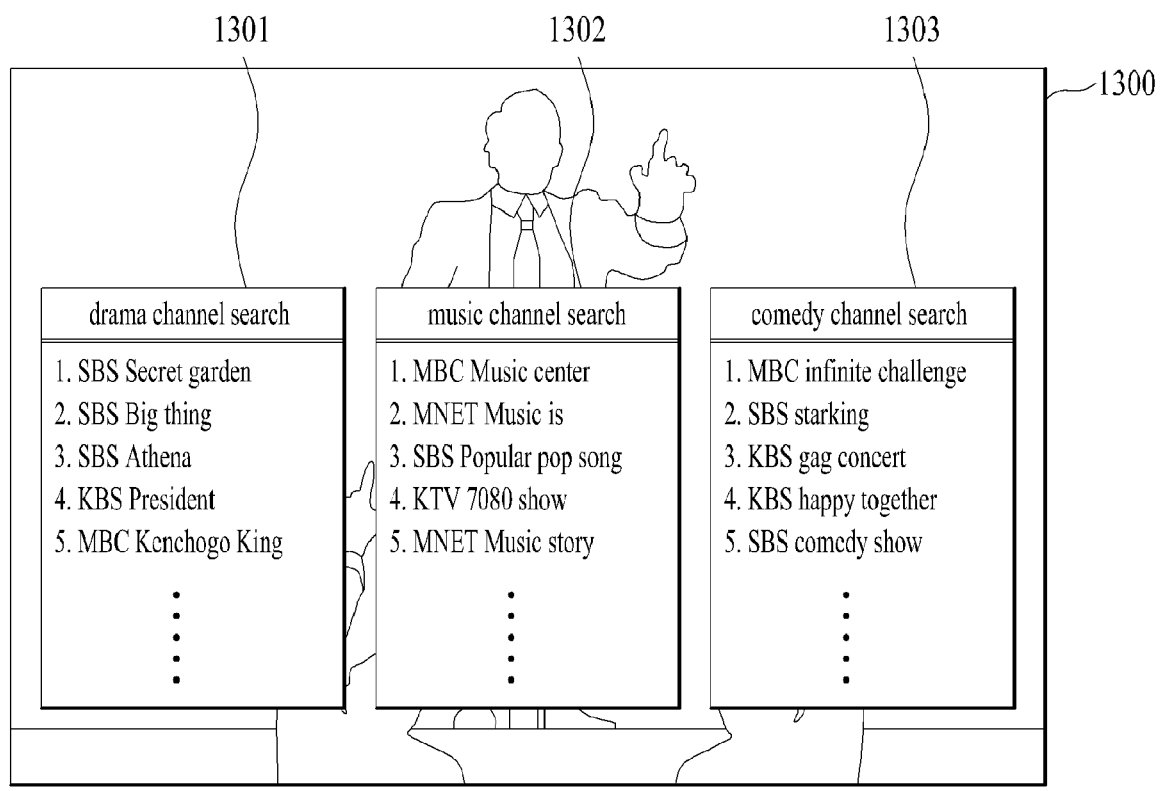
FIG. 23 is a diagram illustrating a display screen that includes a real time channel search list per genre according to the embodiment of the present invention.

FIG. 23 is a diagram illustrating a display screen that includes a real time channel search list per genre according to the embodiment of the present invention.

According to the embodiment of the present invention, the real time channel search list may include different kinds of priority information in accordance with various genres.

In other words, for example, referring to FIG. 23, the image display device may display a drama channel search list 1301, a music channel search list 1302 and a comedy channel search list 1303, respectively.

The drama channel search list 1301 may generate channel priority of a drama genre by allowing the server to collect channel watching information or channel search information of the image display devices connected to the network, generate priority information in accordance with the order of channels viewed or searched most frequently for a day, and extract only priority information on channels corresponding to the drama genre from the generated priority information. The server may search for and use the EPG information included in the broadcast signal to determine whether a content of each channel corresponds to the drama genre.

The music channel search list 1302 may generate channel priority of a music broadcast genre by allowing the server to collect channel watching information or channel search information of the image display devices connected to the network, generate priority information in accordance with the order of channels viewed or searched most frequently for a day, and extract only priority information on channels corresponding to the music broadcast genre from the generated priority information. The server may search for and use the EPG information included in the broadcast signal to determine whether a content of each channel corresponds to the music broadcast genre.

The comedy channel search list 1303 may generate channel priority of a comedy genre by allowing the server to collect channel watching information or channel search information of the image display devices connected to the network, generate priority information in accordance with the order of channels viewed or searched most frequently for a day, and extract only priority information on channels corresponding to the comedy genre from the generated priority information. The server may search for and use the EPG information included in the broadcast signal to determine whether a content of each channel corresponds to the comedy genre.

Accordingly, the image display device may display the drama channel search list 1301, the music channel search list 1302, and the comedy channel search list 1303 at the same time as shown in FIG. 23 to provide them to the user, or may display any one of the drama channel search list 1301, the music channel search list 1302, and the comedy channel search list 1303 in accordance with selection of the user.

Figure 24:
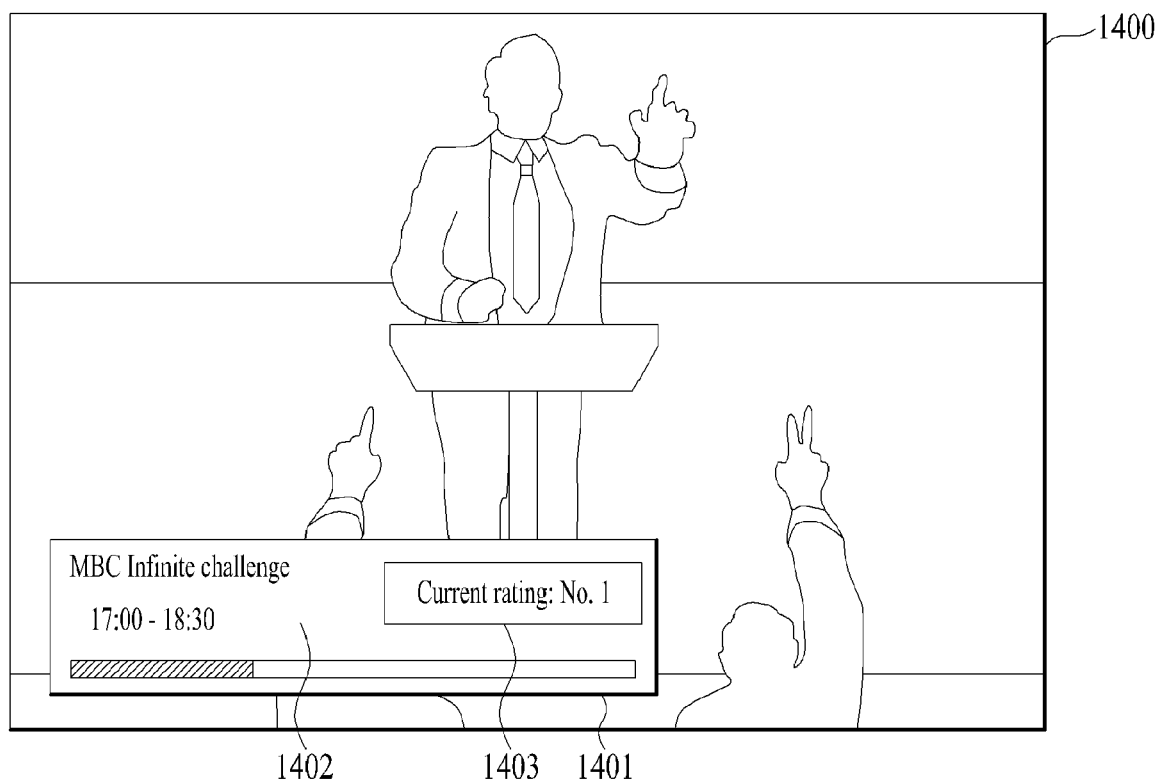
FIG. 24 is a diagram illustrating a display screen that includes an EPG information window displaying real time channel search priority information according to the embodiment of the present invention.

FIG. 24 is a diagram illustrating a display screen that includes an EPG information window displaying real time channel search priority information according to the embodiment of the present invention.

According to the embodiment of the present invention, the image display device may display an EPG (Electronic Program Guide) information window 1401 displaying EPG information related to a predetermined content while displaying the predetermined content in the display screen.

The EPG information is a broadcast contents guide service transmitting TV contents broadcast time and message, and cast member information by using an empty frequency band of terrestrial broadcasting or additional channel. The EPG information is the same electronic program guide information as printed TV contents guide information, and the received EPG information is stored in the set-top box or a memory module of the broadcast receiver. The viewer may select and reserve contents by manipulating the EPG through a remote controller, and may perform pay per view contents demand, contents search per title and genre and video recording.

Accordingly, the image display device may include information 1402 on broadcasting station information, contents name and broadcast time in the EPG information window 1401.

Also, the image display device may display rating priority information 1403 of contents by being included in the EPG information window 1401.

In other words, the image display device may provide rating priority information to the user through a list displayed in a separate window as shown in FIG. 22, and may provide current rating information to the user simultaneously with displaying the EPG information included in the broadcast signal through the EPG information window 1401.

The rating information may include information on priority generated based on collected information by allowing the server to collect channel watching information or channel search information from each of the image display devices.

Also, according to the embodiment of the present invention, if a hot key input signal for paging the EPG information window or a selection signal of a predetermined menu is input from the user, the image display device may display the EPG information window. If the EPG information window is initially displayed, the image display device may display EPG information on a content currently in service, and then may search for EPG information of another content in accordance with key input of the user separately from the content currently in service.

Accordingly, even in case of the rating information displayed by being included in the EPG information window, in the same manner the EPG information, if the EPG information window is initially displayed, the image display device may display rating information on the content currently in service. Afterwards, if the EPG information displayed in the EPG information window is changed to that of other content in accordance with key input of the user, rating information of the content corresponding to the changed EPG information may be displayed.

Also, according to the embodiment of the present invention, the rating priority information 1403 may be displayed by being automatically included in the EPG information window if the EPG information window is displayed. If the user inputs a separate hot key input signal or a selection signal of a specific menu, the rating priority information 1403 may be displayed by being included in the EPG information window.

Figure 25:
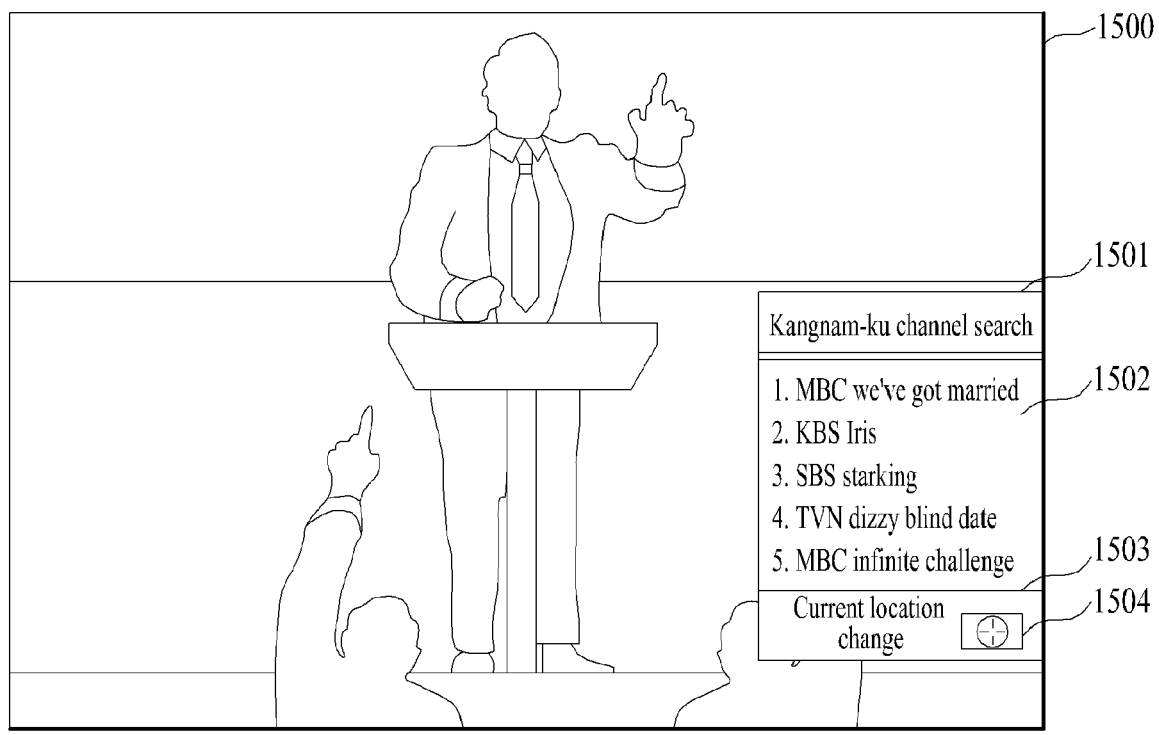
FIG. 25 is a diagram illustrating a display screen that includes a real time channel search list per area according to the embodiment of the present invention.

FIG. 25 is a diagram illustrating a display screen 1500 that includes a real time channel search list per area according to the embodiment of the present invention.

According to the embodiment of the present invention, the image display device may transmit area information on a area where the image display device is currently located, to the server, receive real time channel search list data corresponding to the transmitted area information from the server, and display a real time channel search list 1501 per area, which includes a real time channel search priority 1502 of the corresponding area.

Also, according to another embodiment of the present invention, the image display device may receive data on the real time channel search list per area and display the channel search list corresponding to the area where the image display device is currently located.

The server may receive area information of the area where each image display device is located, from the image display device connected to the server through the network together with contents usage information and search information to generate the real time channel search list data per area, and may display the real time channel search lists per area based on the received area information.

In other words, referring to FIG. 25, it is noted that a content related to 'MBC we've got married' is used or searched most frequently by the image display devices currently located in Kangnam, Seoul. Accordingly, the user may identify the content searched or used in an area where the user is currently located.

The area may basically be set to an area where the image display device is currently located. If the user inputs a selection signal of a location change menu 1504, the image display device may display a list of areas that can provide the real time channel search list per area, receive a selection signal of one or more areas from the user and provide information on the real time channel search list of the area corresponding to the selection signal of the user.

Figure 26:
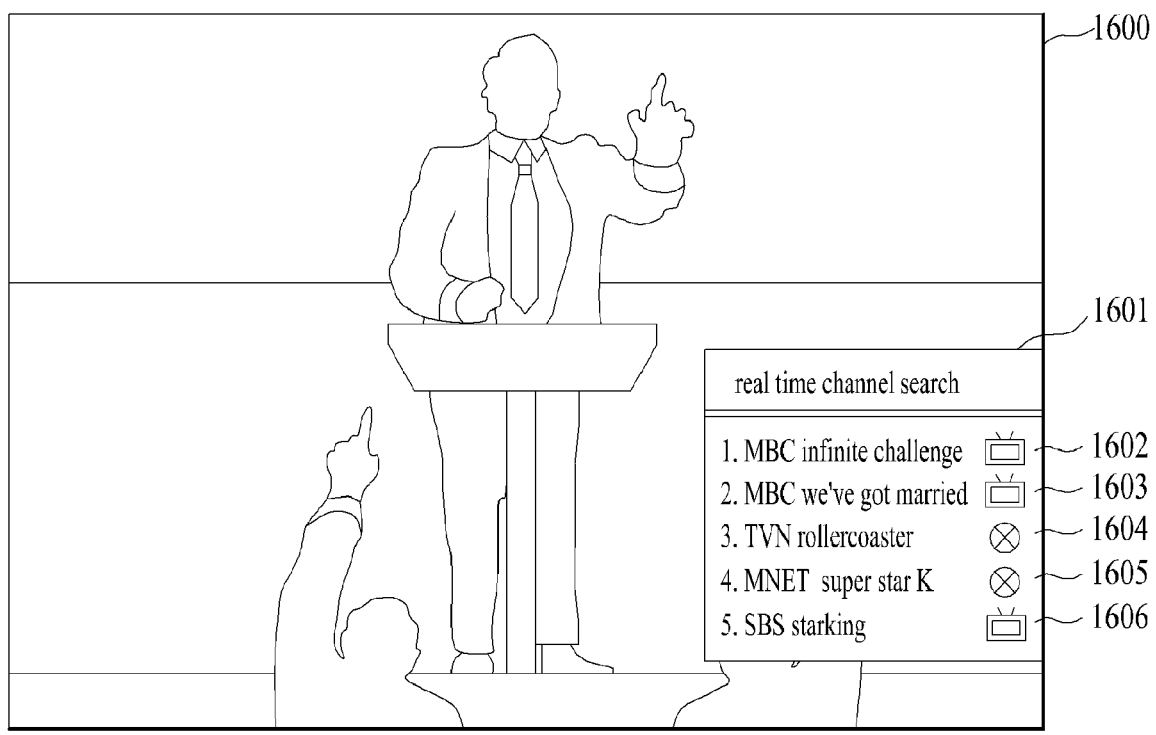
FIG. 26 is a diagram illustrating a display screen that includes a real time channel search list and displays channel usage information according to the embodiment of the present invention.

FIG. 26 is a diagram illustrating a display screen 1600 that includes a real time channel search list and displays channel usage information according to the embodiment of the present invention.

According to the embodiment of the present invention, the image display device may display a real time channel search list 1601, which includes contents usage information on channels or contents included in the real time channel search list.

The contents usage information may include image data or text that may identify whether each content or channel is currently available in the image display device.

In other words, referring to FIG. 26, the user may recognize that 'MBC infinite challenge' 1602, 'MEC we've got married' 1603, and 'SBS starking' 1606 among the contents included in the real time channel search list 1601 are the contents currently available in the image display device, and that 'TVN rollercoaster' 1604 and 'MNET super star K' 1605 are the contents currently unavailable in the image display device.

The unavailable contents may include contents unavailable depending on service subscription status of the user who is currently using the image display device, or may include contents unavailable depending on the current network connection status of the image display device.

Also, unlike FIG. 26, the image display device may display the unavailable contents among the contents included in the real time channel search list 1601 in a color different from that of the available contents, or may display the real time channel search list 1601 by deleting the unavailable contents.

Figure 27:
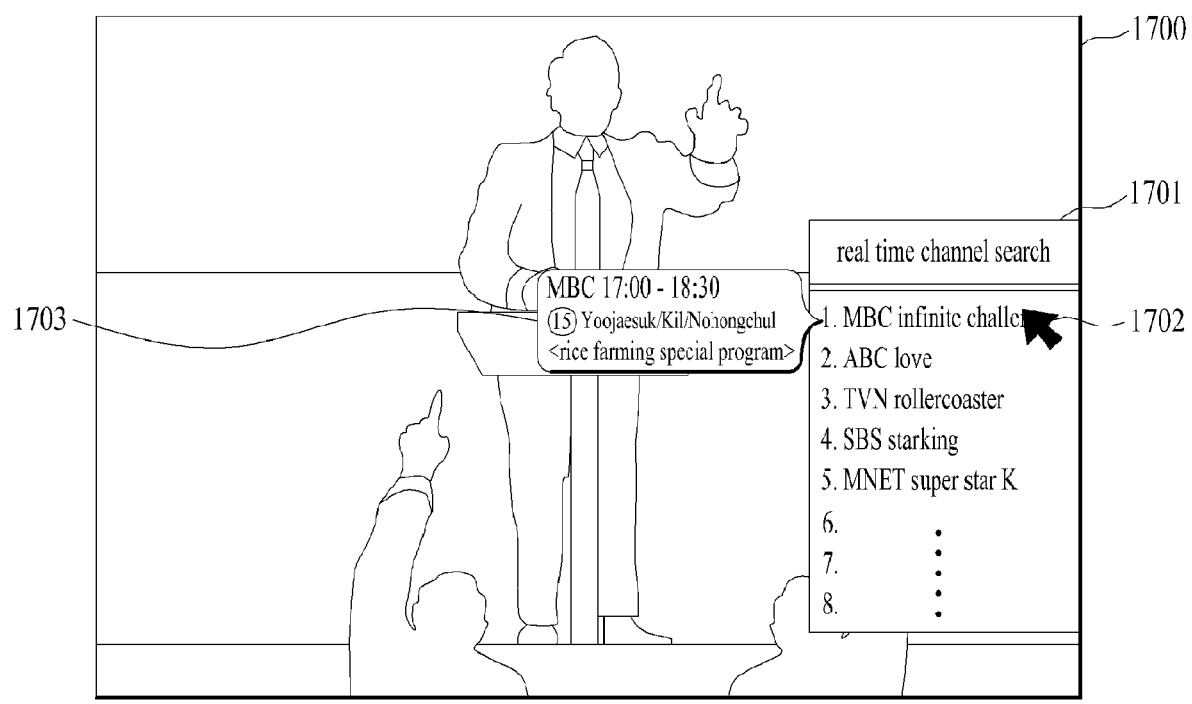
FIG. 27 is a diagram illustrating a display screen that includes a real time channel search list and displays channel detailed information according to the embodiment of the present invention.

FIG. 27 is a diagram illustrating a display screen 1700 that includes a real time channel search list and displays channel detailed information according to the embodiment of the present invention.

According to the embodiment of the present invention, the image display device may further display detailed information 1703 on a content selected by a pointer 1702 among the contents included in a real time channel search list 1701 when displaying the real time channel search list 1701.

In other words, in a state that the real time channel search list 1701 is displayed, the user may identify the detailed information 1703 by inputting a motion signal of the pointer 1702 displayed in the image display device to perform a predetermined operation and selecting a random content included in the real time channel search list 1701.

The detailed information 1703 may include broadcasting station information of contents, time information and cast member information, and may include information related to the selected content, which is extracted from the EPG information received in the image display device.

Also, the user may input a selection signal after moving the pointer 1702 to display the detailed information 1703. According to another embodiment of the present invention, the user may recognize that the selection signal is input even if the pointer 1702 is located on a random content for more than a certain time.

In other words, referring to FIG. 27, since the real time channel search list 1702 is displayed in the image display device and the pointer 1702 is located on the content 'MBC infinite challenge', the image display device may further display the detailed information 1702 related to 'MEC infinite challenge'.

Figure 28:
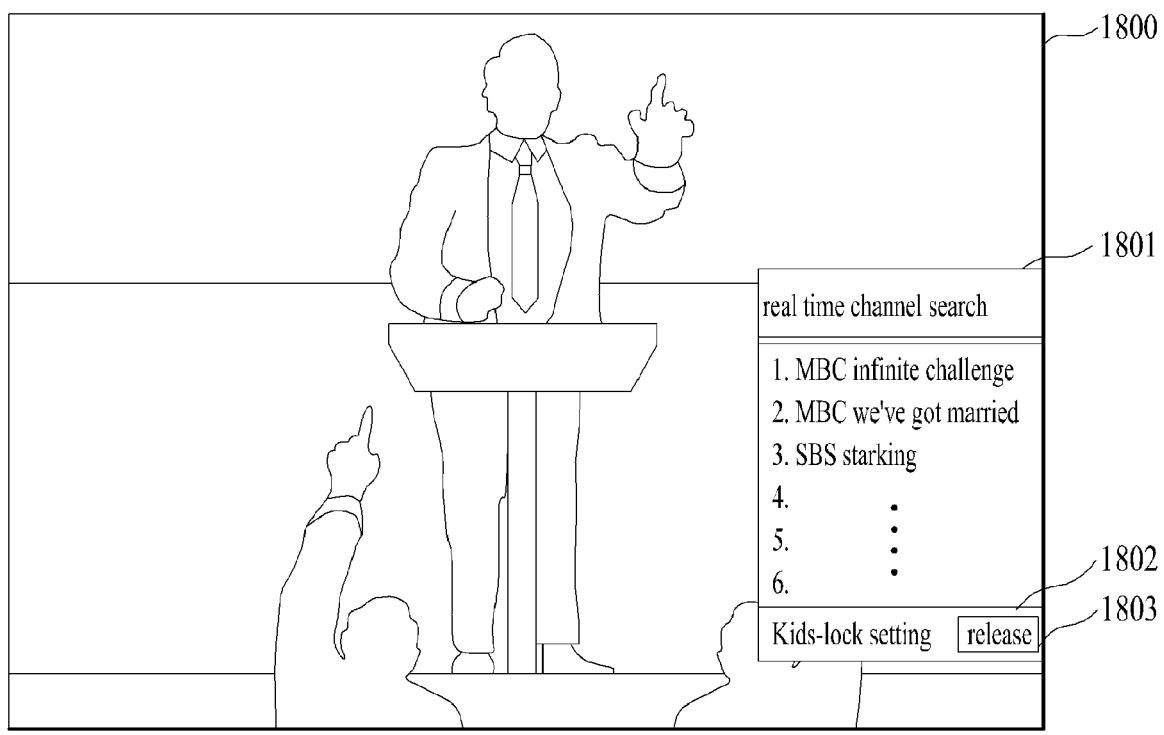
FIG. 28 is a diagram illustrating a display screen that includes a real time channel search list and provides a viewing level control function according to the embodiment of the present invention.

FIG. 28 is a diagram illustrating a display screen 1800 that includes a real time channel search list and provides a viewing level control function according to the embodiment of the present invention.

According to the embodiment of the present invention, the image display device may display the real time channel search list by filtering a contents menu included in the real time channel search list in accordance with user setting.

In other words, for example, if the user sets a kids-lock function, the image display device may display the real time channel search list by deleting a contents menu which is not suitable for viewing level, among contents menus included in the real time channel search list, in accordance with the set kids-lock function.

Also, the image display device may further display a setting notification window 1802 indicating that the kids-lock function is set, and a release menu 1803 for releasing setting of the kids-lock function.

If a selection signal of the release menu 1803 is input from the user in accordance with the embodiment of the present invention, the image display device may request the user to input a predetermined password.

Also, if the user sets the kids-lock function, a viewing level control function may be set in various ranges such as excluding contents over 19 years of age and excluding contents over 15 years of age.

Figure 29:
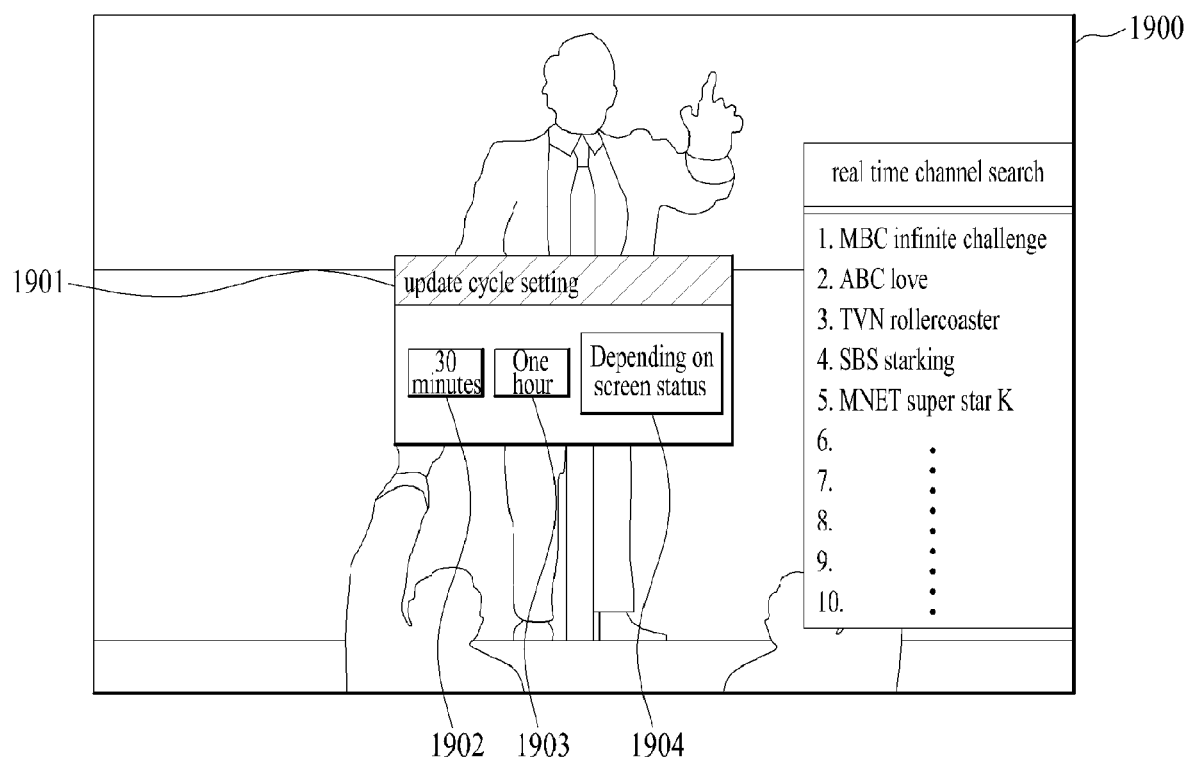
FIG. 29 is a diagram illustrating a display screen that includes an update cycle setting menu of a real time channel search list according to the embodiment of the present invention.

FIG. 29 is a diagram illustrating a display screen 1900 that includes an update cycle setting menu of a real time channel search list according to the embodiment of the present invention.

According to the embodiment of the present invention, the image display device may update a real time channel search list and set a cycle for the update when displaying the real time channel search list.

Referring to FIG. 29, the image display device may display an update cycle setting menu 1901 for setting an update cycle of the real time channel search list, wherein the update cycle setting menu may include cycle setting menu items 1902, 1903 and 1904.

The update cycle setting menu 1901 may be displayed if a hot key input signal paging the update cycle setting menu or a selection signal of a predetermined menu item is input.

Also, in accordance with the embodiment of the present invention, the update cycle setting menu 1901 may include a menu item set to allow the image display device to automatically update the real time channel search list on the basis of the time interval of 30 minutes 1902 or one hour 1903, or may include a menu item 1904 set to update the real time channel search list only if an update request signal is input from the user.

In other words, the user may set various update cycles of the real time channel search list considering network connection status of the image display device and usage behavior of the user.

Figure 30:
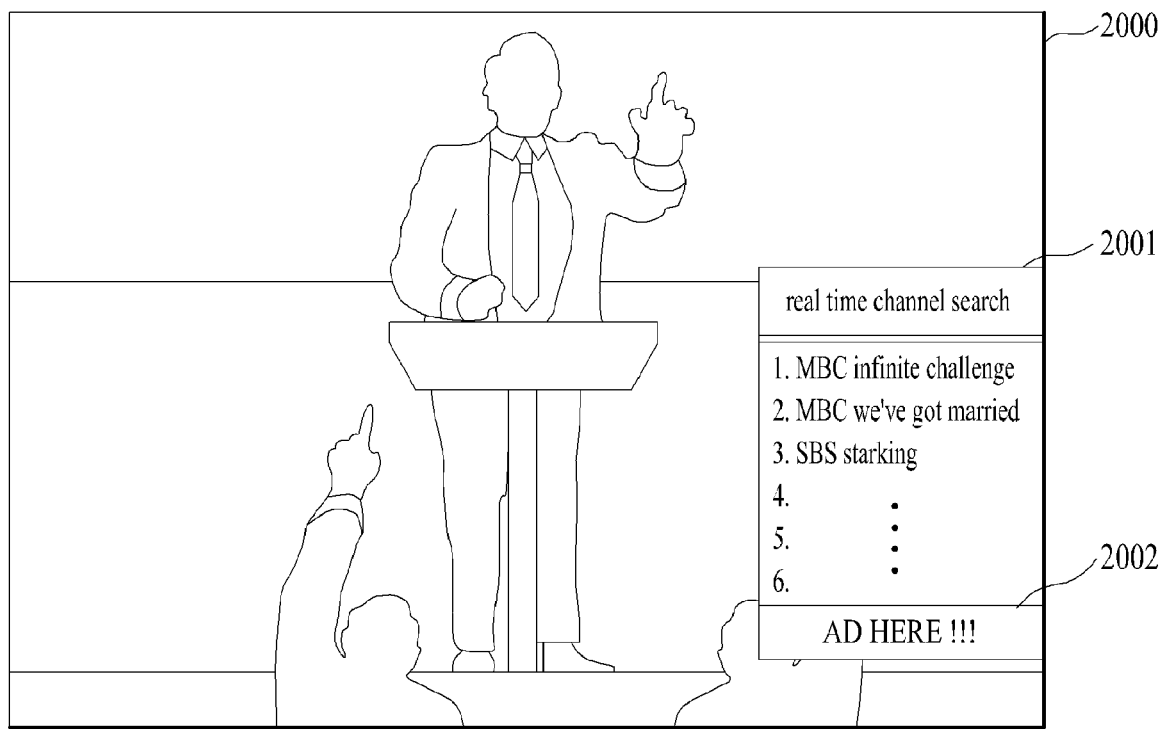
FIG. 30 is a diagram illustrating a display screen that includes a real time channel search list having an advertisement zone according to the embodiment of the present invention.

FIG. 30 is a diagram illustrating a display screen 2000 that includes a real time channel search list having an advertisement zone according to the embodiment of the present invention.

According to the embodiment of the present invention, the image display device may display a real time channel search list that includes an advertisement zone.

For example, referring to FIG. 30, the image display device may display the real time channel search list 2001, and may further display an advertisement zone 2002 below the real time channel search list 2001.

The advertisement zone 2002 may be displayed in such a manner that image or text previously stored in the image display device is advertisement. Also, the advertisement zone 2002 may be displayed in a type of advertisement data received from a predetermined server. Also, the server may transmit advertisement data suitable for the image display device to the image display device by receiving area information or user information of the image display device.

Figure 31:
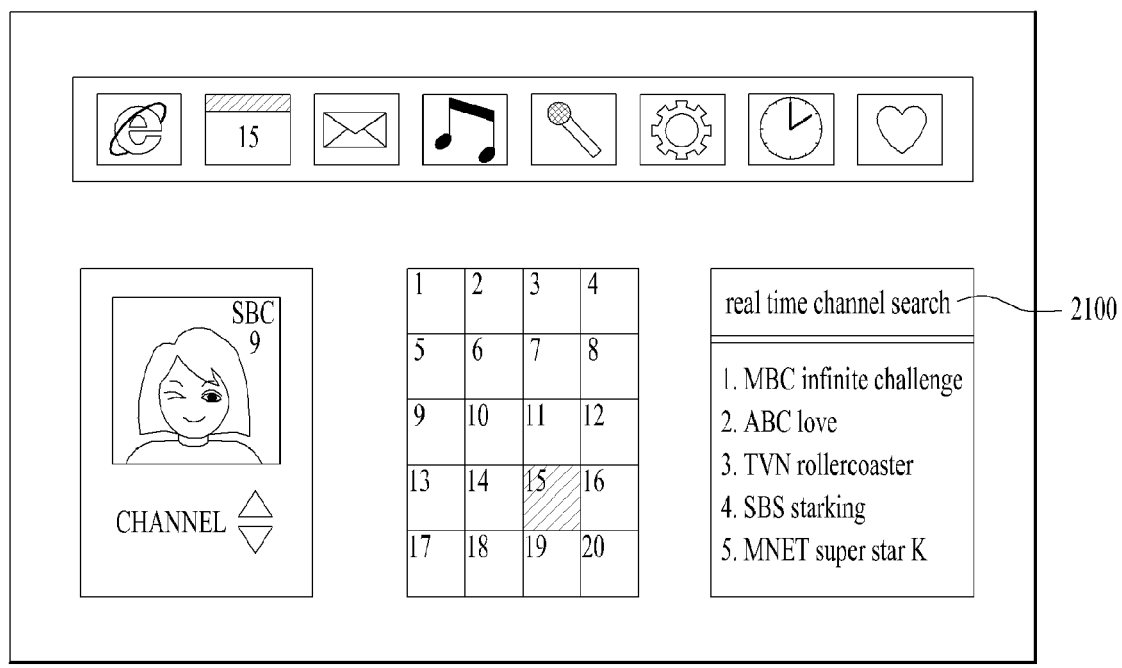
FIG. 31 is a diagram illustrating a display screen of a home screen that includes a real time channel search list according to the embodiment of the present invention.

FIG. 31 is a diagram illustrating a display screen of a home screen that includes a real time channel search list according to the embodiment of the present invention.

According to the embodiment of the present invention, the image display device may display a home screen for implementing or managing various functions of the image display device.

Also, the image display device may display a real time channel search list 2100 as one of menus of the home screen. As a result, the image display device may transfer channel search information to the user more easily.

Figure 32:
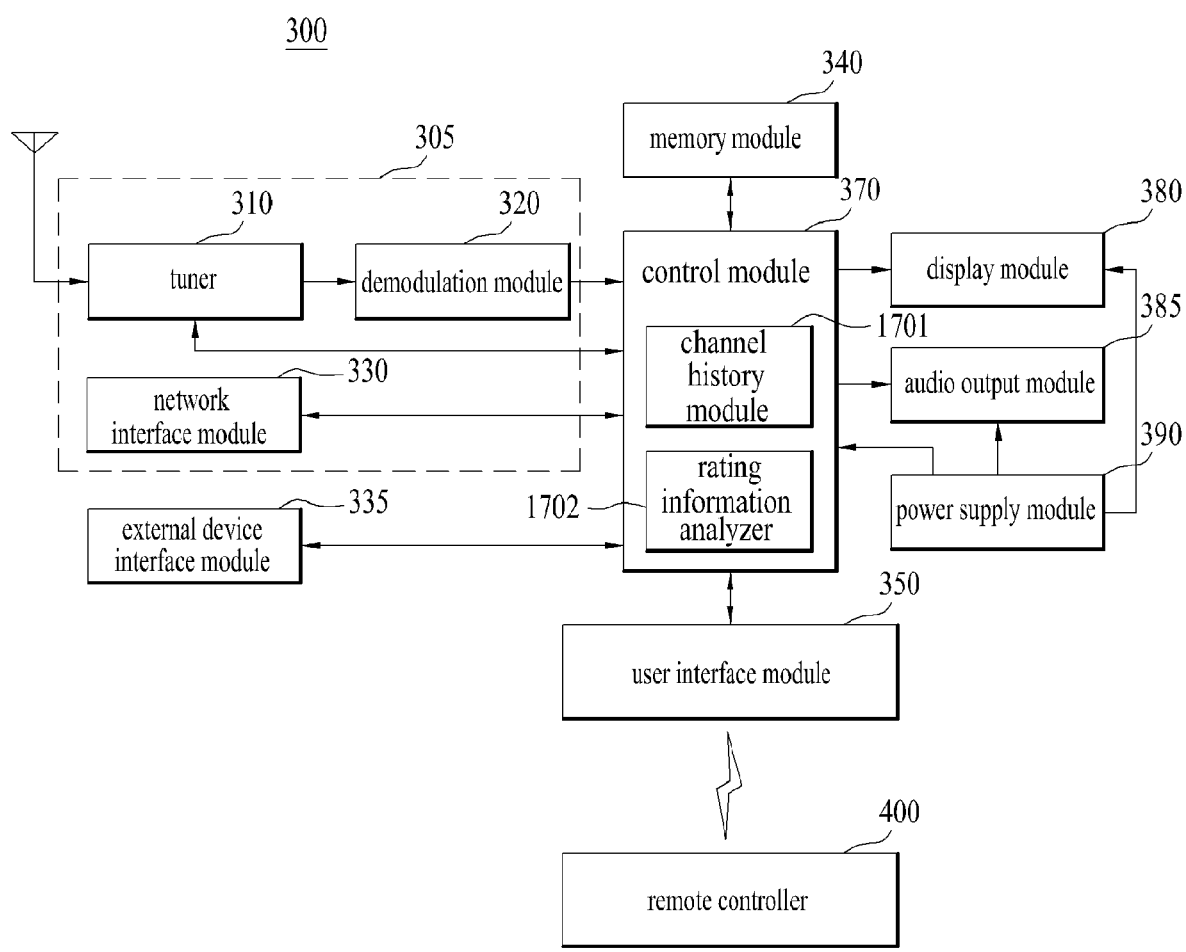
FIG. 32 is a block diagram illustrating detailed element blocks of an example of the digital receiver shown in FIG. 1.

FIG. 32 is a block diagram illustrating detailed element blocks of an example of the digital receiver shown in FIG. 1. Also, since FIG. 32 will be described with reference to FIG. 6, the repeated description will be omitted.

The control module 170 shown in FIG. 32 may include a channel history module 1701 and a rating information analyzer 1702 in accordance with the embodiment of the present invention.

Accordingly, the channel history module 1701 stores channel watching information of the digital receiver 100. If the digital receiver 100 is set to a rating notification mode in accordance with a predetermined signal received through the user interface module 150, the control module 170 transmits a first signal, which includes information indicating that the rating notification mode has been set, to the server for acquiring and generating rating information through the network interface module 130, and receives a second signal, which includes setting details for rating information collection, from the server through the network interface module 130. And, if the digital receiver is set as a rating information collecting target based on the second signal, the control module 170 transmits a third signal, which includes channel watching information of the digital receiver, to the server, and receives a fourth signal, which rating information, from the server to display the fourth signal in the display module 180.

Also, the rating information analyzer 1702 analyzes the fourth signal that includes the rating information. In other words, the rating information analyzer 1702 may extract broadcasting station information, channel information, program information and rating change transition information, which are included in the rating information.

Also, the control module 170 may filter only rating information on the channel available in the digital receiver, on the basis of the analyzed result of the rating information analyzer 1702, to display the information in the display module 180.

Also, the control module 170 may search for the presence of rating change exceeding a previously set threshold value on the basis of the analyzed result of the rating information analyzer 1702, and may display the rating information in the display module 180 only if rating change exceeding the threshold value is searched.

If the rating change exceeding the threshold value is searched, the control module 170 may control the display module 180 to display a notification message, which includes rating change information, in a predetermined zone of the display module 180. The notification message will be described later in more detail with reference to FIG. 44.

Also, the control module 170 may control the display module 180 to display an electronic program guide (EPG) that includes the rating information. The EPG will be described later in more detail with reference to FIG. 45.

Also, the control module 170 may control the display module 180 to display any one or more of a rating priority list that includes a program only of a specific genre, a rating priority list that includes a program only of a specific broadcasting station, a rating priority list that includes a program rating priority only of a specific area, and a rating priority list that includes a program only broadcasted at a specific time zone, on the basis of the rating information.

Also, the control module 170 may determine a channel watching information collection period and a channel watching information transmission period on the basis of the second signal received from the server, acquire channel watching information of the digital receiver on the basis of the determined period information, and transmit the third signal, which includes the acquired channel watching information, to the server through the network interface module 130.

Figure 33:
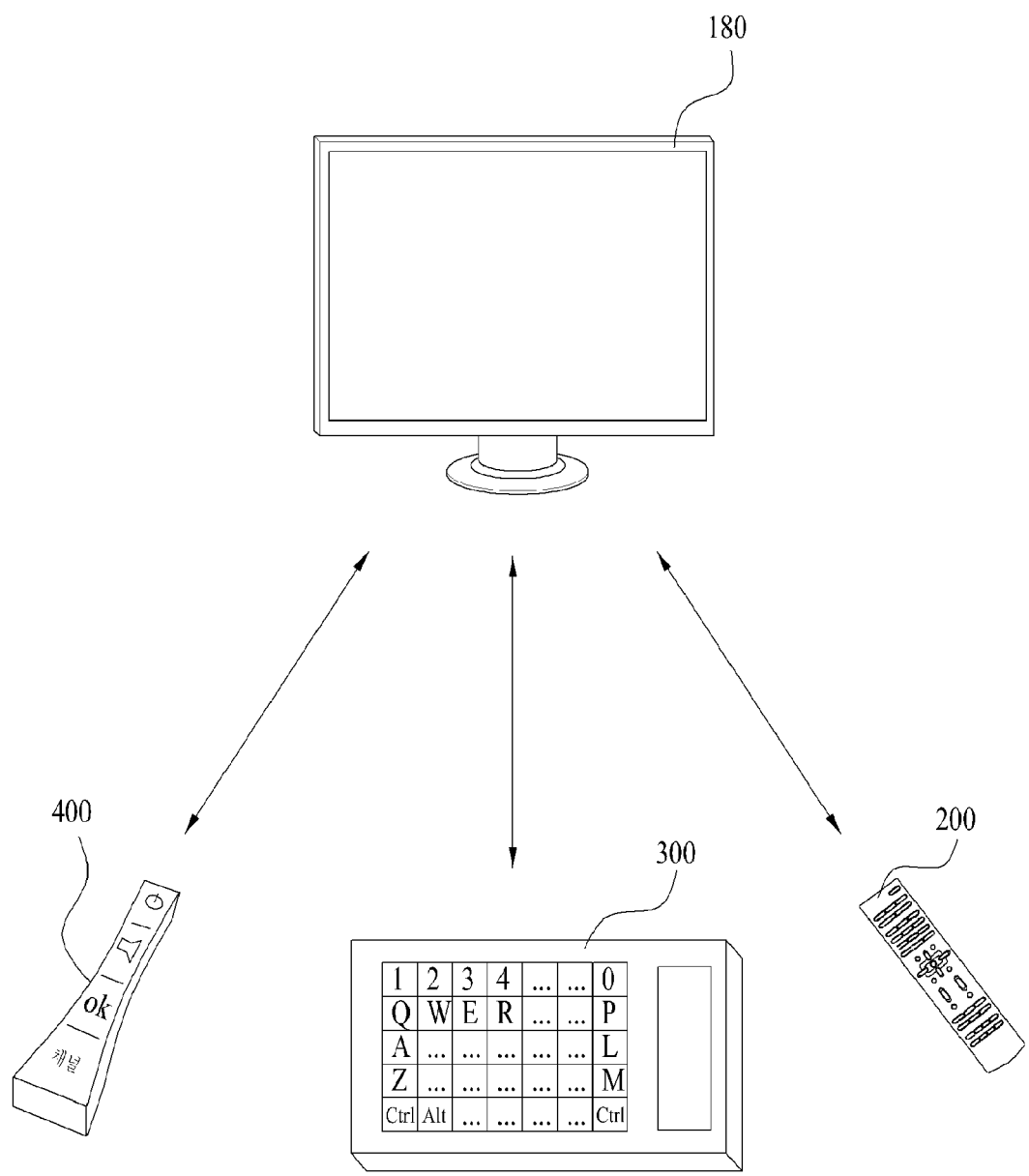
FIG. 33 is a diagram illustrating remote controllers of a digital receiver according to the present invention.

FIG. 33 is a diagram illustrating remote controllers of a digital receiver according to the present invention.

According to the embodiment of the present invention, various user interface devices (UIDs) that enable wire/wireless communication with the digital receiver 100 may be used as the remote controllers to perform various operations for carrying out the present invention.

For example, various communication standards such as Bluetooth, Radio Frequency Identification (RFID), infrared Data Association (IrDA), Ultra Wideband (UWB), ZigBee, Digital Living Network Alliance (DLNA), etc. may be used for communication of the remote controllers.

Examples of the user interface device may include a 3D pointing device 400 and a remote controller 300 provided with a key board and a touch pad, in addition to a normal remote controller 200.

The 3D pointing device 400 may recognize shaking or rotation of a hand by providing a gyro sensor in the remote controller. In other words, the 3D pointing device 400 may control a desired operation, for example, channel or menu by moving a pointer in accordance with up and down and left and right motions of the user.

The remote controller 300 provided with a key board and a touch pad may facilitate the input of text through the key board, and may facilitate motion of the pointer or enlargement and reduction of a photo or moving picture through the touch pad.

In order to receive the rating information according to the present invention, the user may easily perform various operations such as selection of a specific menu through the aforementioned various user interface devices.

Figure 34:
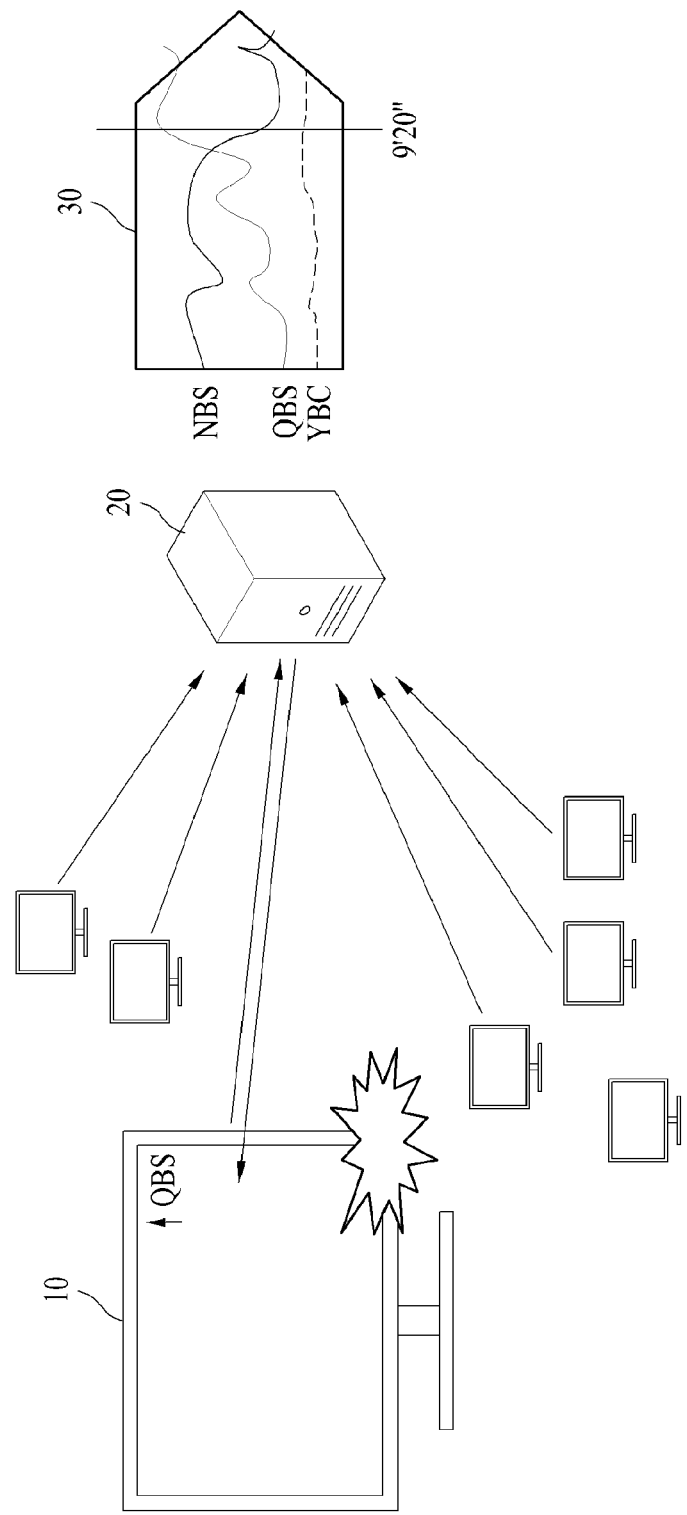
FIG. 34 is a diagram illustrating an example of a rating information provisioning system according to the present invention.

FIG. 34 is a diagram illustrating an example of a rating information provisioning system according to the present invention.

An example of the rating information provisioning system according to the present invention may include a digital receiver 10 subscribed to a predetermined service and a rating information counting server 20.

The rating information counting server 20 may include at least one of a server managed by a service provider and a server managed by a random rating survey agency.

If the rating information counting server 20 continues to collect rating information of each digital receiver 10, data transmission is rapidly increased at a specific moment to exceed a data processing rate of the server, whereby the server may be damaged.

In other words, if watching channels of the digital receivers subscribed to a service are simultaneously changed at a specific moment (9 minute 20 seconds) while the rating information counting server 20 is acquiring rating information data 30, collected rating information data are rapidly increased and the server may be damaged, whereby the rating information counting server 20 may not generate exact rating information after the server is damaged.

The more the number of sample digital receivers is, the more improved reliability of the rating information is. However, since the server may be damaged due to rating information data acquired from the large number of sample digital receivers, a proper solution will be required.

In this respect, although the digital receiver could use various channels and programs, it is difficult for the user to search for and select a desired channel or program. In other words, since rating survey is carried out by surveying rating information of only a part of the digital receivers, a problem occurs in that the rating information is not exact. A problem also occurs in that it is difficult for a contents provider or service provider to acquire information as to channels currently viewed by broadcasting or information as to a channel of which rating is rapidly changed. Moreover, a problem occurs in that it is difficult for the user to identify information as to a channel the most popular to viewers.

Accordingly, in order that the user uses desired contents from various channels or programs available in the digital receiver more easily and conveniently, a method for exactly and conveniently identifying information on popular channels and programs in a digital receiver through a network and a digital receiver employing the method will be necessarily required.

Figure 35:
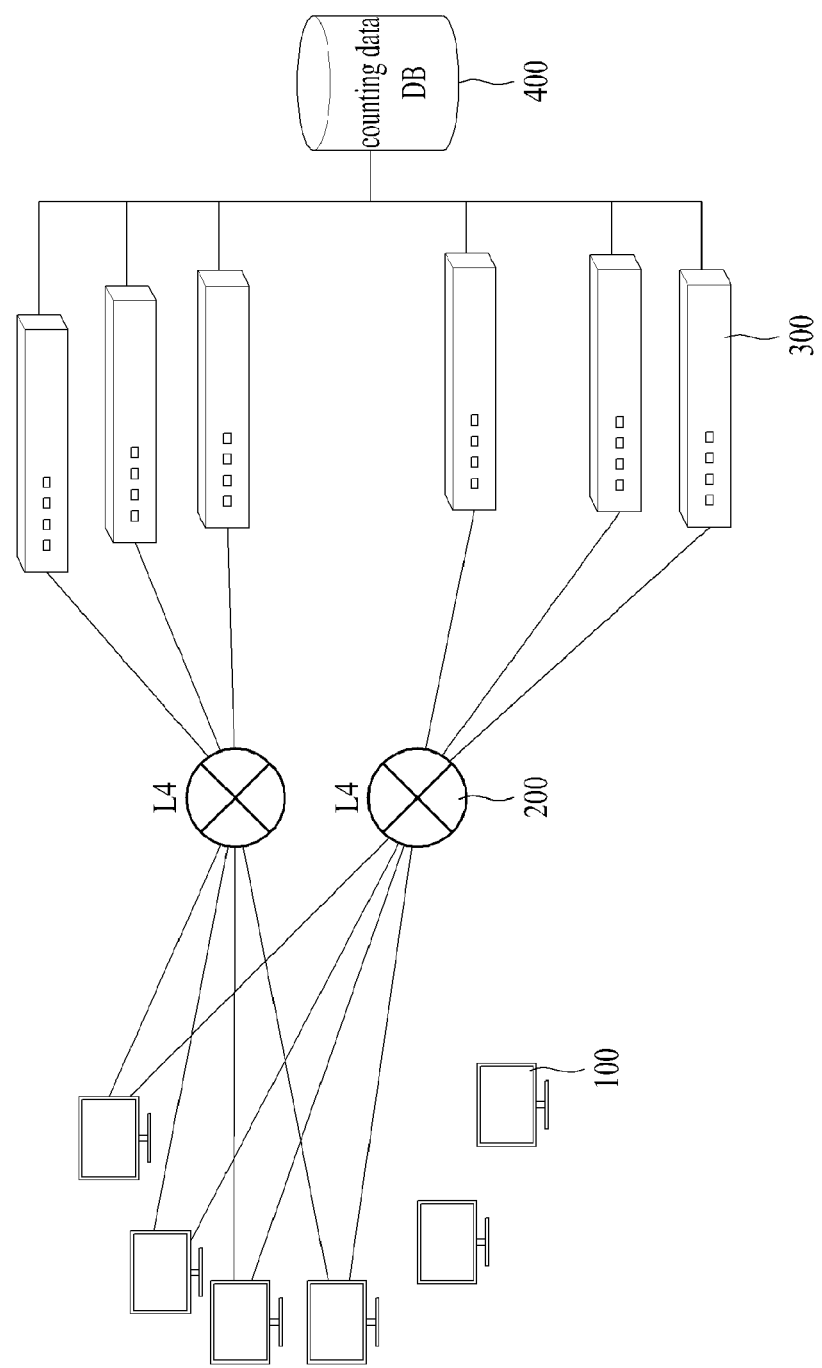
FIG. 35 is a diagram illustrating another example of a rating provisioning system according to the present invention.

FIG. 35 is a diagram illustrating another example of a rating provisioning system according to the present invention.

Another example of the rating information provisioning system according to the present invention may include a digital receiver 100 included in a predetermined service range, a relay 200, a rating information collecting server 300, and a rating counting database 400.

In this case, the predetermined service may mean a service range in which a random digital receiver 100 may be included, such as a broadcast service and a rating information provisioning service.

The rating information collecting server 300 may include at least one of a server managed and controlled by a service provider and a server managed and controlled by a separate rating information provider.

The rating provisioning system may avoid load of the server by using a part of the digital receivers included in the predetermined service range during the step of acquiring the rating information in accordance with the embodiment of the present invention. In other words, the rating provisioning system may appropriately control the number of digital receivers used to acquire rating information, in accordance with a proper data processing rate of a server, which is previously set, whereby rating data may be collected within the range that the proper data processing rate is not exceeded. This will be described later in more detail with reference to FIG. 37.

The digital receiver used to acquire rating information transmits and receives data to and from a random relay 200. In other words, the digital receiver may transmit and receive data on rating information to and from the rating information collecting server 300 through the relay 200.

The relay 200 may control a transmission rate of data received from the digital receivers 100. In other words, the relay 200 may prevent data from being excessively increased by transmitting only data, which are transmitted from the digital receiver included in a rating collection range among the digital receivers connected with predetermined servers within the same service range through the network, to the rating information collecting server 300. The rating collection range may be controlled by the rating information collecting server 300.

The relay 200 may be an internal element module of the rating information collecting server 300 in accordance with the embodiment of the present invention.

A plurality of rating information collecting servers 300 may be provided depending on area or service.

Accordingly, as shown in FIG. 35, the rating provisioning system may include a plurality of relays 200 and a plurality of rating information collecting servers 300. In this case, data may be distributed to each relay and each rating information collecting server, whereby the server may be prevented from being damaged by data increase.

The rating counting database 400 may store rating information received from each rating information collecting server 300.

The rating counting database 400 may acquire information of all the programs viewed by each digital receiver 100 by transmitting and receiving data to and from all the servers at the same time.

Accordingly, the rating information collecting server 300 may generate real time rating information through the data stored in the database 400 and transmit the generated rating information to the digital receiver 100.

Figure 36:
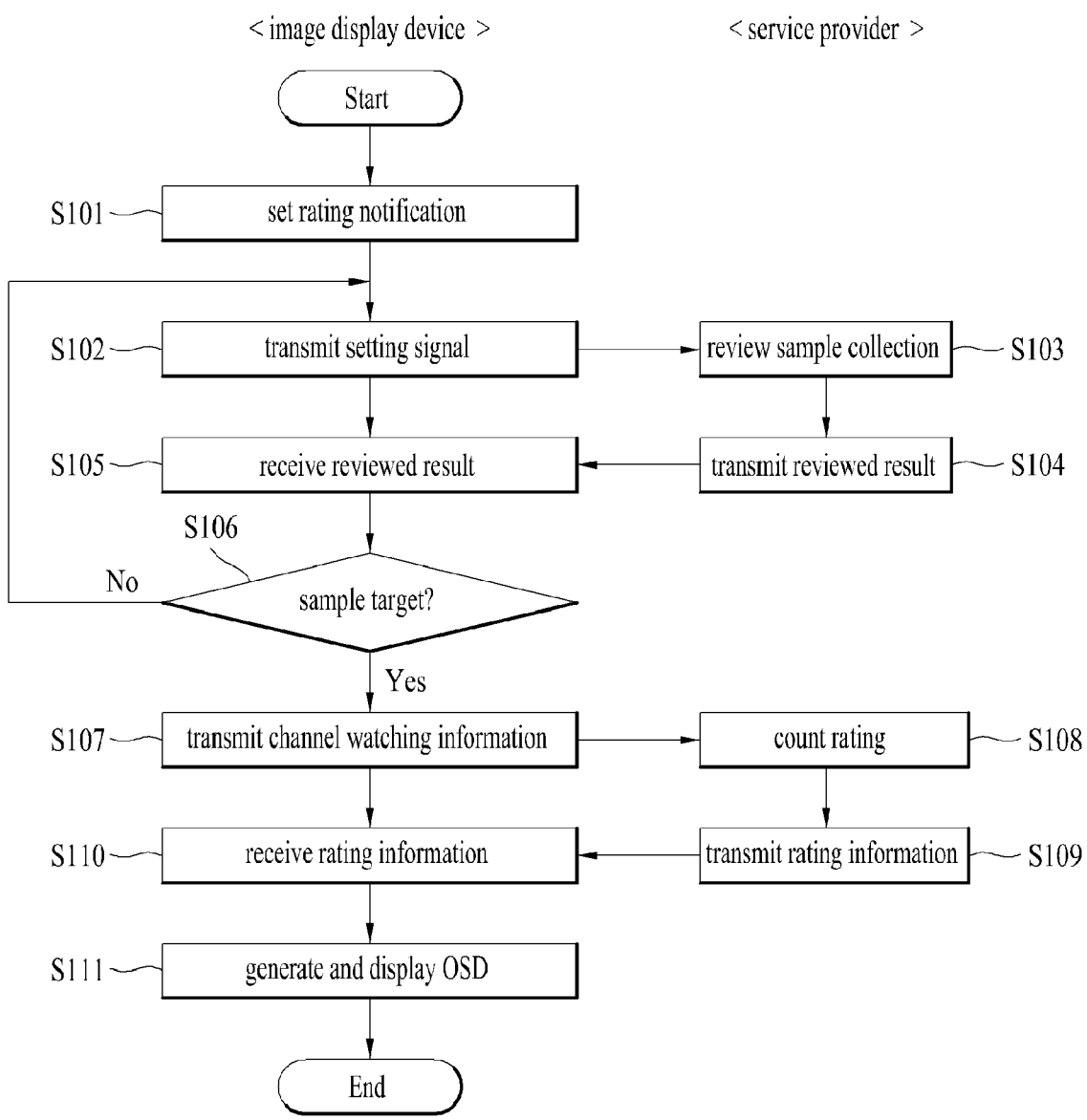
FIG. 36 is a flow chart illustrating an example of a procedure of providing rating information according to the present invention.

FIG. 36 is a flow chart illustrating an example of a procedure of providing rating information according to the present invention.

According to the embodiment of the present invention, the digital receiver may acquire rating information by transmitting and receiving data to and from a predetermined server through the network and provide the acquired rating information to the user.

If the digital receiver acquires the rating information from a restricted viewer, there may be limitation in exactness of the rating information. Accordingly, exact rating information may be acquired and provided in accordance with the present invention as shown in FIG. 36.

The server may include at least one of a server managed and controlled by a service provider and a server managed and controlled by a separate rating information provider.

The digital receiver may be set in a rating notification setting mode (S101).

For example, if a specific key input signal or a specific menu selection signal is input from the user, the digital receiver may be set to the rating notification mode. Also, the digital receiver may display a message indicating that the rating notification mode has been set, in a predetermined zone of the display screen. The notification message will be described later in more detail with reference to FIG. 43.

For another example, the digital receiver may be set to the rating notification mode as a default mode. In other words, the digital receiver may transmit the rating information to the server even without separate input of the user and acquire the rating information from the server to provide the user with the rating information.

The digital receiver transmits a setting signal indicating that the rating setting mode has been set, to the server (S102).

The digital receiver is connected with the predetermined server through wire/wireless network connection. In this case, the network connection may include Internet network.

The digital receiver may transmit a setting notification signal, which includes ID information and location information of the digital receiver, to the server.

Also, the digital receiver may transmit the setting signal, which includes a subscription request signal, to the server, wherein the subscription request signal requests the server to include the digital receiver in a channel watching information collecting target.

The server reviews whether the digital receiver that has transmitted the notification signal is set to a sample collecting target for collecting channel watching information (S103).

The server may set only predetermined digital receivers to sample collecting targets without acquiring rating information from all the digital receivers set to the rating notification mode, thereby preventing data overload from occurring. This will be described later in more detail with reference to FIG. 37.

The server transmits the reviewed result of the step S103 to each digital receiver (S104), and each digital receiver receives the reviewed result (S105).

The server may control a specific digital receiver to continue to transmit the channel watching information to the server after transmitting the reviewed result. The server may control the specific digital receiver so as not to transmit the channel watching information to the server after transmitting the reviewed result.

The digital receiver identifies whether it corresponds to the rating information collecting sample target, from the received reviewed result (S106).

For example, the digital receiver may display a predetermined notification message to notify the user whether the digital receiver has been determined as the channel watching information collecting target. For another example, the digital receiver may later display rating information only without displaying a separate notification message.

The digital receiver collects the channel watching information if it is identified as the rating information collecting target, and transmits the collected channel watching information to the service provider (S107). The channel watching information may include at least one of a watching program, a watching channel and a watching time. Also, the channel watching information may further include information related to personal details of a viewer.

The server may differently set a channel watching information collecting period of each digital receiver included in the channel watching information collecting target and a transmission period of the collected information to distribute its data load. Setting of the periods will be described later in more detail with reference to FIG. 38.

The service provider counts ratings received from the digital receiver (S108).

For example, as shown in FIG. 35, the server may transmit and receive data to and from a separate database for storing channel watching information, and may acquire more reliable rating information by sharing the database with another server. For another example, the database may be included in the server.

The server may generate real time rating information on the basis of the data stored in the database.

The server transmits the generated rating information to the digital receiver (S109), and the digital receiver receives the rating information (S110).

The digital receiver provides the rating information to the user by generating and outputting OSD data on the basis of the received rating information (S111).

For example, the OSD may be displayed in the entire screen or a part of the screen of the digital receiver. This rating information may be transferred to the user through various user interfaces. This will be described later with reference to FIG. 42 to FIG. 44.

For another example, the digital receiver may filter rating information only on a current channel or related channel, which can be accessed by the corresponding digital receiver, on the basis of the received rating information, and then may display the filtered rating information. Also, the digital receiver may display the rating information only if rating change exceeding the previously set threshold value is sensed. The method of determining whether to display the rating information will be described later in more detail with reference to FIG. 39. In this case, the related channel may mean a channel that provides genre, viewing level, series, retransmission, and rerun of contents broadcasted from a channel currently tuned by the digital receiver.

In addition, the digital receiver may output the received rating information on the screen and at the same time output audio data together with the received rating information, or may output audio data only.

Figure 37:
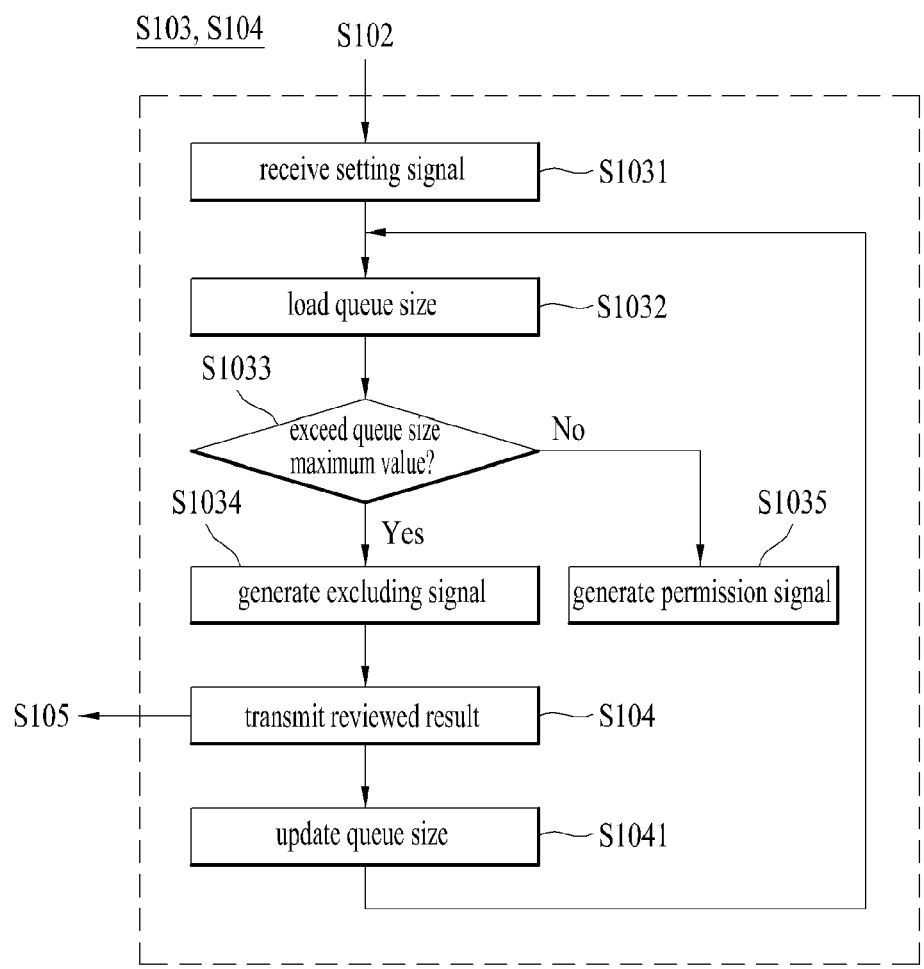
FIG. 37 is a flow chart more specifically illustrating the step of reviewing sample collection in FIG. 36.

FIG. 37 is a flow chart more specifically illustrating the step of reviewing sample collection in FIG. 36.

According to the embodiment of the present invention, a predetermined server may receive channel watching information from a predetermined digital receiver only without collecting channel watching information from all the digital receivers included in the service range, thereby preventing data overload of the server from occurring.

If a rating notification mode setting signal is received from the digital receiver (S1031), the server loads information on queue size (S1032).

In this case, the rating notification mode setting signal may include service subscription information, identification information and user information of the digital receiver.

The queue size information includes information on queue of the channel watching information of the digital receivers, which can simultaneously be collected and stored in the server. Queue is one of a basic material structure of a computer, and means a storage format of a first in first out (FIFO) structure in which first input data are first output.

Referring to FIG. 37, although the channel watching information is stored in the server in a queue type, this is only exemplary and the present invention is not limited to the above example. The channel watching information may be stored in various data storage formats such as stack, table and map not the queue type.

The server may previously store maximum allowable queue size information and load the queue size information to determine whether each digital receiver corresponds to a channel watching information sample collecting target.

The server reviews whether queue size exceeds a maximum value (S1033).

On the basis of the loaded queue size information, the server excludes the corresponding digital receiver from the channel watching information sample collecting target if the current queue size exceeds a maximum value, and determines the corresponding digital receiver as the channel watching information sample collecting target if not so. If the current queue size exceeds the maximum value, the server may exclude all the digital receivers from the channel watching information sample collecting targets even though it receives or does not receive rating notification mode setting signals of all the digital receivers for a predetermined time or the number of predetermined times.

If the corresponding digital receiver is included in the channel watching information sample collecting target as a result of the reviewed step, the server generates an OK signal (S1035). On the other hand, if the corresponding digital receiver is excluded from the channel watching information sample collecting target as a result of the reviewed step, the server generates a deny signal (S1034).

The server may transmit the generated signal to the corresponding digital receiver (S104) to allow the digital receiver to perform the operation corresponding to the generated signal.

The server may update data on queue size periodically (S1041).

If the operation of the digital receiver set as the channel watching information sample collecting target is stopped due to a reason such as power-off, the server may update the information on queue size by reflecting the above status, whereby the updated information may be used to determine a channel watching information collecting target later.

Figure 38:
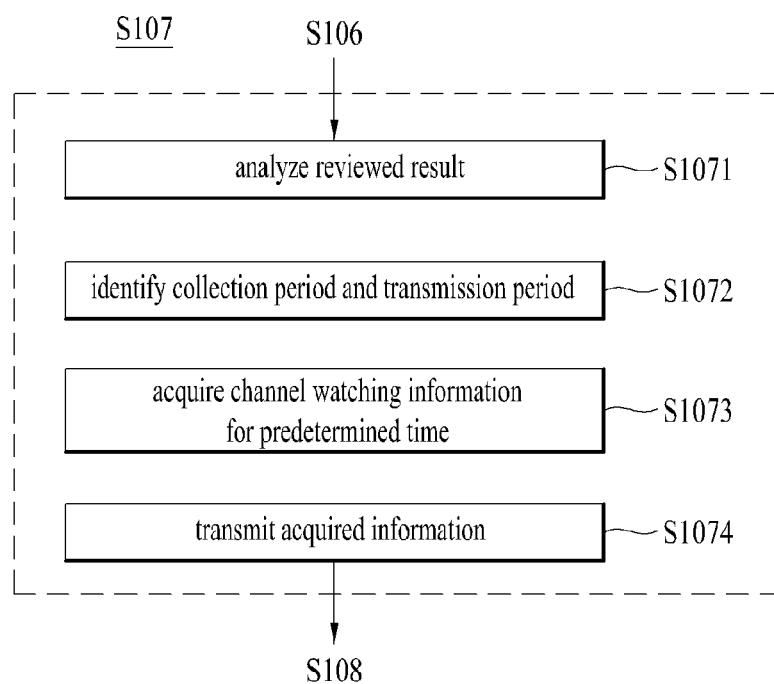
FIG. 38 is a flow chart more specifically illustrating the step of transmitting channel watching information in FIG. 36.

FIG. 38 is a flow chart more specifically illustrating the step of transmitting channel watching information in FIG. 36.

If a review result signal indicating that the digital receiver has been selected as the sample collecting target for acquiring rating information is received from the server, the digital receiver transmits the channel watching information to the server on the basis of the details included in the review result signal.

If a signal corresponding to rating information request is received from the server, the digital receiver analyzes the received signal (S1071).

The signal received from the server may include a review result as to whether the digital receiver will be included in the rating information collecting target and setting details for collecting the rating information from the digital receiver determined as the rating collecting target.

Accordingly, the digital receiver may identify what setting details are included in the received signal by analyzing data included in the received signal.

If the signal received from the server is encoded in a specific format, the digital receiver may analyze the corresponding data after performing a corresponding decoding operation.

The digital receiver may analyze the signal received from the server to sort information included in the signal.

The digital receiver identifies a collection period and a transmission period through the analyzed data (S1072).

For example, the digital receiver may collect channel change information on the basis of a specific period in accordance with the setting details received from the server, and may transmit the collected information to the server on the basis of the specific period.

The server may respectively set a rating information collection period and a rating information transmission period of each digital receiver set as the rating information sample collecting target to prevent loss due to excessive load of data from occurring. Accordingly, the server may prevent data from being excessively loaded as rating information is transmitted from many digital receivers at the same time.

For example, for digital receivers included in a predetermined service range and set as rating information collecting targets, the server sets a rating information collection period and a rating information transmission period of the first digital receiver to five minutes and sets a rating information collection period and a rating information transmission period of the second digital receiver to seven minutes, thereby receiving data alternately.

The server may transmit information on the aforementioned setting details to the digital receiver together with the review result as to whether to include the digital receiver in the rating information collecting target.

Next, the digital receiver acquires channel watching information of the digital receiver on the basis of the identified collection period and transmission period (S1073).

Accordingly, if the information on the collection period and the transmission period is acquired at the step S1072, the digital receiver collects the channel watching information in accordance with the acquired information and transmits the collected information to the server (S1074). As a result, the server may reduce load of each digital receiver, for collecting and generating rating information.

Figure 39:
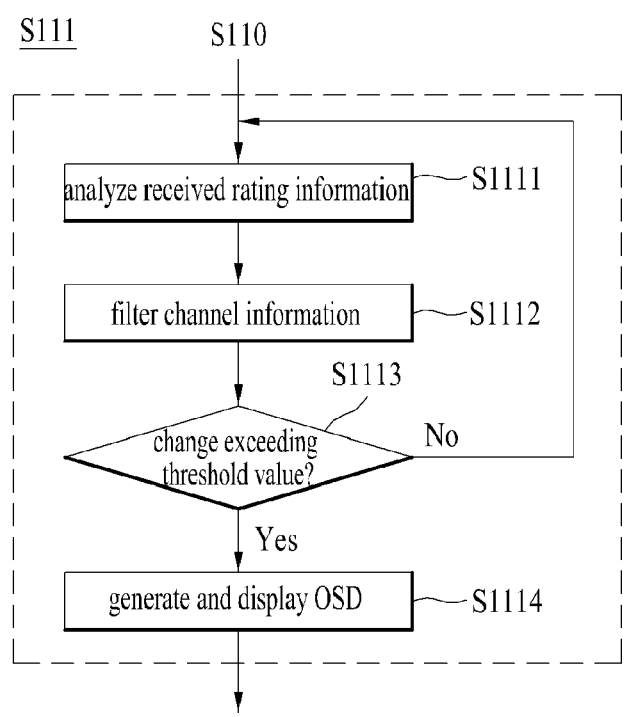
FIG. 39 is a flow chart more specifically illustrating the step of displaying rating information, etc.

FIG. 39 is a flow chart more specifically illustrating the step of displaying rating information, etc. in FIG. 36.

The digital receiver analyzes the rating information received from the server (S1111).

If predetermined data are received from the server, the digital receiver may identify what information is included in the received data by analyzing the received data.

If rating information is included in the received data, the digital receiver may respectively sort real time rating information, rating change transition information, channel attribute information, and program thumbnail information, which are included in the rating information.

The digital receiver may filter channel information (S1112).

If rating information of programs of various channels is included in the rating information received from the server but there is limitation in channels available in the corresponding digital receiver, the digital receiver may extract rating information only on channels available in the corresponding digital receiver, from the received rating information.

For example, the server for generating rating information may transmit data, which include rating information on all the channels, and the digital receiver may receive the data and filter information only on channels available therein.

For another example, if the server transmits data, which include rating information only on channels available in the corresponding digital receiver, to the corresponding digital receiver in a customized type for each digital receiver, the digital receiver may omit the step S1112 of filtering channel information.

The digital receiver determines whether the rating information has been changed to a value more than the previously set threshold value (S1113).

For example, the digital receiver may display the rating information only if rating change exceeding the previously set threshold value is searched, without displaying the rating information whenever the rating information is received.

In this case, the threshold value may be a value previously set when the digital receiver is manufactured, or may randomly be changed in accordance with setting of the user.

For example, the user may set the digital receiver to display a notification message only if a rating of a random channel is increased by 10% or more.

The digital receiver generates OSD data if there is a change beyond the threshold value, and displays the generated OSD data (S1114).

A notification message for providing information on rating change will be described later in detail with reference to FIG. 44.

On the other hand, if rating change beyond the threshold value is not searched, the digital receiver may continuously acquire the rating information transmitted from the server and at the same time may disregard the previously acquired rating information without storing it.

The user may recognize rating change through the notification message if a rating of a specific channel is rapidly increased, and may view a content of the corresponding channel through channel change.

Figure 40:
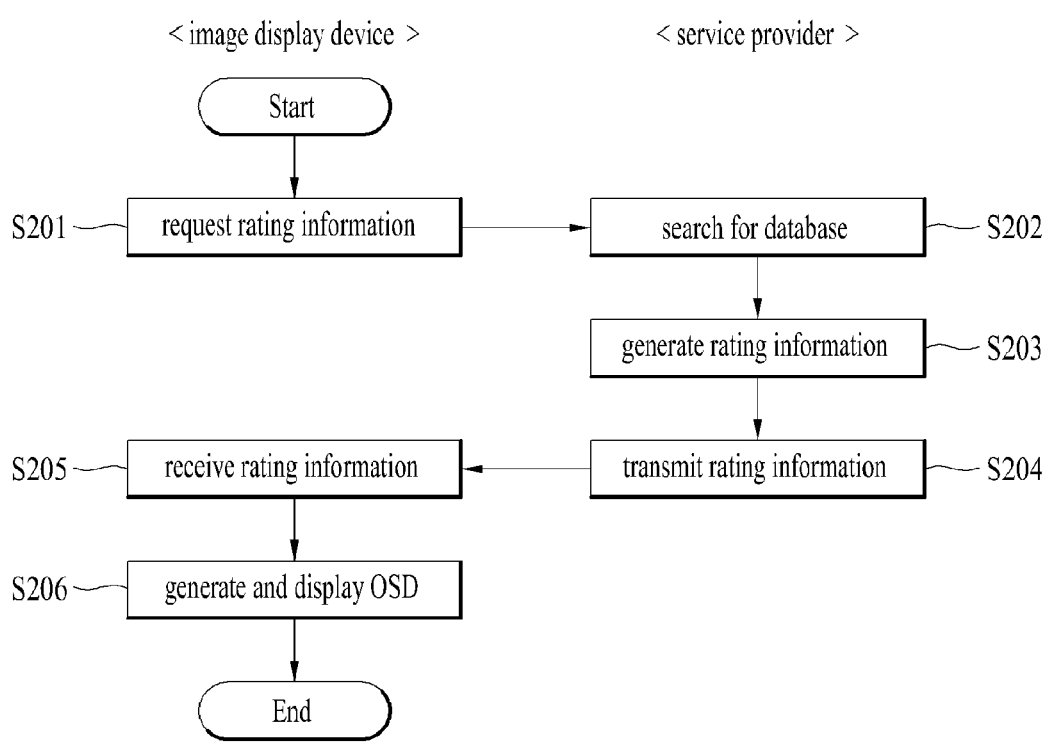
FIG. 40 is a diagram illustrating another example of a method for providing rating information according to the present invention.

FIG. 40 is a diagram illustrating another example of a method for providing rating information according to the present invention.

The digital receiver may acquire rating information only without transmitting information of a current channel to a predetermined server for generating rating information.

The digital receiver may acquire the rating information through a process shown in FIG. 40 if the user intends to restrict information transmission of the current channel to protect personal information.

The digital receiver transmits a rating information request signal to the server (S201).

For example, if a specific key input signal or a specific menu selection signal is input from the user, the digital receiver may be set in a rating notification mode, and may transmit the rating information request signal to the server. Also, the digital receiver may display a message indicating that the rating notification mode has been set, in a predetermined zone of the display screen.

For another example, the digital receiver may be set in the rating notification mode as a basic mode. In other words, the digital receiver may transmit the rating information request signal to the server even without separate input of the user, and may acquire the rating information from the server and provide the acquired rating information to the user.

The server searches for rating information of predetermined digital receivers, which is stored in the database (S202).

The server may store the database, which includes watching channel information of digital receivers included in a predetermined service range. The watching channel information may be stored in a type shown in FIG. 14.

Accordingly, the digital receiver may search for the database and load related information as the rating information request signal is received.

The server generates rating information (S203).

For example, if the server determines that the digital receiver wants rating information within a specific interval or specific range by analyzing details included in the rating information request signal, it may generate rating information based on the determined result.

For example, if the user wants rating information as of Mar. 15, 2011, the server may search for and generate only the rating information of the corresponding date from the database. If the user wants rating information of 'MBS' channel, the server may search for and generate only rating change information of the above specific broadcast channel.

The server transmits rating information to the digital receiver (S204), and the digital receiver receives the rating information (S205).

For example, the server may transmit the rating information generated through the network to the digital receiver. Also, the server may encode the data in a specific compressed format to protect information and data transmission speed, and the digital receiver may decode the data in accordance with the compressed format if the data are received.

The digital receiver may generate OSD data and display the generated OSD data (S206).

The digital receiver may display rating information in accordance with a user interface format which is previously set. Namely, the digital receiver may display a rating notification message only, or may display detailed rating information which includes rating change transition.

Also, the digital receiver may search for channels currently available therein among channels included in the rating information transmitted from the server, and may generate and output OSD data displaying rating information of the available channels only in accordance with the searched result.

Figure 41:
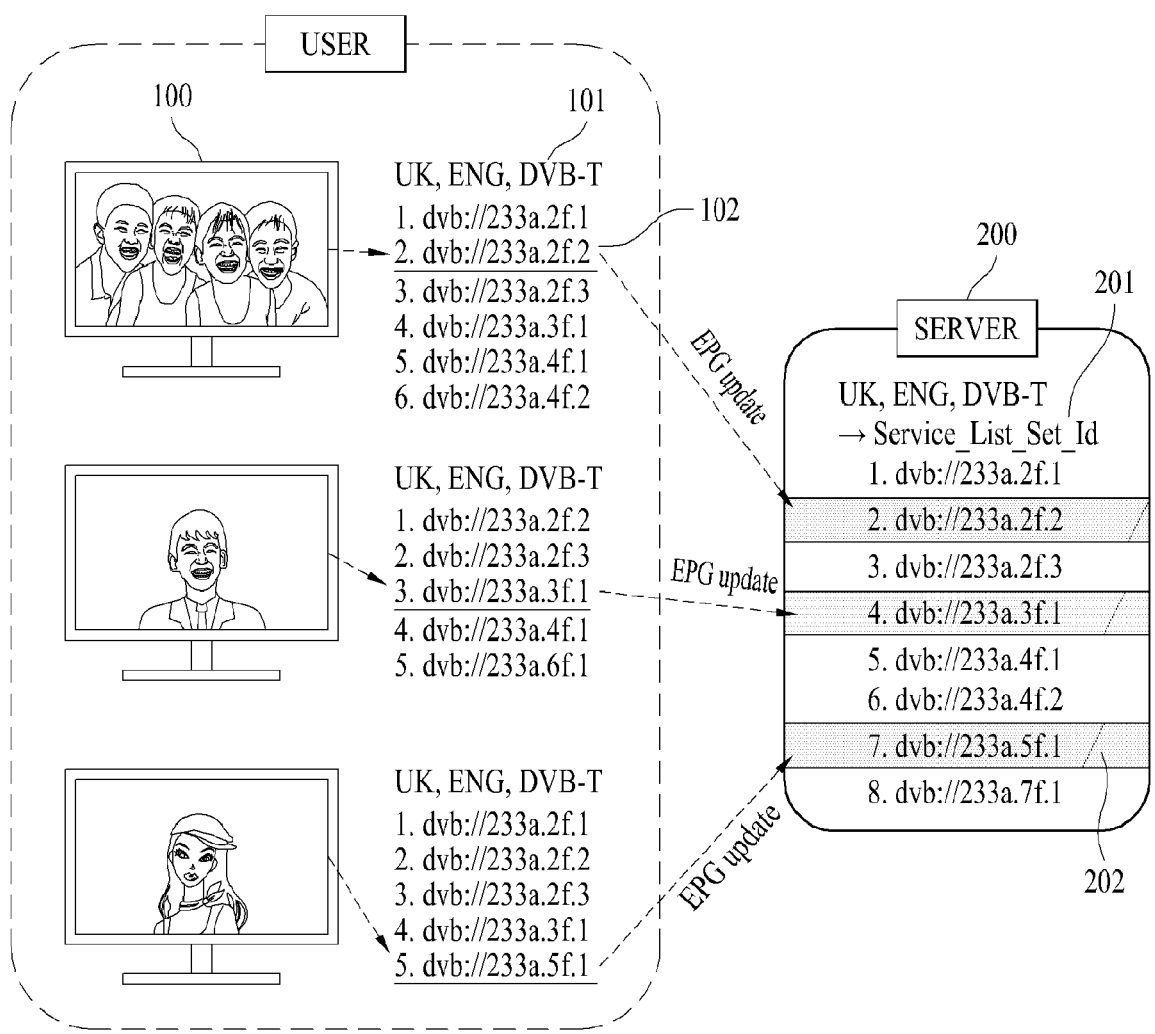
FIG. 41 is a diagram illustrating an example of a rating information transport format according to the present invention.

FIG. 41 is a diagram illustrating an example of a rating information transport format according to the present invention.

The digital receiver 100 included in a predetermined service range may transmit data for generating rating information to the server 200. Also, the rating information may be generated by a specific format to sort the generated information.

The specific format may include a format based on a DVB service as shown in FIG. 41.

For example, if a DVB-T (Digital Video Broadcasting-Terrestrial) format based on MPEG-2 signal encoding and compression, which is commonly used in European areas, is used, a list 101 of channels available in the digital receiver 100 is configured in accordance with a format such as 'dvb:// 233a.2f.1', and information as to a channel 102 currently used in the digital receiver 100 among the available channels may be transmitted to a predetermined server 200.

Also, the information transmitted to the server may include 3-id information and program information.

The 3-id information may include original network ID, transport stream ID, and service ID, and the server may identify each digital receiver through the 3-id information, and may identify information as to what digital receiver may use what channel.

Also, the program information may include broadcast information table (SDT: Service Description Table) and an event information table (EIT). In this case, the broadcast information table may include information on service name and service provider, and the event information table may include information on event name and event time (for example, start time, end time or duration).

The digital receiver 100 may transmit data for generating and providing rating information by transmitting information of various formats to the server 200.

Also, the digital receiver may transmit the data in accordance with a format based on ATSC (Advanced Television System Committee).

Referring to FIG. 41, the server 200 may configure a channel watching list 201 through the data received from each digital receiver 100. Also, the server 200 may acquire information as to which digital receiver within a service range may use a specific item 202 included in the channel watching list 201.

The server 200 may receive information on available channels and viewing channel from the digital receivers 100 included in a predetermined service range, generate rating information based on collected data by generating a list 201 for acquiring rating information through the received information, and transmit the generated rating information to the digital receiver 100 to provide the rating information to the user.

Figure 42:
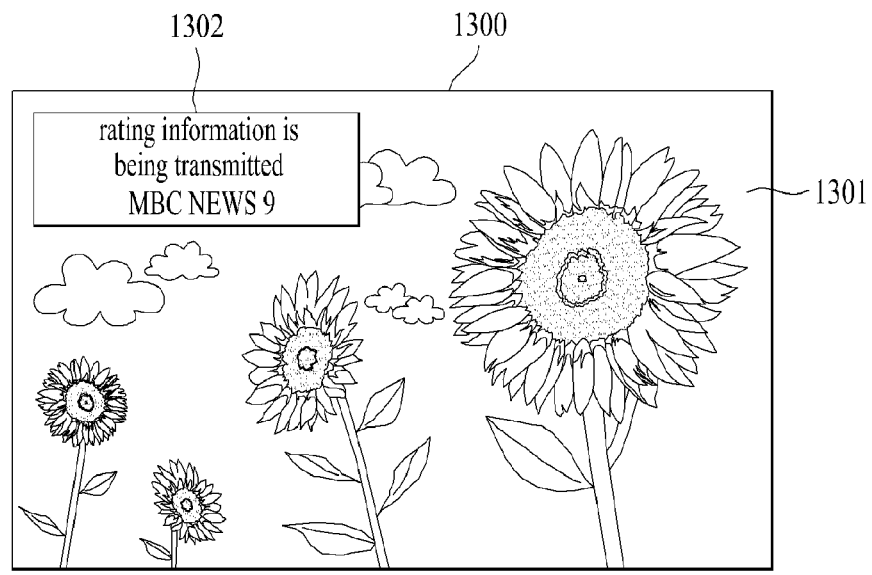
FIG. 42 is a diagram illustrating a display screen that includes a watching information transmission notification message according to the present invention.

FIG. 42 is a diagram illustrating a display screen that includes a watching information transmission notification message according to the present invention.

The digital receiver may transmit channel watching information of the user, which is collected for a predetermined cycle while a predetermined content is being displayed through the display screen, to a server for generating rating information, and may display a notification message 1302 indicating the above transmission.

At this time, the notification message 1302 may be displayed only if a notification function is set by the user, for example, and may be displayed in a minimum size or opaque color so as not to disturb a display screen of a content which is currently viewed by the user through the digital receiver.

Accordingly, the user may recognize that his/her channel watching information is transmitted to a predetermined server, through the notification message 1302 as shown in FIG. 42, and if the user desires to stop the information transmission to protect personal information, he/she may set the digital receiver to stop providing the rating information.

Figure 43:
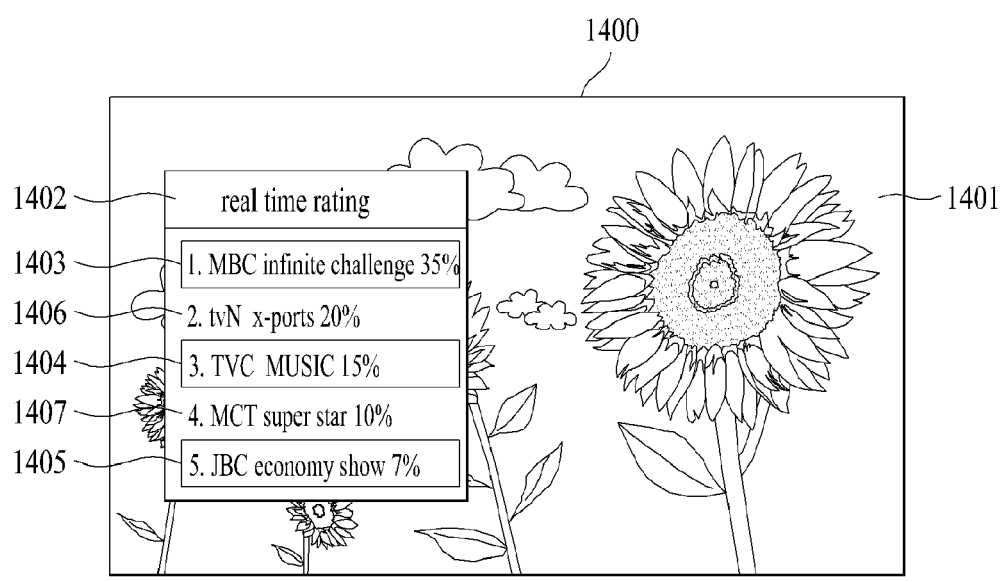
FIG. 43 is a diagram illustrating a display screen that includes rating priority information according to the present invention.

FIG. 43 is a diagram illustrating a display screen that includes rating priority information according to the present invention.

The digital receiver may receive the rating information from the server, and may generate an OSD menu based on the received rating information and display the generated OSD menu to provide the rating information to the user.

Accordingly, if a specific key input signal or a specific menu selection signal is input from the user while a predetermined content 1401 is being displayed, the digital receiver may display a rating information provisioning menu 1402.

Also, the rating information provisioning menu 1402 may include rating priority information on a program of each broadcast channel and rating information on each program.

The digital receiver may display rating information of predetermined programs in the order of the programs having the highest rating in accordance with ratings of the programs.

Referring to FIG. 43, the user may acquire information on five programs having the higher ratings, infinite challenge 1403, X-PORTS 1406, MUSIC 1404, super star 1407 and economy show 1405 through the rating information provisioning menu 1402.

Also, the user may identify that 'infinite challenge' 1403 is the program provided by the broadcasting station MBC and its current rating is 35%, through the information included in the rating information provisioning menu 1402. Also, for example, the broadcasting station name may be replaced with a broadcasting station logo, and the rating (35%) may be displayed in graph data not numerical data.

Also, the user may acquire information as to whether the programs included in the rating information provisioning menu 1402 may currently be used by the digital receiver. In other words, as shown in FIG. 15, the programs 1404, 1404 and 1405 currently available in the digital receiver may be displayed distinguishably from the programs 1406 and 1407 currently unavailable in the digital receiver, whereby the user may recognize the programs currently available in the digital receiver.

Whether the program may be used may be varied depending on a type of a broadcast service currently used by the user, a possible watching age of the program or a broadcast time of the program.

Figure 44:
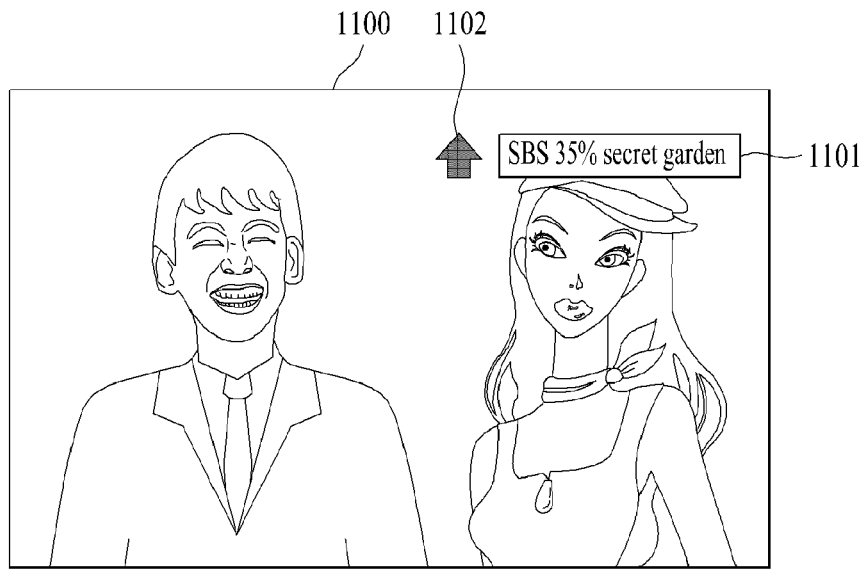
FIG. 44 is a diagram illustrating a display screen that includes a rating notification message according to the present invention.

FIG. 44 is a diagram illustrating a display screen that includes a rating notification message according to the present invention.

If rating information is transmitted from a predetermined server while a predetermined content is being displayed and a change level of a rating included in the transmitted rating information exceeds a previously set threshold value, the digital receiver may display a notification message 1101 indicating change of the rating.

The notification message 1101 may include information on broadcasting station name, share of audience, and program name. The threshold value may be set when the digital receiver is manufactured, or may be varied depending on user setting.

Also, the notification message 1101 may be displayed in accordance with a certain time period even though change information of the rating does not exceed the previously set threshold value. In other words, the user may set the notification message, which includes rating information, to be displayed every hour on the hour.

Also, the digital receiver may display a notification icon 1102 together with or separately from the notification message 1101.

The notification icon 1102 may be displayed in an arrow shape to transfer intuitive information to the user, or may be displayed to include a thumbnail screen of a program of which rating is increased.

Also, the notification message 1101 and/or the notification icon 1102 may be displayed in an opaque color so as not to disturb a display screen of a content currently displayed in the digital receiver.

If a specific hot key input signal for switching a display screen is received from the user, or if a selection signal of the notification message 1101 or the notification icon 1102 is received through a cursor, the digital receiver may display rating detailed information as shown in FIG. 19. Also, the digital receiver may switch its display screen to a display screen of a program displayed in the notification message 1101.

As a result, the user may identify rating change information even if he/she is using other content through the digital receiver, and may quickly switch the current display screen to a program of which rating is increased.

Figure 45:
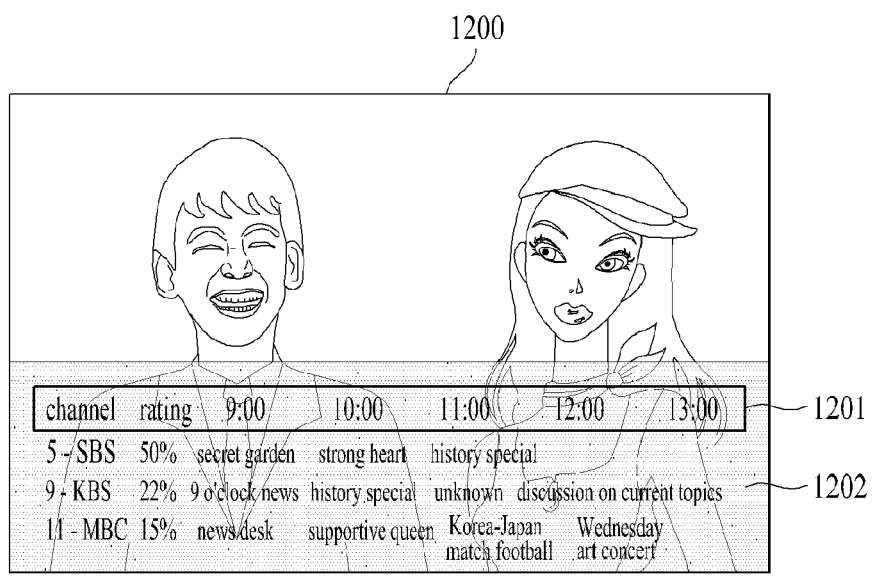
FIG. 45 is a diagram illustrating a display screen that includes an EPG with rating information according to the present invention.

FIG. 45 is a diagram illustrating a display screen that includes an EPG with rating information according to the present invention.

The digital receiver may display an electronic program guide (EPG) 1201 which includes rating information 1202.

The EPG may include a broadcast program guide service that provides time, content and cast member information of the broadcast program by using an empty frequency band of a broadcast signal or additional channel. In other words, the received EPG data may be stored in a memory device of the digital receiver or the set-top box. The viewer may select and reserve a program by manipulating the EPG through a predetermined signal input and perform pay per view program demand, program search per title or type, and video recording.

Referring to FIG. 45, information on real time rating per channel 1202 is included in the EPG. In FIG. 45, although the rating information 1202 is displayed in numerical data, it may be displayed in various formats such as graph and color to allow the user to more easily understand the rating information of each channel.

Accordingly, the digital receiver may provide the EPG together with the rating information without separate control operation to allow the user to conveniently select a channel, and may provide a new additional service as well as the simple EPG to increase convenience in use of the digital receiver and user's attention. At this time, the digital receiver may provide flickering, different color or separate indicator on the EPG with respect to a channel or content having the highest rating per time zone, and may provide a color or an indicator with respect to the other channels in the order of ratings in accordance with a rule which is previously defined.

Figure 46:
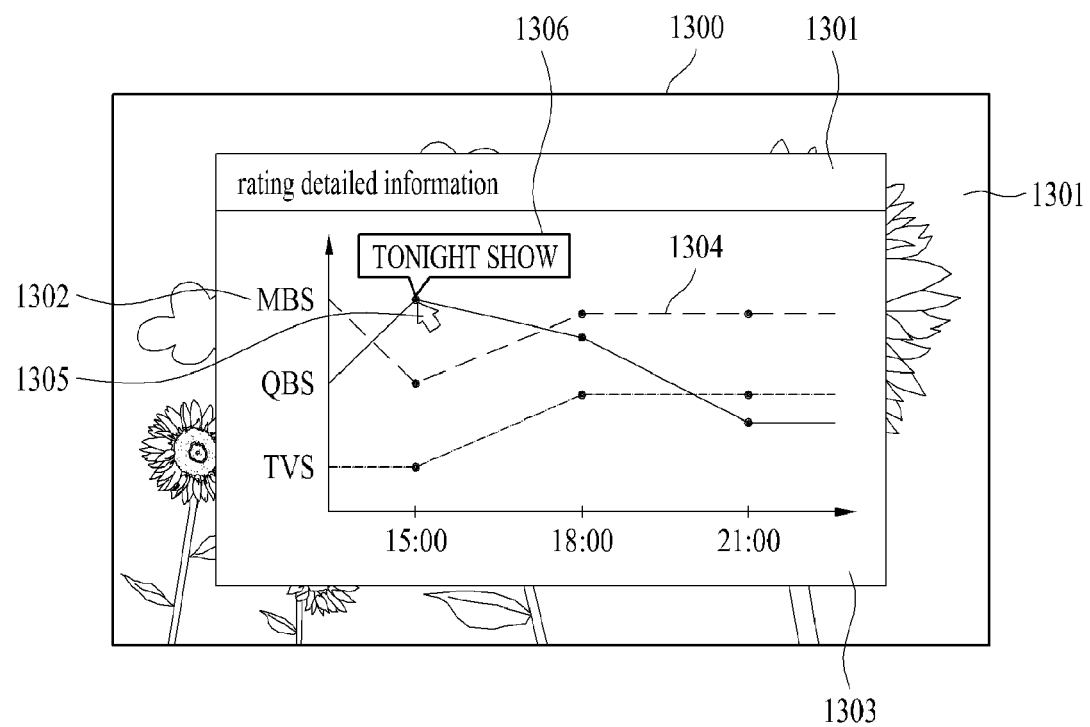
FIG. 46 is a diagram illustrating a display screen that includes detailed rating information according to the present invention.

FIG. 46 is a diagram illustrating a display screen that includes detailed rating information according to the present invention.

The digital receiver may display real time rating information or rating priority information, which includes detailed information, without simply displaying the information. For example, the digital receiver may provide information on rating change transition to the user.

If a specific key input signal or a specific menu selection signal is received from the user, the digital receiver may display a rating detailed information window 1301 in a display screen 1300.

The rating detailed information window 1301 may include a rating change transition 1304 per time zone 1303 of each broadcast channel 1302 available in the digital receiver.

Accordingly, the user may more easily identify rating change transition of each channel, for example, whether a rating of a specific channel has been rapidly increased at a specific time and has been rapidly reduced at other time. In this case, although not shown, the provided information on rating change transition may be configured to be moved from the current time to a predetermined time. Particularly, rating information of each channel at the current time may be configured in a vertical bar shape in the rating detailed information window of FIG. 46 and/or by flickering time information, whereby the rating information may be recognized by the user more easily than other time zone.

Referring to FIG. 46, a rating of 'MBS' channel has been rapidly reduced at 15 o'clock, and a rating of 'QBS' channel has been rapidly increased at this time.

Also, the digital receiver may further display program information 1306 and/or related information on the program if the user selects a specific part of the rating change transition 1304 through a predetermined pointer 1305. The selection operation may include an operation performed by the user to input a selection signal or an operation performed by the user to simply contact the pointer 1305 with a specific part of the rating change transition 1304.

As described above, the user may identify that the rating of 'QBS' channel has been rapidly increased at 15 o'clock through the provided rating detailed information window. However, if the user desires to know why the rating of 'QBS' channel has been rapidly increased at 15 o'clock, he/she may recognize that the rating has been rapidly increased for the reason of 'TONIGHT SHOW' broadcasting, through the program information 1306 by contacting the pointer 1305 with a specific part of the rating change transition 1304.

Since the user may identify various kinds of rating information through the user interface shown in FIG. 46, convenience in use of the digital receiver may be improved.

Also, for example, the selected part of the rating detailed information window of FIG. 46 may be enlarged or reduced by selection of the user. If the information window is enlarged, program information on a channel included in the enlarged part, detailed rating information, rating priority, and detailed information on the program information may be provided. On the other hand, if the information window is reduced, the information provided during enlargement may disappear and rating change transition on at least one channel may be provided.

In addition, the digital receiver may provide audio information corresponding to image information together with the image information or separately from the image information. Also, if the digital receiver can provide a 3D service, the user interface related to the rating shown in FIG. 43 to FIG. 46 may be configured as a 3D UI, whereby the user's interest may be more increased and satisfaction of the digital receiver may be improved.

Also, if information on a plurality of channels or contents is output from each user interface related to ratings provided in FIG. 43 to FIG. 46, the digital receiver may perform screen or channel switching to the channel or content selected by the user or provide the information in a picture in picture (PIP) or picture of picture (POP) format. Although not shown, in addition to the user interface shown in FIG. 43 to FIG. 46, the digital receiver may provide rating priority information of a text format to a specific zone of the screen similarly to a data broadcast service.

Figure 47:
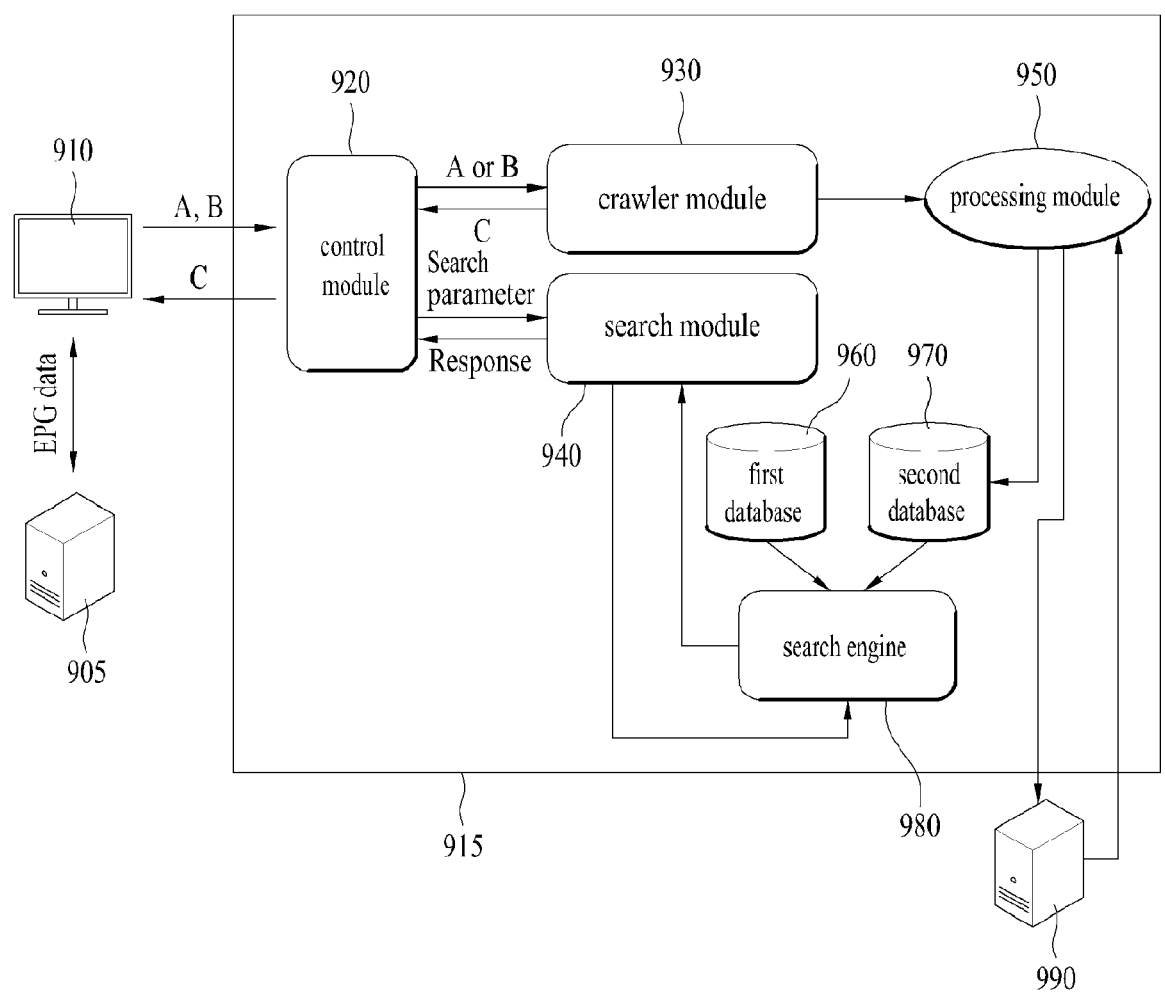
FIG. 47 is a diagram illustrating an example of a digital broadcasting system for EPG service according to the present invention.

FIG. 47 is a diagram illustrating an example of a digital broadcasting system for EPG service according to the present invention. FIG. 47 may be inferred through FIG. 1 to FIG. 46.

Referring to FIG. 47, the digital broadcasting system may include a broadcasting station 905, a digital receiver 910, a first server 915, and a second server 990. In this case, the first server 915 may be a server provided by a manufacturer of the digital receiver 910, and the second server 990 may be an EPG provisioning server.

As described above, the digital receiver 910 may receive EPG data from service information within the digital broadcast signal received from the broadcasting station 905 and/or the second server 990.

However, in case of the EPG data received from the broadcasting station 905, the digital receiver should receive a digital broadcast signal by tuning a corresponding channel, or the EPG data provided by an PEG information provider such as the second server 990 have low service coverage per area (less than 50%, approximately), whereby there is difficulty in providing EPG service suitable for actual broadcasting environment. In other words, the digital receiver may fail to provide a sufficient and exact EPG service for search or request of the user even though it uses the EPG data.

In this respect, in this specification, in order to satisfy EPG service request of the user, the first server 915 provides EPG service by collecting EPG data of each digital receiver and storing the collected EPG data in the database.

In other words, unlike the digital receiver of the related art, the present invention suggests that the first server 915 collects EPG data received from a plurality of digital receivers having the same service list and/or combines EPG data of the second server 990 to obtain processed EPG data and transmits the processed EPG data to each digital receiver to provide an advanced EPG service, which includes latest update information, for a short time.

Figure 48:
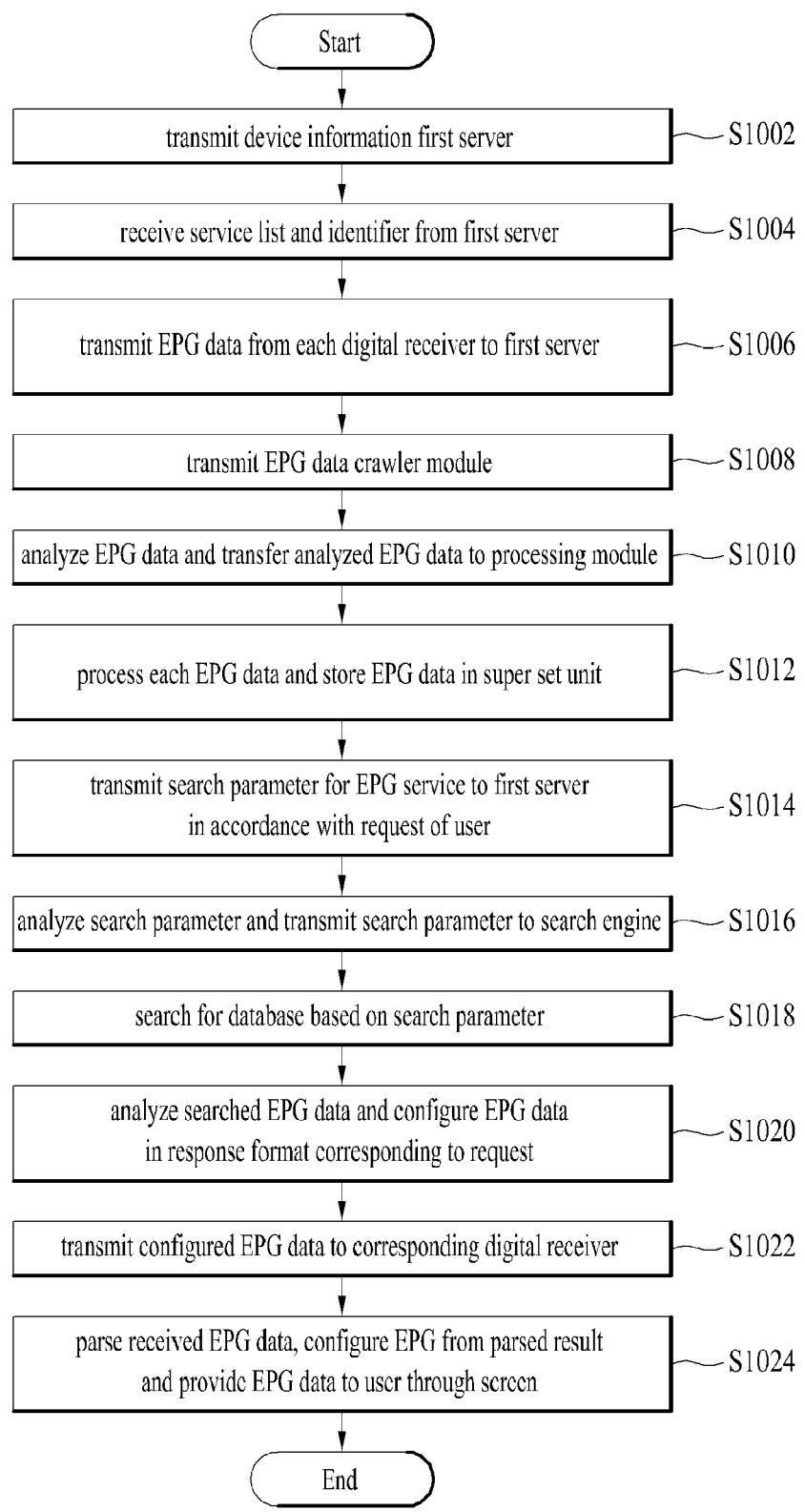
FIG. 48 is a flow chart illustrating a method for providing EPG through a digital broadcasting system according to the present invention.

Hereinafter, a method of providing EPG service through a digital receiver 910 in accordance with the present invention and a digital broadcasting system will be described in detail with reference to FIG. 48. FIG. 48 is a flow chart illustrating a method for providing EPG through a digital broadcasting system according to the present invention.

The digital receiver 910 performs a registration procedure by performing communication with the first server 920 to provide an EPG service.

For example, the digital receiver 910 initially transmits its device information to the first server (A, S1002), and receives a setting value based on the device information transmitted from the first server 915, i.e., service list set ID (C, 1004).

In this case, the device information includes a device-country, a receiver-type and a service list. The device-country may mean Korea (KR), Germany (DE) and England (UK). Also, the receiver type may mean terrestrial, cable, satellite, and IPTV. Also, the service list may mean a list of services or channels that can be accessed by the corresponding digital receiver through auto scan. In the present invention, the service list is configured in a 3-id type, for example, and is transmitted and received between the digital receiver 910 and the first server 915.

In this case, the 3-id may include original network identifier, transport stream identifier and service identifier. The 3-id serves as a reference that allows a country to search for the same service per receiver type. In this case, the service list may further include corresponding service name or channel name information.

For example, the digital receiver 910 may configure device information as country of (UK), receiver type of (DVB-T) and service list of 3-id in a format of dvb://233a.2f.1 and transmit the configured device information to the first server 915. In this case, 233a may mean original network identifier, 2f may mean transport stream identifier, and 1 may mean service identifier.

The digital receiver 910 may further include at least one of device type information such as model number or model name of the corresponding device, device language information such as language supported and used by the corresponding device, and user ID information previously registered in the first server in the aforementioned device information and transmit the information to the first server 915.

The first server 915 determines a group to which the corresponding digital receiver belongs, on the basis of the device information transmitted from the digital receiver 910, and transmits identification information of the corresponding group, i.e., the aforementioned service list set identifier to the corresponding digital receiver in accordance with the determined result. Hereinafter, the group will be referred to as a super set. The service list set identifier provides information as to whether the first server 915 configures a super set to be managed together with country and receiver type information on the basis of the country and receiver type information of the device information of each digital receiver, and information as to a super set to which a specific receiver has been allocated.

The service list set identifier serves as identification information between the digital receiver 910 and the first server 915. In other words, each digital receiver 910 and the first server 915 may perform all the procedures through the service list set identifier in updating the EPG data from each digital receiver to the first server 915 or receiving the EPG data from the first server 915.

In the present invention, the service list set identifier is a value for identifying a bundle of service lists, i.e., super sets if the first server 915 manages the EPG data per service list. As described above, two types of the device information, i.e., country and receiver type may generally constitute the super set. For example, in case of Europe, if 3-ids are equally used in one country per receiver type, the service lists may be regarded as the same service.

Afterwards, each digital receiver transmits the EPG data to the first server 915 and updates the EPG data (B, S1006). In this case, initial transmission of the EPG data may be performed at the aforementioned step S1202. However, if each digital receiver transmits the EPG data to the first server and updates the EPG data at the step S1006, the first server 915 transmits the service set identifier of each digital receiver and the corresponding EPG data, which are previously allocated at the step S1004. Also, the transmitted EPG data may be configured in a 3-id format.

The transmitted EPG data are read by the digital receiver 910 from service information which includes EPG data within a digital broadcast signal transmitted from the broadcasting station 905. As described above, the service information, which includes EPG data, includes event and SDT on a service, i.e., EIT on a program, in case of DVB terrestrial. In other words, the digital receiver 910 extracts data for EPG by parsing SDT and EIT from the digital broadcast signal, stores the extracted data in a memory module, configures the stored data in the aforementioned 3-id format, and transmits the configured data to the first server 915.

At the step S1006, each digital receiver may transmit the EPG data shown in FIG. 41 to the first server 915, 1150.

The first server 915 may receive the EPG data from each digital receiver and process the received EPG data. The first server 915 may use the EPG data of the second server 990 when processing the EPG data received from each digital receiver. However, if the EPG data of the second server collide with the EPG data of each digital receiver during the processing procedure, SI information may first be used.

Hereinafter, the processing procedure of the EPG data in the first server 915 will be described in more detail.

If the device information of each digital receiver is received at the aforementioned step S1002, the control module 920 transmits the device information to a crawler module 930. The crawler module 930 configures a super set having the same service list on the basis of the device information of each digital receiver and returns an identifier of the configured super set, i.e., service list set identifier to the control module 920.

The control module 920 returns the service list set identifier returned from the crawler module 930 to each corresponding digital receiver.

Also, if updated EPG data are received from each digital receive after the service list set identifier returns, the control module 920 transmits the updated EPG data to the crawler module 930 (S1008).

The crawler module 930 transmits the updated EPG data of each digital receiver, which are input through the control module 920, to the processing module 950 (S1010).

In this case, the crawler module 930 may analyze an updated parameter from the updated EPG data of each digital receiver.

Also, the crawler module 930 may process the analyzed result on the basis of the service list set identifier to read out the service list set identifier and transfer the analyzed result to the processing module 950 together with the read service list set identifier.

In this case, although each digital receiver may transmit the EPG data to the first server 915 at the same time, it may transmit the EPG data to the first server 915 at different times.

In this case, after analyzing the EPG data received from the specific receiver, if the updated parameter of the updated EPG data is the same as a parameter updated previously through the other receiver at a previous time or has a version lower than the previously updated parameter, the crawler module 930 may remove the updated parameter without transferring it to the processing module 950.

The crawler module 930 may transmit the EPG data to the processing module 950 whenever the EPG data are received from each digital receiver. However, in this case, since load may occur in the processing module 950, a parameter updated at a sufficient level may be accumulated or may periodically be transmitted to the processing module 950, whereby overall load of the server may be reduced.

The processing module 950 receives the EPG data from the second server 990 periodically or non-periodically.

The processing module 950 sorts the EPG data received from the crawler module 930 and the second server 990 on the basis of a previously set super set, i.e., service list set identifier.

The processing module 950 processes the sorted EPG data and stores the processed EPG data in the database 970 in a unit of the aforementioned super set (S1012).

For example, translation and merge may be used for the processing procedure, and may be configured by addition of the service list set identifier for later EPG data search and basic information required for channel change per broadcast standard.

The data processing for the advanced EPG service is performed through the aforementioned steps including the step S1012.

Hereinafter, a procedure of providing an EPG service request from each digital receiver if any will be described.

If an EPG request is received from the user, the digital receiver 910 transmits a search parameter to the first server 915 together with the previously received service list set identifier to request the first server 915 to provide the EPG service (S1014).

In this case, the search parameter may include query information, start index (startIndex) information, maximum result (maxResults) information, category information, and sort information. In particular, the EPG may be set to the category information to request EPG service in accordance with the present invention. However, if the category is set to 'all', for example, information on CP tap (for example, YouTube tap) as well as real time tap may be received.

The control module 920 checks the request of the digital receiver 910 and determines whether the corresponding request is transmission of the updated EPG data or EPG service request at the step S1014.

As a result, if the corresponding input is the EPG service request, the control module 920 transmits a search request to a search module 940 together with the search parameter (S1016).

The search module 940 analyzes the search parameter included in the search request of the control module 920.

The search module 940 transmits the result of the analyzed search parameter to a search engine 980, and the search engine 980 searches for respective databases 960 and 970 based on the transmitted search parameter (S1018).

The search engine 980 receives the searched result from the respective databases 960 and 980 and transmits the received result to the search module 940.

The search module 940 analyzes the search result received from the search engine 980, configures the analyzed result in a response format corresponding to the request of the step S1016, and returns the response to the control module 920 (S1020).

In this case, the returned response of the search module 940 may be xml format, for example.

The control module 920 transmits the EPG data returned from the search module 940 to the corresponding digital receiver (S1022).

The corresponding digital receiver parses the EPG data received from the first server 915 in accordance with the EPG request, and configures the EPG from the parsed result to provide the configured EPG to the user through the screen (S1024). In this case, the parsed EPG data may be stored in the memory module.

The digital receiver and the operation method thereof according to the present invention may be configured by selective combination of all or some of the aforementioned embodiments without limited application of the embodiments, whereby various modifications may be made in the embodiments.

In the mean time, the operation method of the digital receiver according to the present invention may be implemented in a recording medium, which can be read by a processor provided in the multimedia device, as a code that can be read by the processor. The recording medium that can be read by the processor includes all kinds of recording media in which data that can be read by the processor are stored. Examples of the recording medium include ROM, RAM, CD-ROM, magnetic tape, floppy disk, and optical data memory. Also, another example of the recording medium may be implemented in a type of carrier wave such as transmission through Internet. Also, the recording medium that can be read by the processor may be distributed in a computer system connected thereto through the network, whereby codes that can be read by the processor can be stored and implemented in a distributive mode.

According to the present invention, the following advantages can be obtained.

First of all, since each digital receiver connected to the network may generate the rating information by performing sample collection, the broadcast service provider may provide reliable information to the user.

Second, the broadcast service provider may provide various kinds of information to the user, whereby the user's interest in using the broadcast service may be increased.

Third, since the user may identify a channel having the highest rating and rating change transition of each channel, convenience in channel selection may be provided to the user.

Finally, since various user interfaces may be provided in respect of rating provisioning system, use convenience of the user may be increased.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of providing rating information in a digital receiver, the method comprising:
   transmitting first information, which includes a country to which the digital receiver belongs, a receiver type and a service list to a server;
   receiving second information, which includes identification information of a specific group, from the server, the specific group being grouped based on the country and receiver type included in the first information;

transmitting the second information and third information, which includes electronic program guide (EPG) data, to the server;
receiving EPG data suitable for the digital receiver from the server;
transmitting a first signal to the server in a rating notification mode, the first signal including setting information;
receiving a second signal from the server, the second signal including setting details on a rating information collection;
displaying a notification message to notify whether the digital receiver is set as a rating information collecting target based on the received second signal;
transmitting a third signal to the server if the digital receiver is set as the rating information collecting target, the third signal including channel watching information of the digital receiver; and
receiving a fourth signal from the server, the fourth signal including rating information.

2. The method according to claim 1, further comprising the step of displaying the rating information based on the fourth signal.

3. The method according to claim 2, wherein the step of displaying the rating information includes filtering rating information only on channels available in the digital receiver, from the rating information included in the fourth signal.

4. The method according to claim 2, wherein the step of displaying the rating information includes:
searching whether a rating change exceeding a previously set threshold value exists, based on the rating information included in the fourth signal; and
displaying the rating information only if the rating change exceeding the threshold value is searched.

5. The method according to claim 4, wherein the step of displaying the rating information only if the rating change exceeding the threshold value is searched includes displaying a notification message in a predetermined zone of a display screen, the notification message including rating change information.

6. The method according to claim 2, wherein the step of displaying the rating information includes displaying an electronic, program guide (EPG), which includes the rating information.

7. The method according to claim 2, wherein the step of displaying the rating information includes displaying any one or more of a rating priority list that includes a program only of a specific genre, a rating priority list that includes a program only of a specific broadcasting station, a rating priority list that includes a program rating priority only of a specific area, and a rating priority list that includes a program only broadcasted at a specific time zone, on the basis of the rating information.

8. The method according to claim 1, wherein the step of transmitting the third signal to the server includes:
determining a channel watching information collection period and a channel watching information transmission period on the basis of the second signal;
acquiring channel watching information of the digital receiver on the basis of the collection period and the transmission period based on the determined result; and
transmitting the third signal, which includes the acquired channel watching information, to the server.

9. The method according to claim 1, wherein the service list is configured in a 3-id format, and the 3-id includes an original network identifier, a transport stream identifier, and a service identifier.

10. A method of collecting rating information in a broadcasting system, the method comprising:
transmitting a first signal from a digital receiver to a server, the first signal including information on rating notification mode setting;
determining in the server whether to include the digital receiver as a channel watching information collecting target, and transmitting a second signal to the digital receiver, the second signal including the determined result;
displaying a notification message in the digital receiver to notify whether the digital receiver is set as a rating information collecting target based on the received second signal;
transmitting a third signal to the server if the digital receiver is set as the rating information collecting target, the third signal including channel watching information;
storing the third signal in the server and generating rating information based on the stored third signal; and
transmitting a fourth signal from the server to the digital receiver, the fourth signal including the generated rating information,
wherein the determining in the server whether to include the digital receiver as the channel watching information collecting target includes:
loading information on a data processing rate of the server in the server;
determining whether the data processing rate exceeds a maximum value if the channel watching information of the digital receiver is included; and
generating the second signal, which includes a permission signal, if the data processing rate does not exceeds the maximum value, and generating the second signal, which includes an excluding signal, if the data processing rate exceeds the maximum value.

11. The method according to claim 10, wherein the server includes any one or more of a server managed by a broadcast service provider and a server managed by a rating information provider.

12. The method according to claim 10, wherein the broadcasting system further includes a database storing channel watching information of the digital receiver, and the step of generating the rating information includes transmitting the third signal from the server to the database and generating rating information by searching for the database through the server.

13. A digital receiver that provides rating information, the digital receiver comprising:
a user interface module configured to receive first information, which includes a country to which the digital receiver belongs, a receiver type, and a service type;
a network interface module configured to transmit and receive data to and from a server through a network;
a display module configured to display the rating information; and
a control module configured to control the network interface module to:
transmit the first information to the server,
receive second information which includes identification information of a specific group from the server, the specific group being grouped based on the country and service type included in the first information,
transmit third information for requesting an electronic program guide to the server, and
receive data on the electronic program guide suitable for the digital receiver from the server, the control module further configured to control the display module to display the electronic program guide based on the data received from the server transmitting a first signal, which includes rating notification mode setting information, to the server, receiving a second signal, which includes setting details on rating information collection, from the server, displaying a notification message to notify whether the digital receiver is set as a rating information collecting target based on the received second signal, transmitting a third signal, which includes channel watching information, to the server if the digital receiver is set as the rating information collecting target, and receiving a fourth signal, which includes the rating information, from the server.

* * * * *